United States Patent
Akutsu et al.

(10) Patent No.: US 8,510,517 B2
(45) Date of Patent: Aug. 13, 2013

(54) STORAGE DEVICE AND CONTROL METHOD FOR MANAGING RESOURCES OF A STORAGE SYSTEM

(75) Inventors: Hiroaki Akutsu, Yokohama (JP);
Kazuyoshi Serizawa, Tama (JP);
Yoshiki Kano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 961 days.

(21) Appl. No.: 12/272,124

(22) Filed: Nov. 17, 2008

(65) Prior Publication Data

US 2010/0064292 A1 Mar. 11, 2010

(30) Foreign Application Priority Data

Sep. 9, 2008 (JP) ................................. 2008-230415

(51) Int. Cl.
*G06F 13/00* (2006.01)
*G06F 13/28* (2006.01)
*G06F 9/26* (2006.01)
*G06F 9/34* (2006.01)

(52) U.S. Cl.
USPC ........... 711/154; 711/153; 711/147; 711/173; 711/170; 711/203; 711/113

(58) Field of Classification Search
None
See application file for complete search history.

(56) References Cited

U.S. PATENT DOCUMENTS

| | | | |
|---|---|---|---|
| 6,260,120 B1* | 7/2001 | Blumenau et al. | 711/152 |
| 6,996,582 B2* | 2/2006 | Daniels et al. | 711/203 |
| 7,069,408 B2 | 6/2006 | Shimada et al. | |
| 7,117,327 B2 | 10/2006 | Hirakawa et al. | |
| 2002/0010844 A1* | 1/2002 | Noel et al. | 711/153 |
| 2004/0103261 A1 | 5/2004 | Honda et al. | |
| 2005/0144380 A1* | 6/2005 | Suzuki et al. | 711/113 |
| 2006/0248132 A1* | 11/2006 | Tsubono et al. | 708/130 |
| 2007/0101097 A1 | 5/2007 | Serizawa et al. | |
| 2008/0098194 A1 | 4/2008 | Hashimoto et al. | |
| 2008/0140906 A1 | 6/2008 | Serizawa et al. | |

FOREIGN PATENT DOCUMENTS

| | | |
|---|---|---|
| JP | 2004-227558 | 8/2004 |
| JP | 2005-115506 | 4/2005 |
| JP | 2007-122432 | 5/2007 |
| JP | 2008/102667 | 5/2008 |

\* cited by examiner

*Primary Examiner* — Reginald Bragdon
*Assistant Examiner* — Stella Eun
(74) *Attorney, Agent, or Firm* — Brundidge & Stanger, P.C.

(57) ABSTRACT

For betterment, by putting a virtual storage device into a suspend mode, physical resources are turned OFF on a virtual storage device basis. Moreover, control information and volume data of the virtual storage device are stored in any external volume, for example, and the resources that have been used by the virtual storage device are deallocated. At the time of resumption of operation, using any resources not in use, the virtual storage device is restored based on the control information in storage. When a change is made to a WWN on the side of a host, the storage device receives a WWN change notification from a management server, and makes settings again to a WWN table, thereby making it accessible from the host.

22 Claims, 55 Drawing Sheets

FIG. 5

| NUMBER | LUN | ACCESSIBLE WWN |
|---|---|---|
| 1 | 3 | WWN1,WWN2,WWN3 |
| 2 | 4 | WWN2 |

FIG. 6

| NUMBER | LUN | VIRTUAL VOLUME NUMBER | LUSE |
|---|---|---|---|
| 1 | 3 | 1,2,3,4 | YES |
| 2 | 4 | 5 | NO |

FIG. 7

| NUMBER | P-VOL NUMBER | S-VOL NUMBER | STATE OF PAIR | TYPE OF PROGRAM |
|---|---|---|---|---|
| 1 | 3 | 4 | Simplex | REMOTE COPY |
| 2 | 5 | 6 | Copy | LOCAL COPY |

| NUMBER | VIRTUAL VOLUME NUMBER | SIZE |
|---|---|---|
| 1 | 1 | 300GB |
| 2 | 2 | 300GB |

801

| NUMBER | ITEM | VALUE |
|---|---|---|
| 1 | NUMBER OF PORTS | 2 |
| 2 | SIZE OF CACHE | 256MB |
| 3 | NUMBER OF TASKS | 2 |

802

405

VIRTUAL STORAGE CONFIGURATION INFORMATION

| NUMBER | RESOURCE VOLUME NUMBER | STATE OF USE | SIZE | PARITY GROUP NUMBER | START POSITION | EXTERNAL CONNECTION INFORMATION |
|---|---|---|---|---|---|---|
| 1 | 1 | IN USE | 300GB | 1 | 0x0100 | - |
| 2 | 2 | NOT IN USE | 300GB | - | - | EXTERNALLY-ADJACENT VOL NUMBER 2 |

| NUMBER | RESOURCE CACHE MEMORY ADDRESS | STATE OF POWER SUPPLY | STATE OF USE | SLOT NUMBER |
|---|---|---|---|---|
| 1 | 0x0000~0x000F | ON | IN USE | 1 |
| 2 | 0x0010~0x001F |  | NOT IN USE |  |
| 3 | 0x0020~0x002F | ON | IN USE | 2 |
| 4 | 0x0030~0x003F |  | NOT IN USE |  |
| 5 | 0x0040~0x004F | OFF | NOT IN USE | 3 |

FIG. 14

| NUMBER | RESOURCE TASK NUMBER | STATE OF POWER SUPPLY | STATE OF USE | CONTROL PROCESSOR NUMBER | TASK NUMBER |
|---|---|---|---|---|---|
| 1 | 1 | ON | IN USE | 1 | 1 |
| 2 | 2 |  | IN USE |  | 2 |
| 3 | 3 |  | IN USE |  | 3 |
| 4 | 4 | ON | IN USE | 2 | 1 |
| 5 | 5 |  | NOT IN USE |  | 2 |

FIG. 16
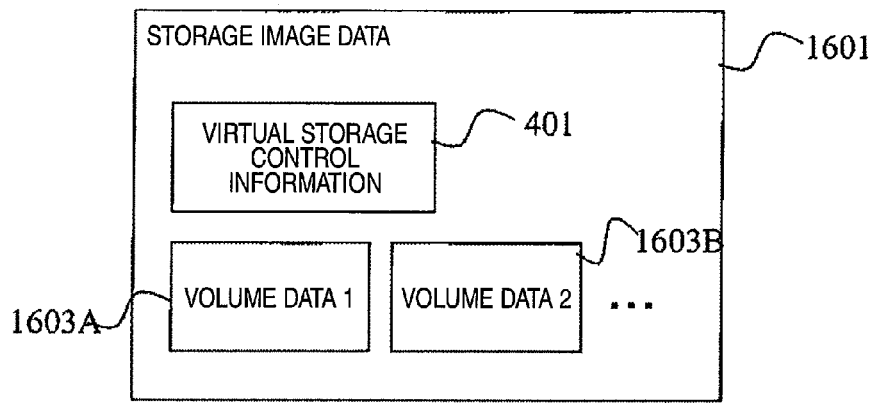
FIG. 17
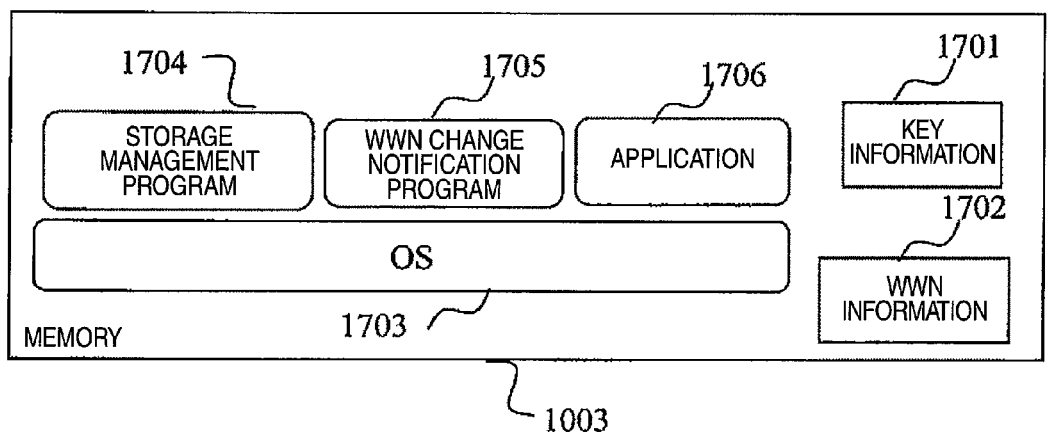
FIG. 18
| NUMBER | HOST GROUP NUMBER | HOST NUMBER | HOST PORT NUMBER | HOST WWN | CHANGE YES/NO |
|---|---|---|---|---|---|
| 1 | 1 | 1 | 1 | Wwn3 | YES |
| 2 | 1 | 2 | 1 | wwn2 | NO |
1702

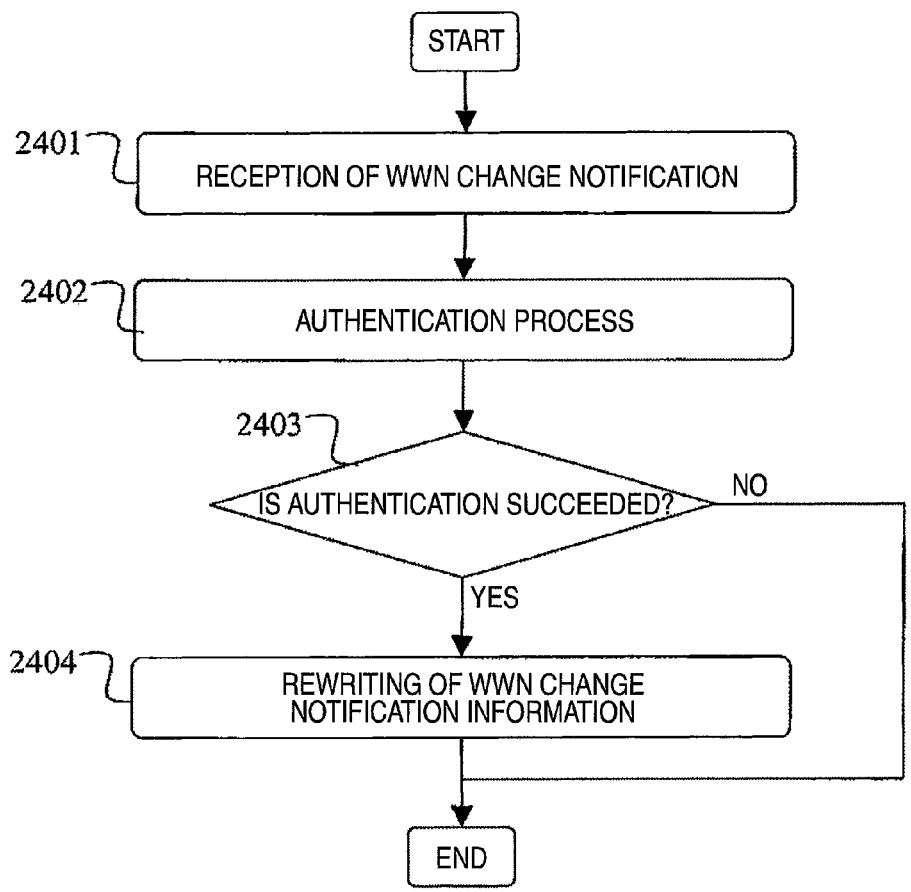

| | 3311 | 3312 | 3313 | 3314 | 3315 |
|---|---|---|---|---|---|
| NUMBER | PACKAGE NUMBER | TYPE OF PACKAGE | LIST OF RESOURCES | POWER SUPPLY COUNTER | STATE OF POWER SUPPLY |
| 1 | 1 | PROCESSOR PACKAGE | 1,2,3,4 | 1 | ON |
| 2 | 2 | CACHE MEMORY PACKAGE | 0x1000~0x1010, 0x1010~0x1020 | 1 | ON |
| 3 | 3 | DISK PACKAGE | 10,11,12,13,14,15,16,17 | 1 | ON |
| 4 | 4 | BACK-END PORT PACKAGE | 1,2,3,4 | 0 | OFF |

3301

| NUM BER | MODULE NUMBER | LIST OF RESOURCES |
|---|---|---|
| 1 | 1 | (RESOURCE TASK) 1,2,3,4<br>(RESOURCE CACHE) 0X0000~0x0010,0x0010~0x0020<br>(RESOURCE VOLUME) 10,11,12,13,14,15,16,17 |
| 2 | 2 | (RESOURCE TASK) 5,6,7,8<br>(RESOURCE CACHE) 0X1000~0x1010,0x1010~0x1020<br>(RESOURCE VOLUME) 18,19,20,21,22,23,24,25 |

FIG. 44

| NUMBER | TYPE OF RESOURCES | RESOURCE NUMBER |
|---|---|---|
| 1 | RESOURCE TASK | 1 |
| 2 | RESOURCE CACHE MEMORY | 0x0010~0x0030 |
| 3 | RESOURCE VOLUME | 2 |
| 4 | RESOURCE TASK | 4 |
| 5 | RESOURCE CACHE MEMORY | 0x0040~0x0050 |
| 6 | RESOURCE VOLUME | 5 |

| NUMBER | VIRTUAL VOLUME NUMBER | SIZE | PHYSICAL DISK PERFORMANCE REQUIREMENTS | RAID LEVEL PERFORMANCE REQUIREMENTS |
|---|---|---|---|---|
| 1 | 1 | 300GB | 1.5 krpm OR MORE | RAID5 |
| 2 | 2 | 300GB | 1.5 krpm OR MORE | RAID5 |

FIG. 49

| NUMBER | PDEV NUMBER | STATE OF POWER SUPPLY | POWER SUPPLY COUNTER | PHYSICAL DISK PERFORMANCE |
|---|---|---|---|---|
| 1 | 1 | ON | 2 | 1krpm |
| 2 | 2 | ON | 2 | 1krpm |
| 3 | 3 | ON | 2 | 1krpm |
| 4 | 4 | ON | 2 | 1krpm |

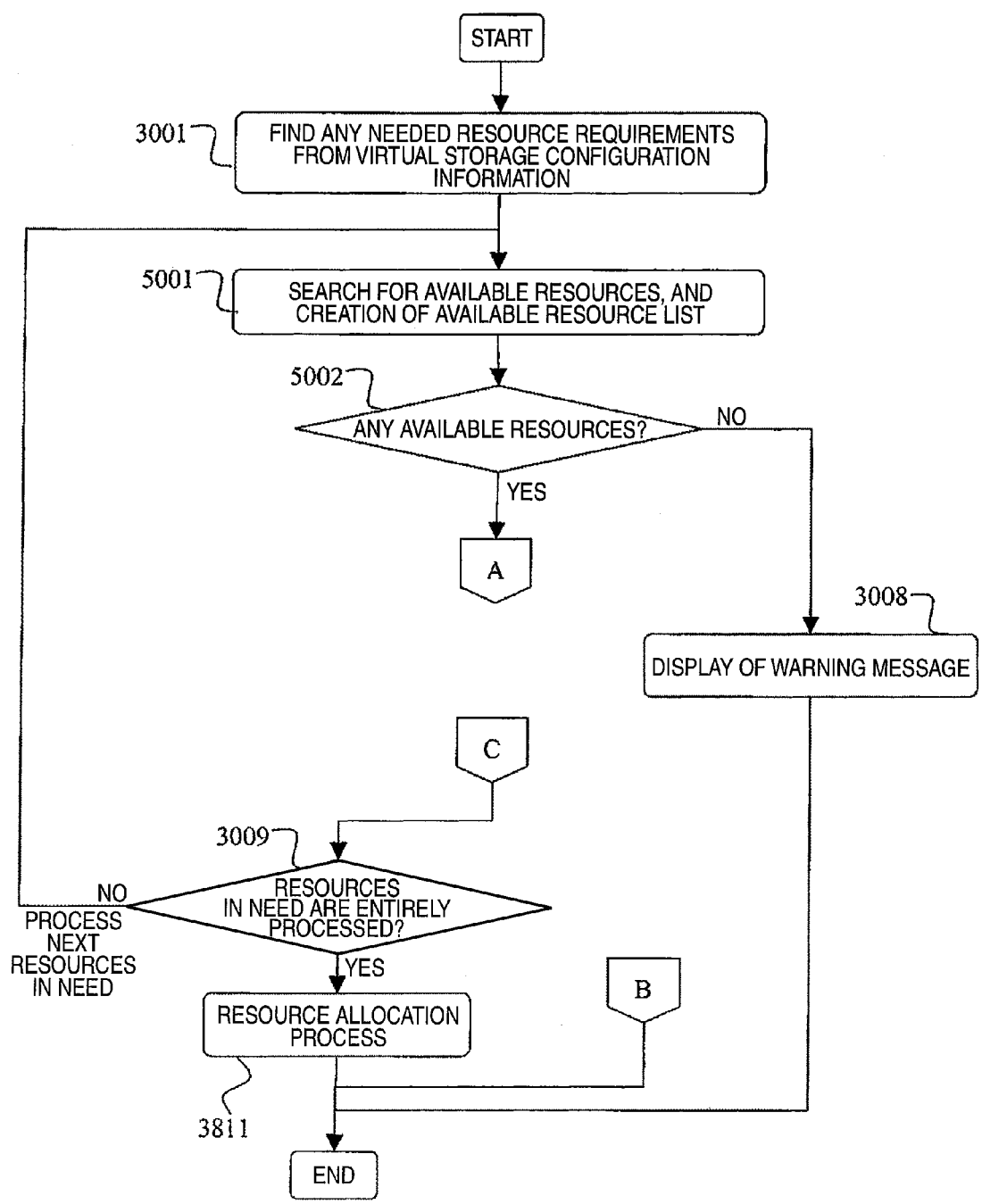

| NUMBER | RESOURCE TYPE | RESOURCE NUMBER | RESERVED? | VIRTUAL STORAGE DEVICE NUMBER | VIRTUAL RESOURCE NUMBER |
|---|---|---|---|---|---|
| 1 | RESOURCE TASK | 1 | YES | 1 | 2 |
| 2 | RESOURCE VOLUME | 1 | NO | — | — |

FIG. 60

| NUMBER | VIRTUAL VOLUME NUMBER | RESERVATION CANCELLATION YES/NO |
|---|---|---|
| 1 | 1 | YES |
| 2 | 2 | NO |

| NUMBER | PROGRAM TYPE | LICENSE INFORMATION |
|--------|--------------|---------------------|
| 1 | REMOTE COPY | NOT VALID |
| 2 | LOCAL COPY | VALID |

| NUMBER | VIRTUAL VOLUME NUMBER | LAST COMMAND RECEPTION TIME | THRESHOLD VALUE |
|---|---|---|---|
| 1 | 1 | 14:05:30 | 1 HOUR |
| 2 | 2 | 14:02:21 | 5 HOUR |

STORAGE DEVICE AND CONTROL METHOD FOR MANAGING RESOURCES OF A STORAGE SYSTEM

CROSS REFERENCES TO RELATED APPLICATIONS

This application relates to and claims priority from Japanese Patent Application No. 2008-230415, filed on Sep. 9, 2008, the entire disclosure of which is incorporated herein by reference.

BACKGROUND OF THE INVENTION

1. Field of the Invention

The present invention relates to the resource use of a storage system.

2. Description of the Related Art

A database system handling a large amount of data like a big data center or others performs data management using a memory system configured separately from a host computer. This memory system is configured by a storage device or others. Responding to an input/output request coming from the host computer, the storage device can provide a logical volume (logical unit) formed on a storage area of a plurality of memory devices to the host (host computer).

Patent Document 1 (U.S. Pat. No. 7,069,408) describes a method for enabling management of a plurality of logical storages being the results of dividing a storage device.

SUMMARY OF THE INVENTION

For dividing a storage device into plural for use as a plurality of virtual storage devices, if such virtual storage devices become large in number, the virtual storage devices not in continuous use become easily mixed up, e.g., virtual storage devices for temporary project use or test use. In consideration thereof, the technology of Patent Document 1 has problems that control information and volume data of such virtual storage devices not in continuous use wastefully consumes the capacity of the storage device.

For putting the virtual storage device into a suspend mode, the control information and the volume data are saved in any external storage device or others, and leaves vacant and makes available for use the resources of the storage device that have been used. For making the virtual storage device to resume operation, any available resources in the storage device are allocated for use, and the control information and the volume data stored in the external storage device or others are restored.

According to the invention, the following effects can be expected.

That is, control information and data of any virtual storage device that is not supposed to be used for a while are stored in an inexpensive external tape storage or others, thereby being able to leave available the volume in the virtual storage device. This accordingly leaves available the capacity of a storage device for use by any other virtual storage device, and the resources can be thus used with good efficiency.

BRIEF DESCRIPTION OF THE DRAWINGS

FIG. 5 is a diagram showing LUN security information in the first embodiment of the invention;

FIG. 6 is a diagram showing LUN mapping information in the first embodiment of the invention;

FIG. 7 is a diagram showing program control information in the first embodiment of the invention;

FIG. 8 is a diagram showing virtual storage configuration information in the first embodiment of the invention;

FIG. 13 is a diagram showing resource cache memory control information in the first embodiment of the invention;

FIG. 14 is a diagram showing resource task control information in the first embodiment of the invention;

FIG. 16 is a diagram showing storage image data in the first embodiment of the invention;

FIG. 17 is a diagram showing a memory in the first embodiment of the invention;

FIG. 18 is a diagram showing WWN information in the first embodiment of the invention;

FIG. 24 is a flowchart of a WWN change notification reception process in the first embodiment of the invention;

FIG. 25 is a diagram showing WWN change notification information in the first embodiment of the invention;

FIG. 44 is a diagram showing a resource preparation list in the third embodiment of the invention;

FIG. 49 is a diagram showing physical disk control information in the fifth embodiment of the invention;

FIG. 50A is a flowchart of a resource preparation process in the fifth embodiment of the invention;

FIG. 60 is a diagram showing reservation cancel YES/NO information in the seventh embodiment of the invention;

FIG. 66 is a diagram showing program license information in the eighth embodiment of the invention;

FIG. 68 is a diagram showing a host command process in a ninth embodiment of the invention;

DESCRIPTION OF THE PREFERRED EMBODIMENTS

In the below, embodiments of the invention are described.
First Embodiment

Figure 1:
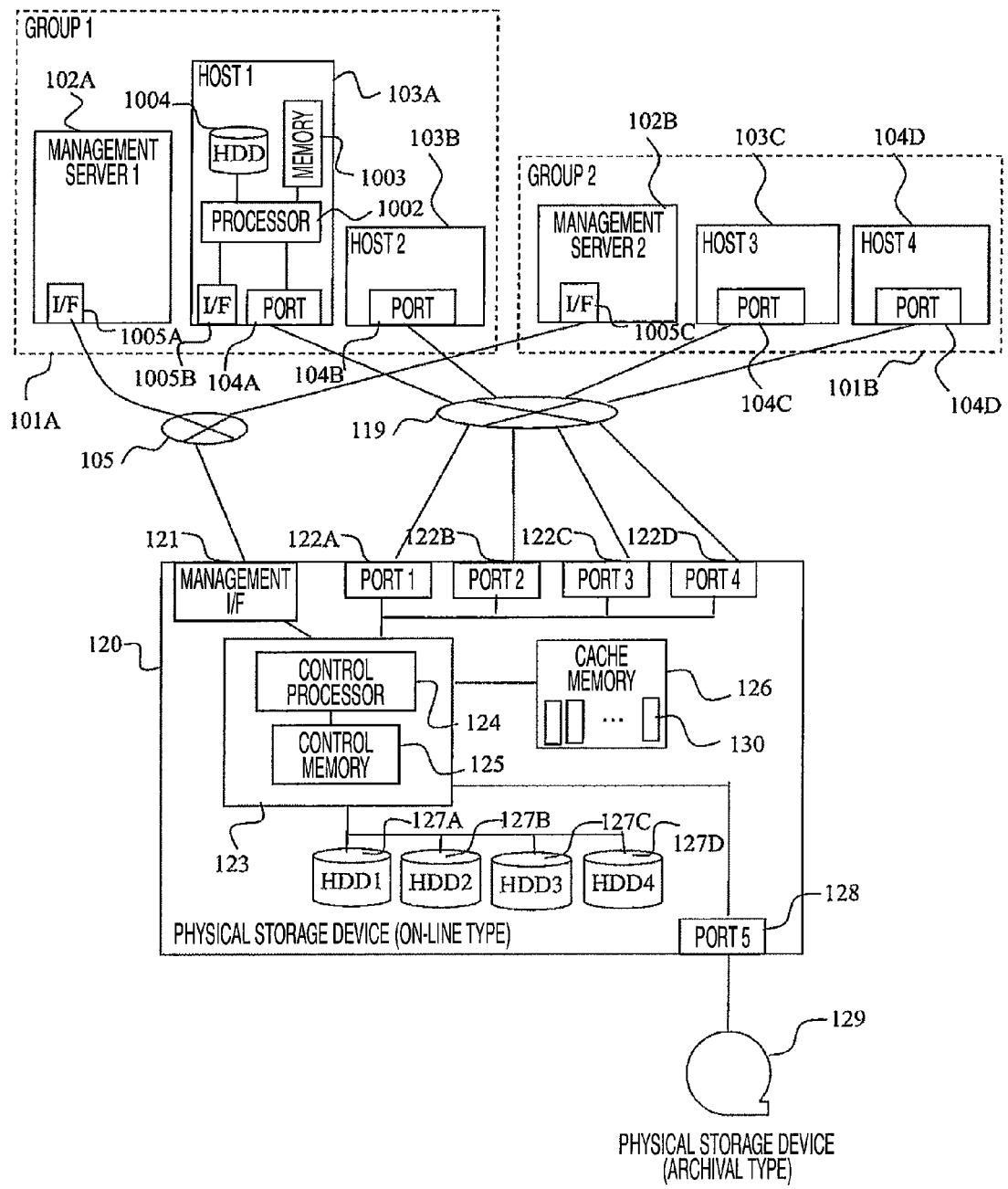
FIG. 1 is a diagram showing the device configuration in a first embodiment of the invention.

FIG. 1 shows the physical configuration of a virtual storage system in a first embodiment of the invention.

A group 101 includes a management server 102, and one or more hosts 103. The group 101 corresponds to a host group in a SAN (Storage Area Network).

The host 103 includes a port 104. The port 104 is implemented by interface such as FC (Fiber Channel) and SATA (Serial Advanced Technology Attachment). The host 103 communicates, from a port 104, with a port 108 of a virtual storage device 106 over a network 119. The host 103 issues a read/write command, i.e., I/O (Input/Output) request, which is forwarded to a physical storage device 120 via the ports 104 and 108 and over the network 119. The physical storage device 120 forwards the resulting data or others to the host 103 via a port 122 and the port 104, and over the network 119.

The host 103 includes a memory 1003 and an HDD (Hard Disk Drive) 1004 both each being a component for storage of information. The host 103 also includes a processor 1002, and an interface (I/F) 1005. The processor 1002 runs a program stored in the memory 1003 and the HDD 1004 based on data stored therein. The I/F 1005 is provided for communications with any other computer and storage device, and is exemplified by LAN (Local Area Network), iSCSI (Internet Small Computer System Interface), and others.

The management server 102 is of the hardware configuration similar to that of the host 103 described above.

The management server 102 communicates, from the I/F 1005 therein, with a management I/F 121 of the physical storage device 120 over a network 105. The management I/F 121 and the network 105 are implemented by LAN and others. The management server 102 forwards, over the network 105, a command or others to the physical storage device 120 for running a program. The program here represents functions of the storage device, e.g., functions of remote copy and local copy. The management server 102 may be provided to each of the groups 101.

The physical storage device 120 includes the management I/F 121. The management I/F 121 is implemented by an interface such as LAN.

The physical storage device 120 includes one or more ports 122. The port 122 is implemented by an interface such as FC.

The physical storage device 120 includes a control section 123. The control section 123 includes a control processor 124, and a control memory 125. The control processor 124 executes various types of processes by referring to various types of programs and data stored in the control memory 125. For example, the control processor 124 processes the read/write command provided by the host 103, or executes a process for finding the correlation between the virtual storage device 106 and the physical storage device 120, for example (will be described later).

The physical storage device 120 includes a physical drive 127. The physical drive 127 is implemented by a nonvolatile memory device such as HDD and SSD (Solid State Drive). With such a nonvolatile memory device, data generally remains intact even when the device is turned OFF. The physical storage device 120 includes a cache memory 126. The cache memory 126 is generally implemented by a RAM (Random Access Memory) or others that enable higher-speed access compared with the physical drive 127. The cache memory 126 includes a plurality of memory slots 130. The program or others to be run by the control processor 124 temporarily stores, into the cache memory 126, data before storage into the physical drive 127, thereby leading to the effects of increasing the speed of data transmission to the host 103.

The physical storage device 120 includes an external connection port 128. By this external connection port 128, the physical storage device 120 communicates with any external storage device. The external connection port 128 is implemented by an interface such as FC. Note here that the external connection port 128 has a function of initiator in the SCSI in comparison with the port 122 having a function of target in the SCSI. With the function of initiator, the physical storage device 120 communicates with an external storage device 129, and can use the storage area of the external storage device 129, i.e., external volume, as an alternative to the storage area of the physical storage device 120, i.e., the physical drive 127.

Also in the above configuration, the management server 102 may forward a command of operation or others through communications with the physical storage device 120 over the network 119. To be specific, the physical storage device 120 may make ready a volume specifically for management use (referred to as command device), and the management server 102 may communicate with the management server 102 through access thereto.

In the virtual storage system in this specification, the functional components configuring the virtual storage device 106 are defined by three hierarchies, i.e., a physical layer, a resource pool, and a virtual layer.

The physical layer is the hierarchy for any physical device such as physical drive. In this specification, the expression of "physical resources" denotes devices in general belonging to this physical layer.

The resource pool is a group of resource volumes. The resource volume is used through allocation to the virtual storage device 106. In this specification, the expression of "resources" denotes logical devices in general belonging to this resource pool. The resources are assigned numbers in the extent of the physical storage device 120, and these numbers are referred to as resource numbers.

The virtual layer is the hierarchy for any resources allocated to the virtual storage device 106. In this specification, the expression of "virtual resources" denotes devices in general belonging to this virtual layer. In the virtual layer, numbers are assigned in the extent of the virtual storage device 106, and these numbers are referred to as virtual resource numbers.

Figure 3:
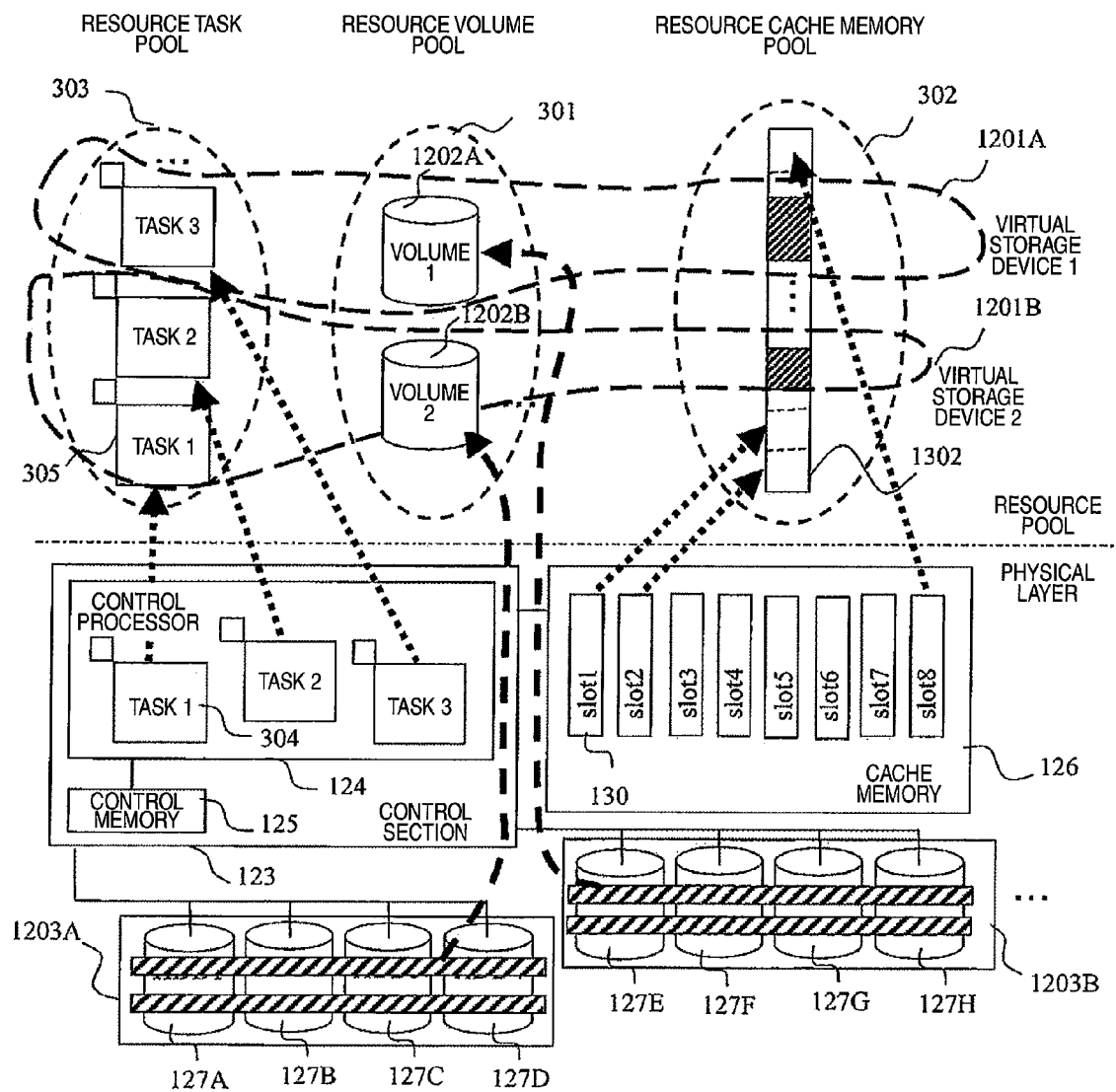
FIG. 3 is a diagram showing how mapping is performed from physical resources to resources, and from the resources to the virtual storage devices in the first embodiment of the invention.

For more details, FIG. 3 shows the relationship between the hierarchy of physical layer and the hierarchy of resource pool in the volume, the cache memory, and the control section, and the relationship between the hierarchy of resource pool and the hierarchy of virtual layer.

Figure 2:
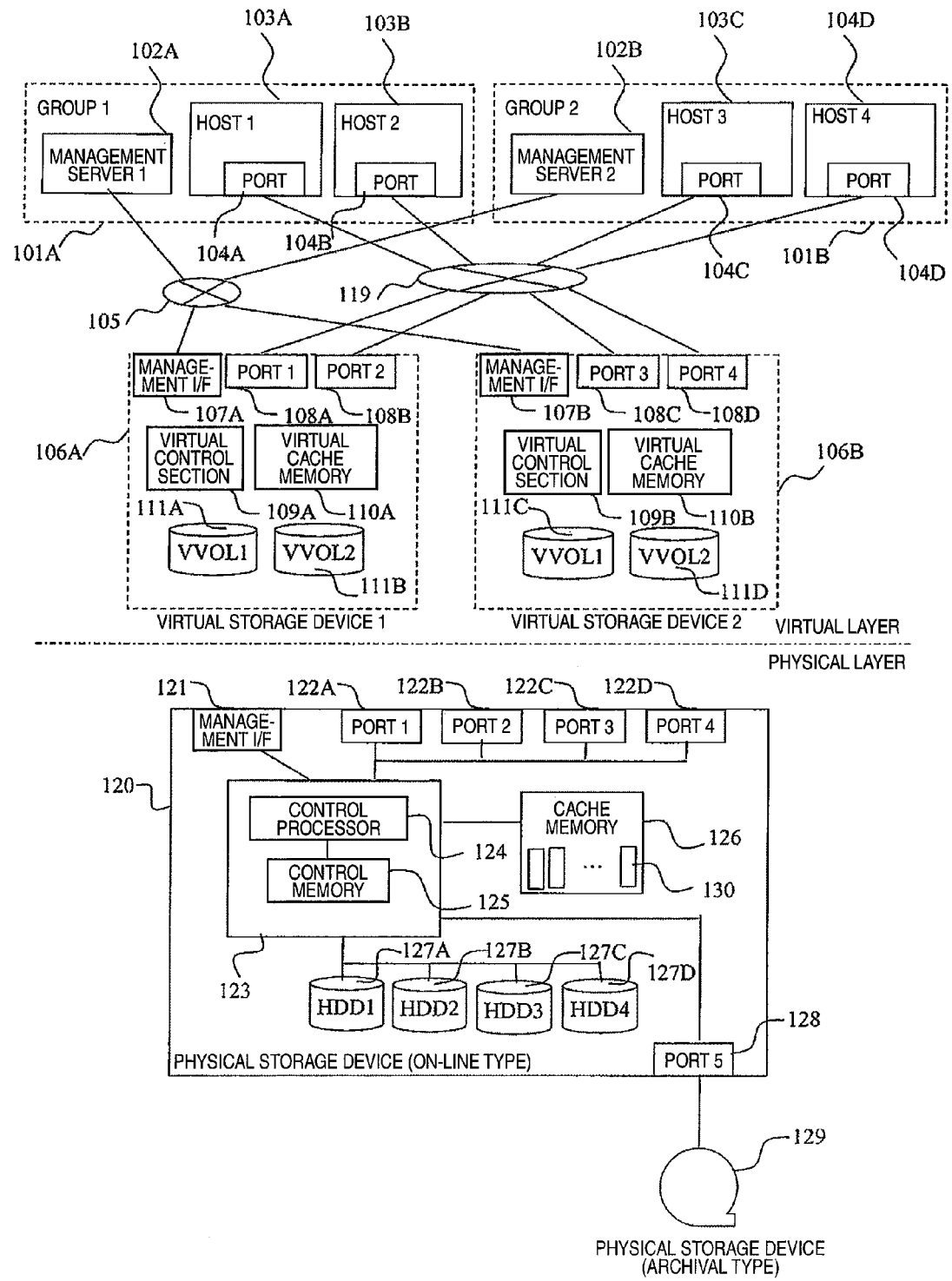
FIG. 2 is a diagram showing virtual storage devices in the first embodiment of the invention.

FIG. 2 shows the correlation between the physical configuration of the virtual storage system and the virtual storage device 106 in the first embodiment of the invention.

In the virtual storage system of the invention, one physical storage device can be used as a plurality of virtual storage devices 106. As such, the virtual storage devices 106 become available for each of the group 101. Moreover, the management server 102 becomes able to perform management on the basis of the group 101. The method for offering a piece of physical storage device as a plurality of virtual storage devices 106 will be described in detail later by referring to FIG. 3. The virtual storage system generally includes a plurality of groups 101.

The virtual storage device 106 includes a management I/F 107. The management server 102 communicates with the management I/F 107 of the virtual storage device 106 over the network 105. The substantial body of the management I/F 107 is the management I/F 121 of the physical storage device 120. The management I/F 107 includes management I/Fs 107A and 107B, which are physically corresponding to a piece of management I/F 121. In FIG. 2, the management server 102 includes management servers 102A and 120B, which respectively access the management I/Fs 107A and 107B. In this case, the management I/F 121 discriminates the management server 102A from the management server 102B using a port number under the same IP (Internet Protocol) address of the Ethernet™. Alternatively, the management server 102A may be discriminated from the management server 102B by using a method for allowing the management I/F 121 to have a plurality of IP addresses.

The management server 102 is provided to each of the groups 101 so that a person in charge of each of the groups can individually manage his or her virtual storage device 106.

The virtual storage device 106 includes the port 108. The port 122 of the physical storage device 120 corresponds to the port 108 in the virtual storage device 106. The port is so equipped as to have a one-to-one relationship with the port 108.

The virtual storage device 106 includes a virtual control section 109. The virtual control section 109 executes the read/write command or others directed to the port 108 from the host. The control section 123 of the physical storage device corresponds to the virtual control section 109 in the virtual storage device 106. The physical storage device 120 allocates, to the virtual control section 109, computation resources of the control processor 124 in the control section 123. The details of such allocation will be described in detail later by referring to FIG. 3.

The virtual storage device 106 includes a virtual volume 111. The virtual volume 111 is a storage area for storage of data provided by the host 103. The detailed correlation between the virtual volume 111 and the volumes in the physical storage device 120 will be described later by referring to FIG. 3.

The virtual storage device 106 includes a virtual cache memory 110. The virtual cache memory 110 temporarily stores data before storage into the virtual volume 111. The virtual cache memory 110 is a storage area generally available for higher-speed access compared with the virtual volume 111. The cache memory 126 of the physical storage device 120 corresponds to the virtual cache memory 110. In the virtual storage system, a storage area of the cache memory 126 is partially allocated to every virtual storage device 106 as the virtual cache memory 110. The details of such allocation will be described in detail later by referring to FIG. 3.

FIG. 3 shows the relationship between the hierarchy of physical layer and the hierarchy of resource pool in the volume, the cache memory, and the control section, and the relationship between the resources and the virtual storage device 106.

Described first is the relationship between the physical resources and the resources.

The RAID (Redundant Array of Independent Disks), i.e., the technology of creating one virtual volume using a plurality of physical drives 127, is generally known. Using such RAID, a resource volume 1202 is created using a plurality of physical drives 127. As an example, the control section of the physical storage section 120 creates a parity group 1203A using four physical drives 127A to 127D, and uses a part of the resulting parity group for allocation as a resource volume 1202A.

The group of the resource volumes 1202 in the physical storage device 120 is a resource volume pool 2701.

The table showing the correlation between the resource volumes 1202 and the parity groups is resource volume control information 3201, which will be described later by referring to FIG. 10.

The physical storage device 120 includes a plurality of memory slots 130. These memory slots 130 are each allocated to an address space in the uniform storage area as a resource cache memory 1302.

The resource cache memory 1302 is identified by a resource cache memory address at the time of allocation to the virtual storage device. The resource cache memory address is defined by such an arithmetic expression as "(memory slot number×storage capacity of memory slot)+address on memory slot". The memory slot number is assigned to every memory slot 130 mounted on the physical storage device 120, and starts from 0. When the memory slot under the memory slot number of 3 with the storage capacity of 256 MB has the address of "0x1000000", the resource cache memory address is "0x31000000".

The group of the resource cache memories 1302 in the physical storage device 120 is a resource cache memory pool 302.

The table showing the correlation between the resource cache memory addresses and the memory slots is resource cache memory control information 902, which will be described later by referring to FIG. 13.

The control processor carries thereon a task 304 of mainly running a program such as I/O process. The task 304 is equivalent in meaning to thread, process, and others in any general OS (Operation System). The control processor 124 starts a predetermined number of tasks in advance. The tasks are each corresponding to a resource task.

The group of resource tasks 305 in the physical storage device 120 is a resource task pool 303.

The table showing the correlation between the resource task numbers and the task numbers is resource task control information 903, which will be described later by referring to FIG. 14.

Described now is the relationship between the resources and the virtual storage device 106.

The virtual volume 111 is virtual resources derived by the resource volume 1202 being allocated to the virtual storage device 1201. The virtual volume number is uniquely assigned to each of the virtual storage devices. When the virtual volume 1202A of a virtual storage device 1201A is under the virtual volume number of 1, for example, a virtual volume 1202B of a virtual storage device 1201B may be also under the virtual volume number of 1.

The table showing the correlation between the resource volumes and the virtual volumes is virtual storage resource management information 821. This table is used to process an I/O request coming from the host, i.e., I/O process. The I/O process will be described in detail later by referring to FIG. 26.

The virtual cache memory is virtual resources derived by the resource cache memory 1302 being allocated to the virtual storage device 1201. The virtual cache memory address is uniquely allocated to every virtual storage device. The virtual cache memory address is represented by a space of any successive storage areas starting from 0, for example. The table showing the correlation between the virtual cache memory addresses and the resource cache memory addresses is virtual storage resource management information 411.

To process the I/O request from the host, through reference of the virtual storage resource management information 411 and physical storage control information 410, the virtual cache memory addresses are searched to find any specific resource cache memory address.

The virtual control section is virtual resources derived by the resource task 305 in the resource task pool 303 being allocated to the virtual storage device 1201. Based on the performance required for the I/O process, for example, a plurality of virtual control sections may be each allocated with a plurality of tasks.

In this embodiment, a predetermined number of tasks are started in advance, and in accordance with any required performance, a plurality of tasks in the resource task pool are allocated to the virtual storage device 106. Considering the fact that the tasks can be assigned priorities with any general OS, as one possible manner of providing a resource task pool, each of the virtual storage devices 106 may be assigned a task, and in accordance with any required performance, the tasks may be assigned priorities.

Figure 4:
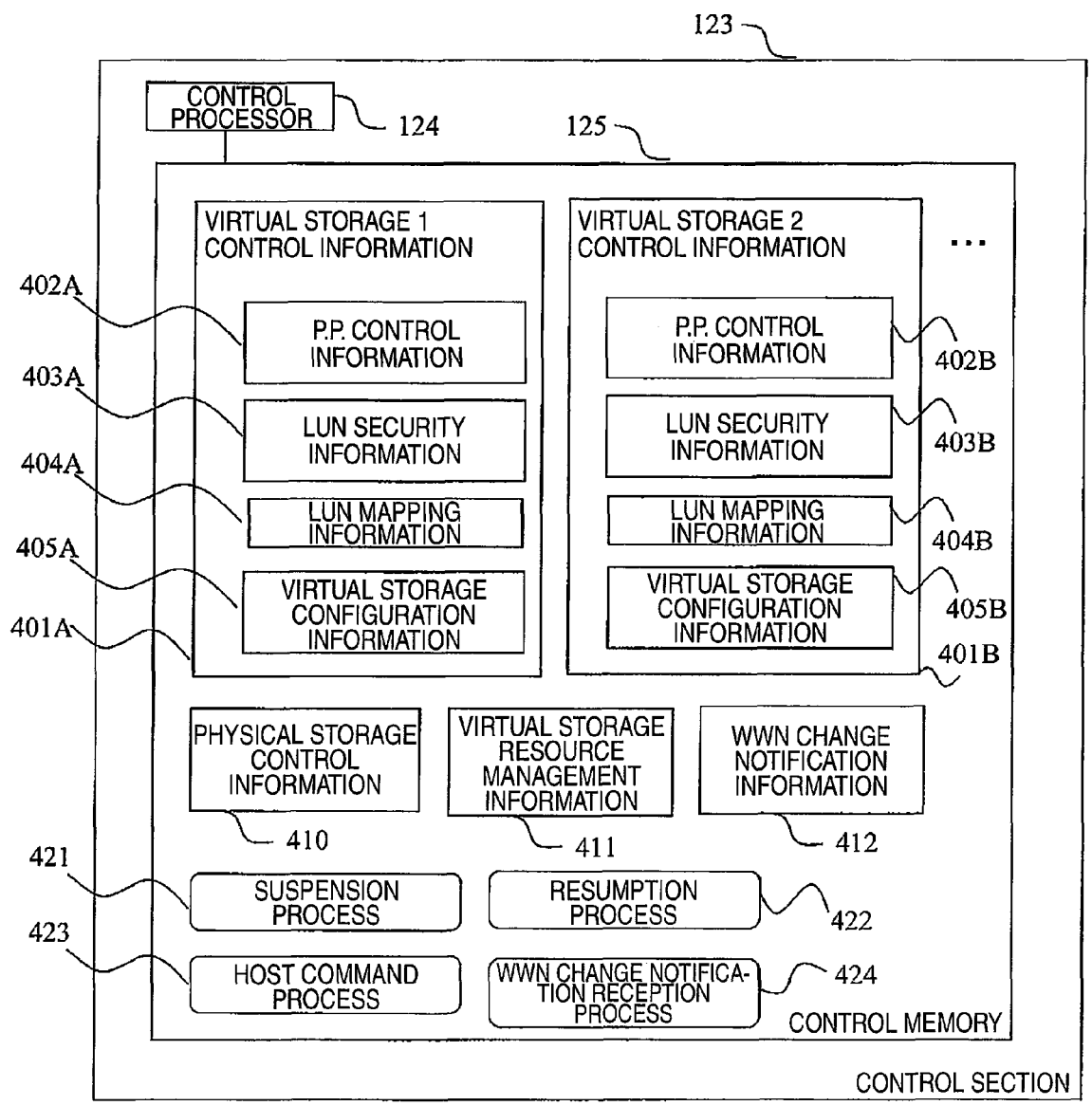
FIG. 4 is a diagram showing a control section in the first embodiment of the invention.

FIG. 4 shows programs and data structure in the control memory 125 to be run by the control processor 124 in the control section 123 of the physical storage deice 120.

The control memory 125 stores therein one or more pieces of virtual storage control information 401, or stores none thereof. The virtual storage control information 401 includes information for use to control each of the virtual storage devices 106 on the physical storage device. The virtual storage control information 401 includes program control information 402, LUN (Logical Unit Number) security information 403, LUN mapping information 404, and virtual storage configuration information 405. Such information will be described in detail later by referring to FIGS. 5 to 8. The virtual storage control information 401 is provided as many as the virtual storage devices 106 on the physical storage device.

The control memory 125 stores therein the physical storage control information 410. The physical storage control information 410 is the group of tables representing the correlation between the resources and the physical resources, for example. The details thereof will be described later by referring to FIGS. 10 to 14.

The control memory 125 also stores therein the virtual storage resource management information 411. The virtual storage resource management information 411 is the table showing the correlation between the resources and the virtual storage devices 106. The details thereof will be described later by referring to FIG. 15.

The control memory 125 also stores therein WWN change notification information 412. The WWN change notification information 412 stores information about the WWN (World Wide Name) of a port on the side of the host at the time of configuration change of the port. The WWN is a port identifier, which is generally uniquely assigned to each of the ports during manufacturing thereof. The details of a change notification on the side of the host will be described later by referring to FIG. 25.

The control memory 125 also stores therein a program of a suspension process 421. The suspension process 421 is executed for resource deallocation by putting any target virtual storage device 106 into a suspend mode. This process is started in response to a command coming from the management server 102, for example. Putting the virtual storage device 106 into a suspend mode herein means to execute a process for turning OFF any components related to the target virtual storage device 106, and to be ready for the process, for example. For more details, a description will be given later by referring to the flowchart of FIG. 27.

The control memory 125 also stores therein a program of a resumption process 422. The resumption process 422 is executed for turning ON any related resources while the target virtual storage device 106 is being in the suspend mode, and to be ready for the process, for example. The resumption process 422 is also a process for allocating the resources to the virtual storage device 106. For more details, a description will be given later by referring to the flowchart of FIG. 29.

The control memory 125 also stores therein a program of a host command process 423. The host command process 423 is executed by the control processor 124. The host command process 423 is executed, in response when the port 122 receives the read/write command from the host, for transferring any corresponding data to the port from the physical disk 127 and the cache memory 126, for example. To be specific, the physical storage device 120 performs such data transfer using a DMA (Direct Memory Access) circuit or others in the control section 123. For more details, a description will be given later by referring to the flowchart of FIG. 28.

The control memory 125 also stores therein a program of a WWN change notification reception process 424. The WWN change notification reception process 424 is a program for executing a process of receiving, from the host, WWN information or others of the port at the time of configuration change thereof on the side of the host. For more details, a description will be given later by referring to the flowchart of FIG. 24.

Described next is the various types of information included in the virtual storage control information 401 by referring to FIGS. 5 to 8.

FIG. 5 shows the data structure of the LUN security information 403.

The LUN security information 403 includes pairs of LUNs 511 and accessible WWNs 512. The LUN security is means for preventing accesses from the ports in any other host groups in the SAN environment, for example, to the LUN in the host group of its own.

In FIG. 5 example, for the host to access the volume of "3" in the LUN 511, the host has to have the port with a WWN of "WWN1", "WWN2", or "WWN3".

FIG. 6 shows the data structure of the LUN mapping information 404.

The LUN mapping information 404 indicates the correlation between the volumes to be accessed by the host, i.e., a LUN 611, and the virtual volumes. The LUN mapping information 404 includes groups of the LUN 611, a virtual storage volume number 612, and LUSE (Logical Unit Size Expansion) information 613.

In FIG. 6 example, for the host to access the volume of "3" in the LUN 611, the virtual volumes of "1", "2", "3" and "4" in the virtual volume number 612 are available for the access by the host. The reason that there are a plurality of virtual volumes for the access by the host is because the LUSE information 613 shows "YES" for the volume. The LUSE is a function of making the host believe that a plurality of volumes are a single piece of big volume. When the host accesses the volume of "3" in the LUN 611, for the host, the volume looks like having the storage capacity being the sum of those of the volumes "1", "2", "3", and "4"

FIG. 7 shows the data structure of the program control information 402.

The program control information 402 is an example for use to control a program in the physical storage device 120. In FIG. 7, the program control information 402 is in the form of a table showing the state of pairs in the general volume copy function.

The program control information 402 includes elements of "P-VOL number 711", "S-VOL number 712", "state of pair 713", and "type of program 714". The element of "P-VOL number 711" indicates the number of a volume being a copy source. This element of "P-VOL number 711" is the LUN. The element of "S-VOL number 712" indicates the number of a volume being a copy destination. This element of "S-VOL number 712" is the LUN. The element of "state of pair 713" indicates the state of the volume pair. When the element of "state of pair 713" shows "during copy", it means that data copy is in progress from the copy-source volume to the copy-destination volume. The element of "type of program 714" indicates the type of program such as "remote copy" and "local copy". Alternatively, the program control information 402 may include any other types of control information, e.g., information about programs of local copy function and remote copy function, for example, and such program control information 402 may be stored in the control memory 125.

FIG. 8 shows the data structure of the virtual storage configuration information 405.

The virtual storage configuration information 405 includes virtual storage configuration information 801 and 802, which each indicate specifications of resources in the virtual storage device 106, e.g., size. The virtual storage configuration information 801 includes elements of "virtual volume number 811" and "size 812", and shows the correlation therebetween in the virtual storage device 106. The virtual storage configuration information 802 includes elements of "number of ports 831", "size of cache 832", and "number of tasks 833". Herein, the port, the cache, and the task are those in the virtual storage device 106.

Such virtual storage configuration information 801 and 802 are referred to when the operation of the virtual storage device 106 is resumed for use to determine which resources are needed for such resumption.

Described next is the physical storage control information 410 by referring to FIGS. 9 to 14.

Figures 9, 10:
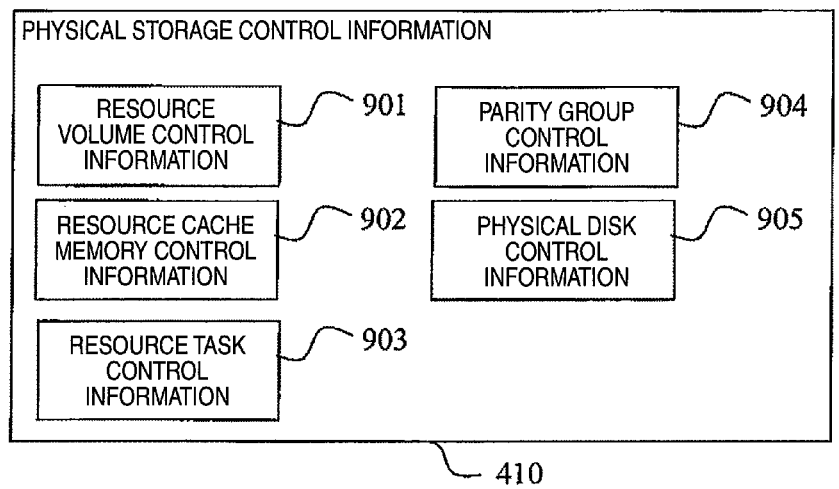
FIG. 9 is a diagram showing physical storage control information in the first embodiment of the invention.
FIG. 10 is a diagram showing resource volume control information in the first embodiment of the invention.

FIG. 9 shows the internal configuration of the physical storage control information 410.

The physical storage control information 410 shows the correlation between the resources and the physical storage device 120, the state of power supply, and others.

The physical storage control information 410 includes resource volume control information 901, resource cache memory control information 902, resource task control information 903, parity group control information 904, and physical disk control information 905. The details of such information are described later by referring to FIGS. 10 to 14.

FIG. 10 shows the data structure of the resource volume control information 901.

The resource volume control information 901 includes elements of, for every resource volume found in an element of "resource volume number 1021", "state of use 1024", "size 1025", "parity group number 1026", "start position 1027", and "external connection information 1028".

The element of "resource volume number 1021" shows numbers uniquely assigned respectively to the resource volumes in the physical storage device.

The element of "state of use 1024" is information indicating whether the resource volume 1202 is being allocated to the virtual storage device 106 or not. The element of "state of use 1024" shows "in use" when the resource volume 1202 is being allocated to the virtual storage device 106, and shows "not in use" when the resource volume 1202 is not yet allocated thereto.

The element of "size 1025" shows the size of the resource volume. In FIG. 10 example, the resource volume under the resource volume number of "1" has the size of "300 GB".

The element of "parity group number 1026" shows the number of a parity group to which the resource volume belongs.

The element of "start position 1027" shows the position where the resource volume starts in the parity group found in the element of "parity group number 1026" for the resource volume. The element of "start position 1027" is indicated by offset from the head address of the parity group.

The element of "external connection information 1028" is used when the physical storage device 120 allocates an external volume of an external storage device 1210 to the resource volume 1202. The external connection information 1028 stores an identifier for uniquely identifying the external volume allocated to the resource volume 1202 when the physical storage device 120 communicates with the external storage device 129 via the port 128. Note that, when the physical storage device 120 allocates a parity group 1203 to the resource volume 1202, the resource volume 1202 is not correlated to the external volume. In this case, the physical storage device 120 stores a value of NULL in the element of "external connection information 1028".

Figure 11:
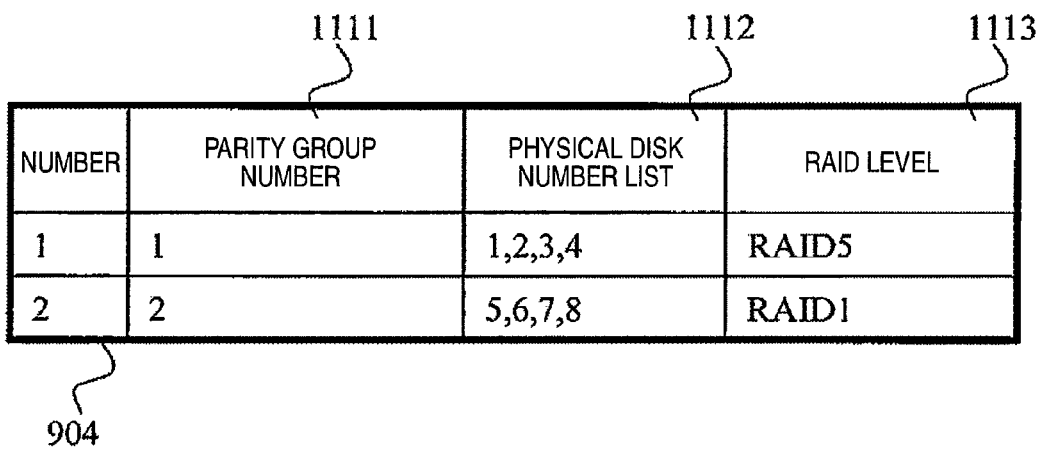
FIG. 11 is a diagram showing parity group control information in the first embodiment of the invention.

FIG. 11 shows the data structure of the parity group control information 904.

The parity group control information 904 includes elements of, for every parity group in the physical storage device, "parity group number 1111", "physical disk number list 1122", and "RAID level 1113".

The element of "parity group number 1111" indicates identifiers each indicating the parity group in the physical storage device.

The element of "physical disk number list 1112" is a list of physical disk numbers assigned to physical disks used by the parity group.

The element of "RAID level 1113" indicates the RAID level of the parity group. In FIG. 11 example, the parity group under the parity group number of "1" uses four physical disks under the physical disk numbers of "1", "2", "3", and "4", and has the RAID level of "RAID5".

Figure 12:
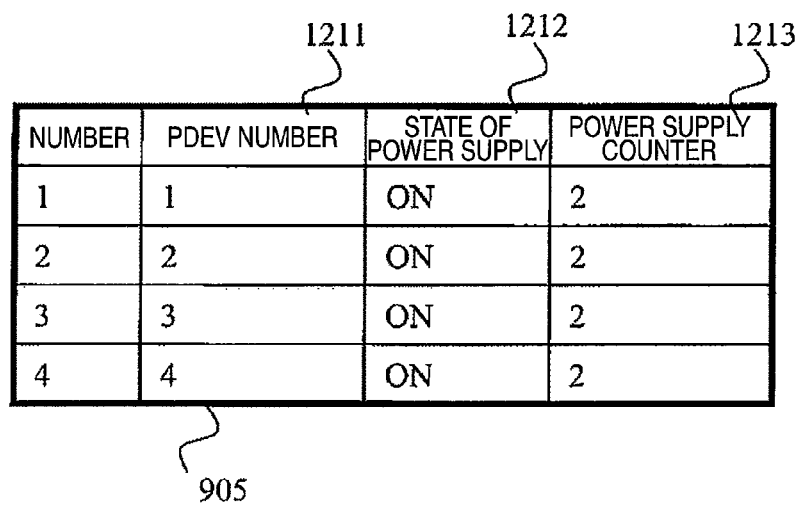
FIG. 12 is a diagram showing physical disk control information in the first embodiment of the invention.

FIG. 12 shows the data structure of the physical disk control information 905.

The physical disk control information 905 includes elements of, for each of the physical disks in the physical storage device, "physical disk number 1211", "state of power supply 1212", and "power supply counter 1213".

The element of "physical disk number 1211" indicates identifiers each indicating the physical disk in the physical storage device.

The element of "state of power supply 1212" indicates the state of power supply of the physical disks. The control processor 124 makes inputs to the element of "state of power supply 1212", i.e., input of "ON" when the physical disk is being turned "ON", and input of "OFF" when the physical disk is being turned OFF.

The element of "power supply counter 1213" indicates, when any of the physical disks is allocated to the virtual storage device 106, the number of the virtual storage devices 106 allocated thereto.

Herein, when the physical storage device 120 manages the power supply on a parity group basis, the parity group control information 904 may include the element of "state of power supply 1212" and the element of "power supply counter 1213", which are currently included in the physical disk control information 905.

FIG. 13 shows the data structure of the resource cache memory control information 902.

The resource cache memory control information 902 includes elements of, for each of the resource cache memories 1302 in the physical storage device, "resource cache memory address 1341", "state of power supply 1342", "state of use 1344", and "memory slot number 1345".

The element of "resource cache memory address 1341" indicates the range of the resource cache memory address for each of the resource cache memories 1302. The element of "resource cache memory address 1341" indicates addresses uniquely allocated to the resource cache memories in the physical storage device.

The element of "state of power supply 1342" indicates the state of power supply of the resource cache memories 1302. The control processor 124 makes inputs to the element of "state of power supply 1342", i.e., input of "ON" when the resource cache memory 1302 is being turned ON, and input of "OFF" when the resource cache memory 1302 being turned OFF.

The element of "state of use 1344" is information indicating whether the resource cache memory 1302 is being allocated to the virtual storage device 106 or not. When the resource cache memory 1302 is being allocated to the virtual storage device 106, the control processor 124 makes an input of "in use" to the element of "state of use 1344", and input of "not in use" when the resource cache memory 1302 is not yet allocated thereto.

The element of "memory slot number 1345" indicates slot numbers each indicating a memory slot corresponding to the resource cache memory 1302.

FIG. 14 is a diagram showing the data structure of the resource task control information 903.

The resource task control information 903 stores elements of, for each of the resource tasks 305 in the physical storage device, "resource task number 1461", "state of power supply 1462", "state of use 1464", "control processor number 1465", and "task number 1466".

The element of "resource task number 1461" indicates identifiers each indicating a resource task 2705 of the physical storage device. The element of "resource task number 1461" shows numbers uniquely assigned respectively to the resource tasks in the physical storage device.

The element of "state of power supply 1462" indicates the state of power supply of the resource tasks 305. When the resource task 305 is being turned ON, the control processor 124 makes an input of "ON" to the element of "state of power supply 1462", and an input of "OFF" thereto when the resource task 305 is being turned "OFF". The element of "state of power supply 1462" is provided to each of the control processors 124.

The element of "state of use 1462" is information indicating whether the resource task 305 is being allocated to the virtual storage device 106 or not. When the resource task 305 is being allocated to the virtual storage device 106, the control processor 124 makes an input of "in use" to the element of "state of use 1464", and an input of "not in use" when the resource task 305 is not yet allocated thereto.

The element of "control processor number 1465" indicates the control processor numbers, which are identifiers for use to identify in which control processor the resource task 305 is operating.

The element of "task number 1466" indicates the number of a task corresponding to the resource task. The element of "task number 1466" shows numbers uniquely assigned respectively to the control processors 124. Note that when the OS operating in the control processors 124 in the physical storage device 120 is of a generally SMP (Symmetric Multi-Processing) type that operates in parallel among a plurality of control processors 124, the element of "task number 1466" may be unique among a plurality of control processors.

Figure 15:
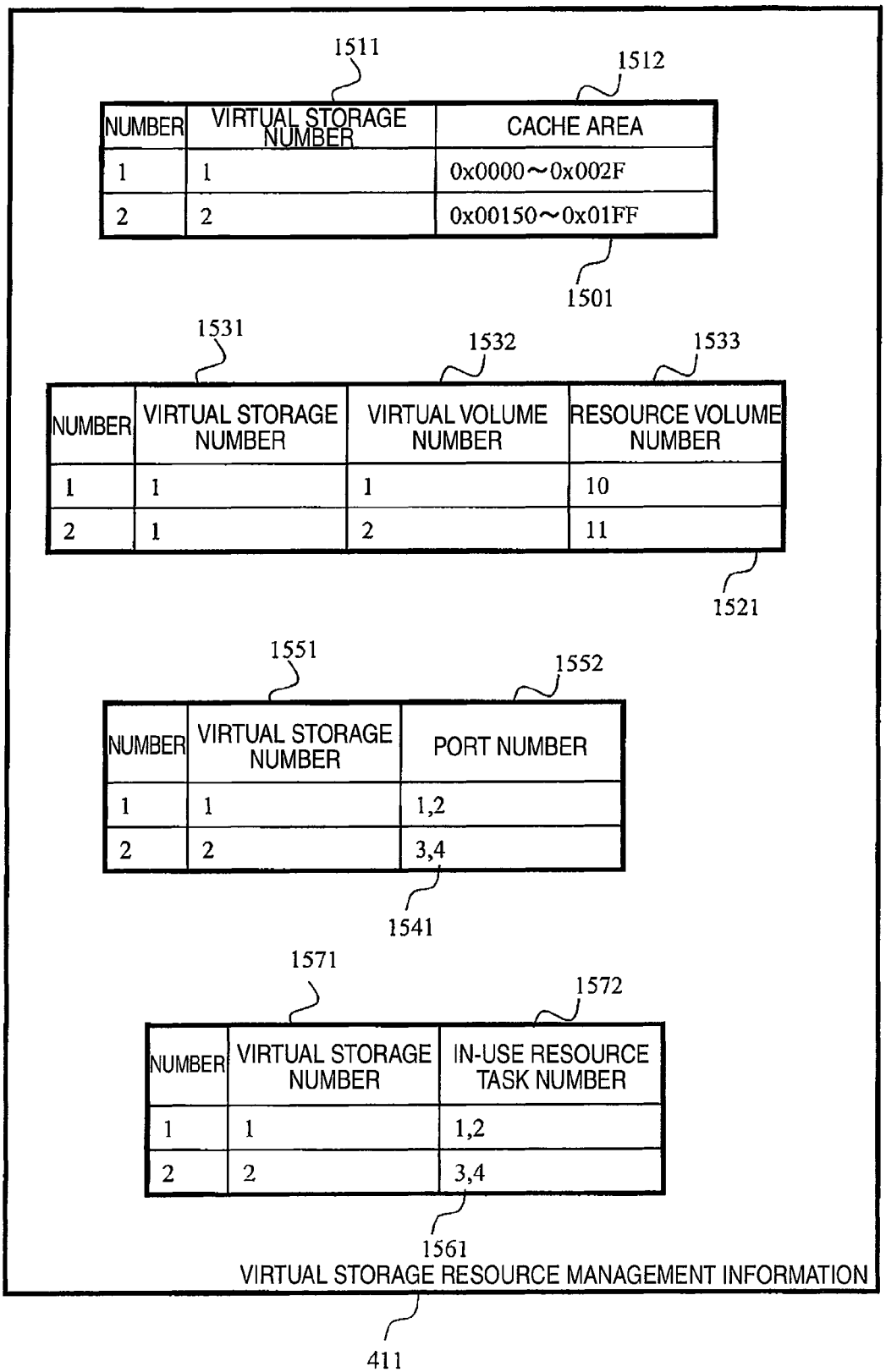
FIG. 15 is a diagram showing virtual storage resource management information in the first embodiment of the invention.

FIG. 15 shows the data structure of the virtual storage resource management information 411.

The virtual storage resource management information 411 includes virtual storage resource management information 1501, 1521, 1541, and 1561, which each indicate the correlation between the resources and the virtual storage devices 106. For example, the virtual storage resource management information 1501 indicates the correlation between elements of "virtual storage device number 1511" and "cache area 1512". The virtual storage resource management information 1521 indicates the correlation among elements of "virtual storage device number 1531", "virtual volume number 1532", and "resource volume number 1533". The virtual storage resource management information 1541 indicates the correlation between elements of "port number 1552" and "virtual storage device number 1551", i.e., indicates which port is belonging to which virtual storage device. The virtual storage resource management information 1561 indicates the correlation between elements of "virtual storage device number 1571" and "in-use resource task number 1572", i.e., indicates which virtual storage device 106 stores which task.

FIG. 16 shows the data structure for storing, as data, every possible state of the virtual storage devices 106, i.e., storage image data 1601.

The storage image data 1601 is stored in the external storage device 129 or others when the virtual storage device 106 is put into a suspend mode. The storage image data 1601 is created for each of the virtual storage devices 106.

The storage image data 1601 includes the virtual storage control information 401, and volume data 1603. The virtual storage control information 401 is the one corresponding to the virtual storage device 106 put into the suspend mode. The volume data 1603 is stored in each of the virtual volumes 111 in the virtual storage device 106 in the suspend mode.

FIG. 17 shows programs in the memory 1003 to be run by the processor 1002 in the host 103 and the management server 102, and the data configuration therein.

The memory 1003 of the host 103 and the management server 103 includes an OS (Operation System 1703), a storage management program 1704, a WWN change notification program 1705, key information 1701, and WWN information 1702.

The storage management program 1704 is used for managing the virtual storage device 106. That is, the storage management program 1704 is used by an operator of the virtual storage device 106 to go through pair operation of the volume copy function, for example.

The OS 1703 mounts the virtual volume 111 of the virtual storage device 106 (will be described later) through control over the port 104. Thus mounted virtual volume is made available as a volume 1109. The OS 1703 provides the volume 1109 as a storage area available for use by an application 1706.

The application 1706 is a program for accessing the volume 1109. The application 1706 may be database software, for example.

The key information 1701 and the WWN information 1702 are both used when the management server 102 changes the WWN of the physical storage device 120.

FIG. 18 is a diagram showing the data structure of the WWN information 1702.

The management server 102 carries the WWN information 1702 on the memory 1003, and refers to the WWN information 1702 when making the virtual storage device 106 to resume operation. The management server 102 then starts the WWN change notification program 1705 for notifying the physical storage device 120 of any change made to the WWN.

The WWN information 1702 includes elements of "host group number 1811", "host number 1812", "host port number 1813", "host WWN 1814", and "change YES/NO 1815".

The element of "host group number 1811" indicates numbers for use by the virtual storage system to identify the host groups 101. The element of "host number 1812" indicates numbers for use to identify the hosts 103 in the host group 101. The element of "host port number 1813" indicates numbers for use to identify the port 104 equipped in each of the hosts 103. The element of "host WWN 1814" indicates the WWN of the port 104 in the host 103. When any change is made to the WWN of the port 104 in the host 103, the management server 102 makes an input of "Yes" to the element of "change YES/NO 1815", and an input of "No" when no change is made thereto.

Figure 19:
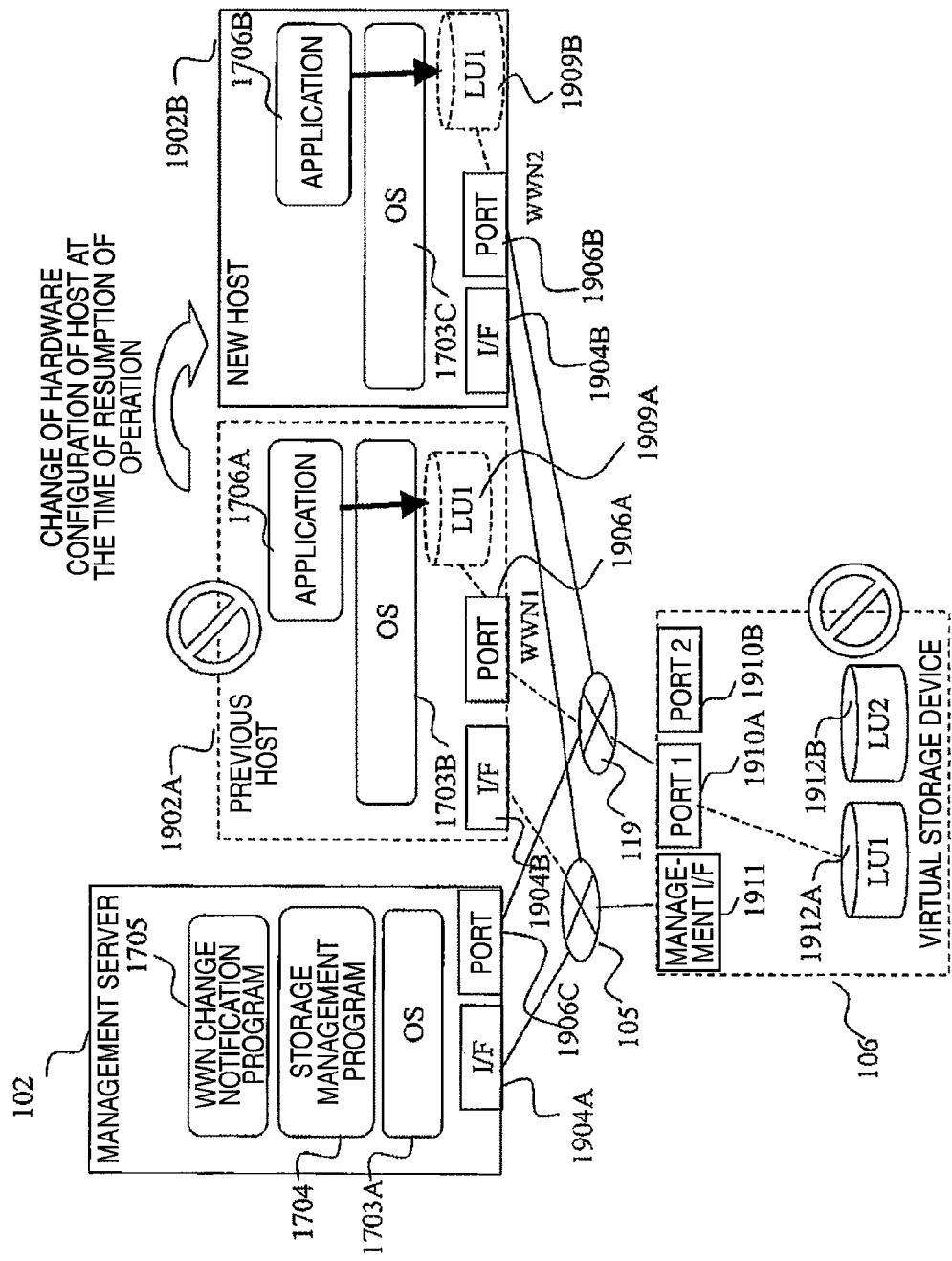
FIG. 19 is a diagram showing the configuration on the side of a host in the first embodiment of the invention.

FIG. 19 is a diagram showing the operation for configuration change on the side of the host.

Assuming here is a case where the virtual storage system is in the state of not being used for a while in a group including a previous host 1902A and the management server 102, and the system is thus temporarily stopped in operation. In this case, for stopping the operation of the host, the operator uses the OS to put the host into a suspend mode or to turn OFF the host. For putting also the virtual storage device 106 into a suspend mode, using the storage management program 1704 of the management server 102, the operator issues a suspension command so that the virtual storage device 106 is put into the suspend mode. For more details of the manner of putting the virtual storage device 106 in a suspend mode, a description will be given later by referring to FIG. 27.

Assumed now is a case where the operation of the virtual storage device 106 is resumed for making the virtual storage system available for use again, and a new host 1902B is used as an alternative to the previous host 1902A that is already discarded. Also the WWN of a port 1906A of the previous host is assumed as being changed to the WWN of a port 1906B of the new host.

The management server 102 uses the WWN notification program 1705 to forward such a change of WWN to the physical storage device 120 before booting up the new host. The WWN notification program 1705 notifies the virtual storage device 106 of the WWN before the change and the WWN after the change. Such a change made to the WWN is notified to a management I/F 1919 from an I/F 1904 over the network 105. Alternatively, the change of the WWN may be notified to a port 1910 from a port 1906 over the network 119. To be specific, the virtual storage device makes ready a virtual volume specifically for the management use (hereinafter, referred to as command device) and the command device is accessed by the management server 102. The details of the operation of the WWN notification program 1705 will be described later by referring to FIG. 22.

Figure 20:
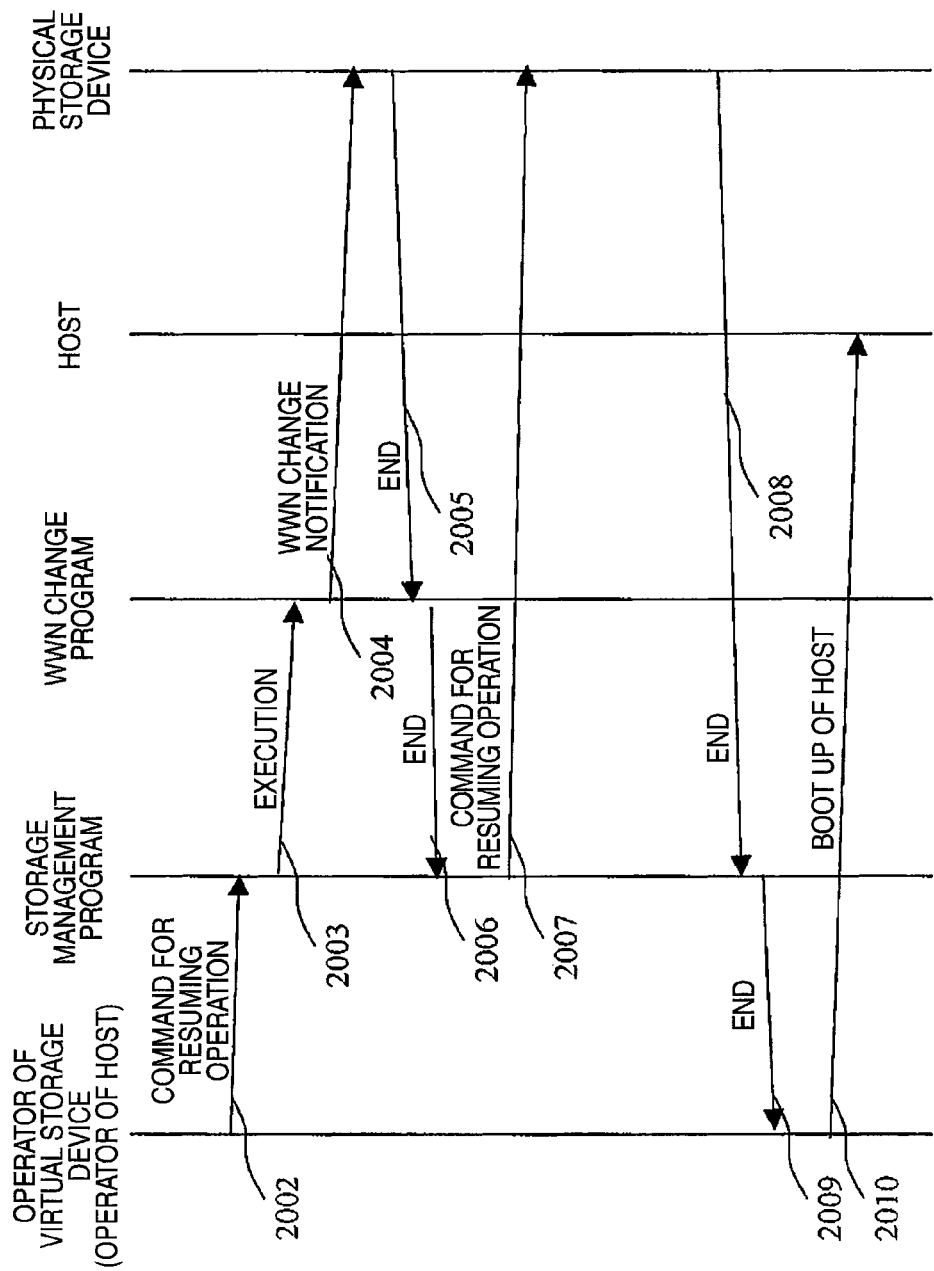
FIG. 20 is a diagram showing the entire procedure of resuming operations in the first embodiment of the invention.

FIG. 20 is a ladder chart showing the operation of resuming the operations in the virtual storage system in its entirety.

First of all, an operator of the virtual storage device 106 issues a command for resuming the operation of the storage device using a GUI (Graphical User Interface) screen 3102 of the management server 102 (2002). The GUI screen 3102 will be described in detail later.

The management server 102 then refers to the WWN information 1702. When the WWN of the host has been changed, the management server 102 executes a WWN notification program from the storage management program (2003).

Using the WWN notification program, the management server 102 transmits a WWN change notification to the physical storage device 120 (2004). The details of such transmission will be described later by referring to FIG. 23.

The physical storage device 120 receives the WWN change notification. After the completion of a WWN change notification reception process (2005, 2006), the management server 102 uses the storage management program to forward a command to the physical storage device 120 for resuming the operation of the virtual storage device 106 (2007).

Upon reception of such a resumption command (2007), the virtual storage device 106 executes the resumption process, and forwards the process result back to the storage management program. The process result indicates whether the resumption process is completed normally or abnormally, and when completed abnormally, the result also indicates the reason. The management server 102 displays, using the storage management program 1702, on the GUI screen 3102 of the management server 102, a message telling the result of the resumption process and the reason if the process is completed abnormally. When the resumption process is completed normally (2008), an operator of the host boots up the host (2010).

Figure 21:
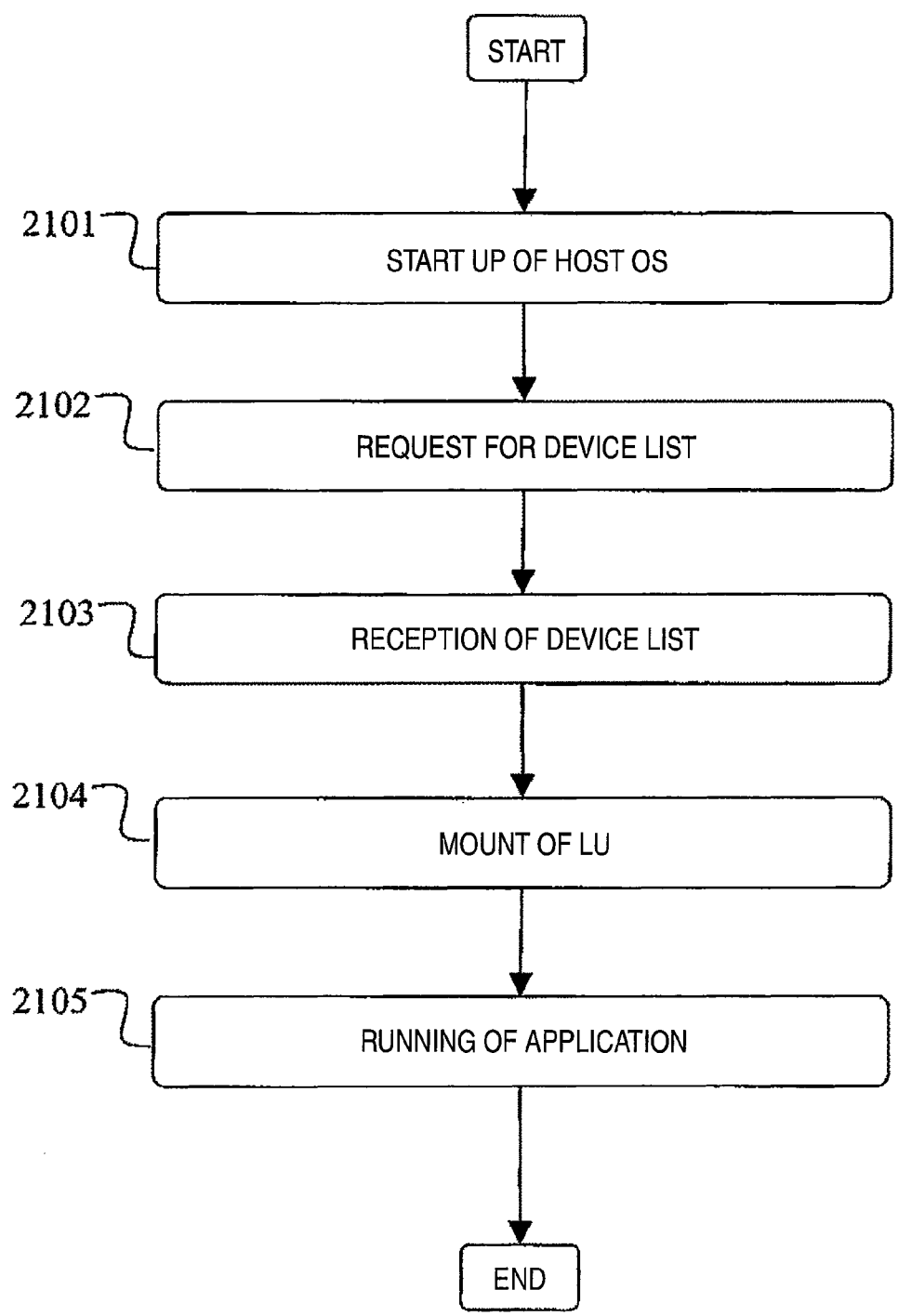
FIG. 21 is a diagram showing the operation flow on the side of the host in the first embodiment of the invention.

FIG. 21 is a flowchart of the operation at the time of boot up the host.

When the operator or others of the virtual storage device 106 turn ON the host 103 or resume the operation thereof, first of all, the host 103 starts up an OS 1103 (step 2101). The host 103 generally stores the OS 1703 in the HDD 1004 of a host 1902, for example. When being started up, the host copies the OS 1703 from the HDD 1004 therein onto the memory 1003, and the processor 1002 runs the OS 1703 on the memory 1003. The host 103 generally makes initial settings to hardware by starting up the OS 1703.

The host then makes a request for a device list to the port 122 of the physical storage device 120 (step 2102). The device list indicates LUs accessible by the host. When making a request for the device list as such, the host 103 notifies the physical storage device 120 of the WWN of the port 104. The WWN is an identifier for use by the physical storage device 120 to uniquely identify the port 104.

The host 103 then receives the device list from the physical storage device 120 (step 2103).

The host 103 then mounts the LUs of thus received device list as volumes (step 2104). Mounting the LUs as volumes as such is equivalent in meaning to a function of volume mounting in any general OS. After such Mounting, the LUs become available for reading/writing from/to the volumes from the application operating on the host 103.

The host 103 then starts the application (step 2105).

Figures 22, 23:
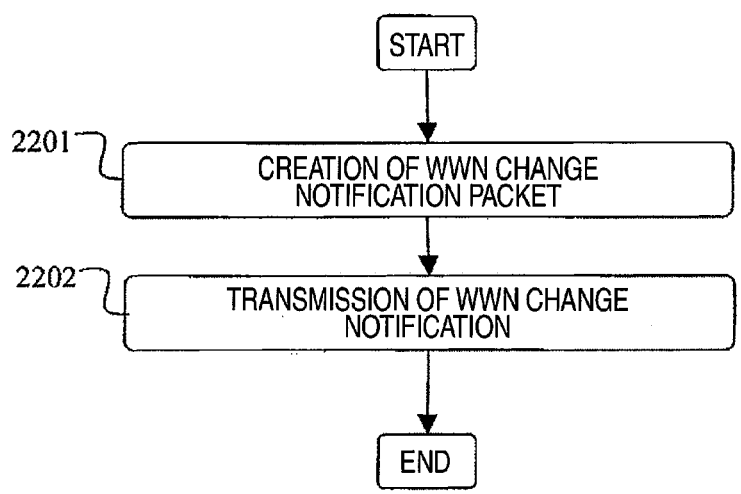
FIG. 22 is a diagram showing a WWN change notification program in the first embodiment of the invention.
FIG. 23 is a diagram showing a WWN change notification packet in the first embodiment of the invention.

FIG. 22 is a flowchart of the operation of the WWN change notification program.

Using the storage management program 1704, the management server 102 invokes the WWN change notification program 1705 when issuing the resumption command through the GUI screen 3102. At this time, the management server 102 designates the number of the virtual storage device being a target for resumption of operation, and the WWNs before and after the change input through the GUI screen 3102.

When the storage management program 1102 runs the WWN change notification program 1705, the management server 102 creates a WWN change notification packet 2301 (step 2201). The WWN change notification packet 2301 will be described in detail later.

The management server 102 forwards the WWN change notification together with thus created WWN change notification packet 2301 (step 2202).

FIG. 23 is a diagram showing the data structure of the WWN change notification packet 2301.

The WWN change notification packet 2301 includes elements of "virtual storage device number 2311", "after-change WWN 2312", "before-change WWN 2313", and "key information 2314".

The management server 102 creates the WWN change notification packet 2301 using the WWN change notification program 1107.

The management server 102 makes inputs to the WWN change notification packet 2301, i.e., to the elements of "virtual storage device number 2311", "after-change WWN 2312", and "before-change WWN 2313". The virtual storage device to be input into the element of "virtual storage device number 2311" is the one being a target for resumption operation, and the inputs are those received by the WWN change notification program from the storage management program. The management server 102 also inputs, to the WWN change notification packet 2301, the key information 1701 stored on the memory 1003 corresponding to the number in the element of "virtual storage device number 2311", thereby completing the WWN change notification packet 2301.

FIG. 24 is a flowchart of a WWN change notification reception process 424 to be executed by the physical storage device 120.

The physical storage device 120 executes the WWN change notification reception process for receiving a notification from the WWN change notification program 1705 to be run on the side of the host 103.

Upon reception of the WWN change notification by the WWN change notification program 1705 (step 2401), the physical storage device 120 executes an authentication process (step 2402). With the authentication process, the physical storage device 120 becomes able to securely make a change to the WWN. That is, the purpose of the physical storage device 120 executing the authentication process is to allow only any authenticated host(s) to make settings of WWN. The physical storage device 120 receives the key information stored by the WWN change notification program 1705 on the side of the host in step 2401, and authenticates the key information by checking it against the key information stored on the side of the storage. For authentication of key information as such, any generally-known manner may be used, e.g., using hash function. Alternatively, when the management server 102 logs in the GUI screen 3101, the operator of the virtual storage device may be authenticated, and the management server may be limited to access the management I/F 1111. If this is the case, there is no need to execute the authentication process using the key information as described above at the time of running the WWN notification program 1705 because the authentication process is already done therebefore with the GUI screen of the management server.

When the authentication process in step 2402 is completed with success (Y in step 2403), the WWN change notification information 212 is rewritten. To be specific, the control processor 124 makes an addition to WWN change notification information 252, i.e., the details of the LUN and the after-change WWN received in step 2401 of the WWN change notification reception process together with the number of the target virtual storage device and the port number of the received port. When the management server 102 fails to complete such authentication in the WWN change notification reception process (N in step 2403), this is the end of the process.

As such, the authentication process in step 2402 allows only the management server 102 having a key to change the WWN so that the WWN can be changed securely.

FIG. 25 is a diagram showing the WWN change notification information 252.

The physical storage device 120 stores, in the WWN change notification information 252, the WWN change notification notified by the side of the host, i.e., the result of the WWN change notification reception process 424. The WWN change notification information 252 includes elements of "virtual storage device number 2511", "port number 2512", "LUN 2513", "change notification YES/NO 2514", "after-change WWN information 2515", and "before-change WWN information 2516". The element of "virtual storage device number 2511" indicates numbers of the virtual storage devices each including a volume being a target for a change of WWN. The element of "port number 2512" indicates the port to which the volume being a target for a change of WWN belongs. The element of "LUN2513" indicates the volume being a target for a change of WWN. The element of "change notification YES/NO 2514" is provided with an input of "Y" when a change notification has been provided by the host, and an input of "N" when no change notification has been provided. The element of "after-change WWN information 2515" is provided with an input of after-change WWN when the change notification has been provided by the host. When receiving the change notification from the host, the physical storage device 120 makes an input of before-change WWN to the element of "before-change WWN information 2516".

Figure 26:
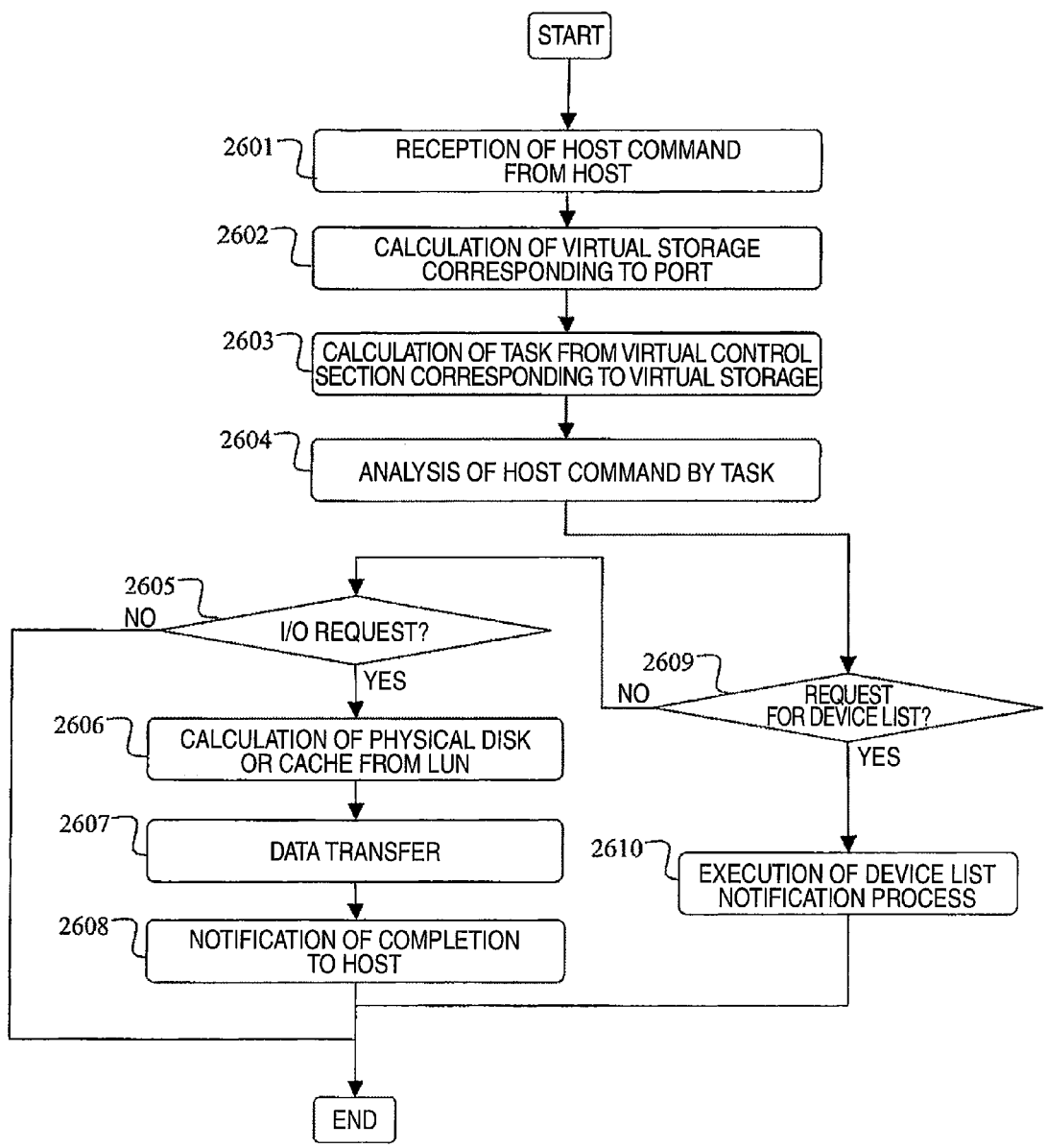
FIG. 26 is a flowchart of a host command process in the first embodiment of the invention.

FIG. 26 is a flowchart of the operation of a host command process 423.

When receiving a host command from the host, the physical storage device 120 executes the host command process 423 (step 2601). To be specific, a protocol control circuit or others equipped in the control processor 124 or the port 122 check the state of the port 122, thereby acknowledging that the host command has been received. In response thereto, the host command process 423 is started. The physical storage device 120 refers to the virtual storage resource management information 1541, and calculates the number of the virtual storage device corresponding to the port (step 2602). The physical storage device 120 then refers to the virtual storage resource management information 1561, and calculates a task from the virtual control section corresponding to the virtual storage device 106 (step 2603).

The following steps are to be executed by the tasks being the computation resources allocated to each of the virtual storage devices 106. This is aimed to, by the virtual storage devices 106 individually having the computation resources for the host command process as such, reduce as much as possible any possible influence over the performance capabilities among the virtual storage devices. Herein, until calculation of task in step 2603, the task operating on any specific control processor 124 takes charge of the calculation.

The physical storage device 120 then analyzes the host command provided by the host (step 2604). To be specific, the physical storage device 120 analyzes the type of the host command, to which LUN the host command is directed, and others.

When the type of the host command is analyzed as being a request for a device list (Y in step 2609), the physical storage device executes a device list notification process (step 2610). The device list notification process is executed as below. That is, the host 103 transmits a log-in request. The physical storage device 120 then receives the WWN of a port transmitted by the host 103. The physical storage device 120 then refers to the LUN security information 403 of the virtual storage device 106 corresponding to thus received port 122, and to the host, transmits the port number and the identifier(s) of LU(s) accessible by the WWN provided by the host, i.e., device list being the list of LUNs. These are the process details of the device list notification process.

As a result of the analysis in step 2604, when the type of the host command is not a request for a device list (N in step 2609) but is an I/O request (Y in step 2605), the I/O process is executed. The I/O process is executed as below. That is, for the purpose of enhancing the performance of the I/O process, in the control section 123, any frequently-accessed data is stored in the cache memory. The control section 123 keeps track of storage of data, i.e., data in which storage area is stored on the cache memory. When the cache memory does not carry thereon any specific data, i.e., cache miss, the control section 123 refers to the LUN mapping information 404 using the LUN being the analysis result in step 2604, and checks the element of "virtual volume number 612" to see which is the target virtual volume. The control section 123 also refers to the virtual storage resource management information 1521, and checks the element of "resource volume number 1533" to see which resource volume. The control section 123 also refers to the physical storage control information 410, and checks the element of "parity group control information 904" to see the physical position of the resource volume checked by referring to the element of "resource volume number 1533". When the cache memory carries thereon the specific data, i.e., cache hit, the control section 123 refers to the virtual storage resource management information 1501, and checks the element of "cache area 1512" to see which cache area. The control section 123 also refers to the resource cache memory control information 902, and checks the element of "memory slot number 1345" to see which memory slot is located at the physical position corresponding to the cache area, and find offset (step 2606). When a write command comes, the control section 123 performs data transfer from the side of the host to the physical position designated in step 2606. When a read command comes, the control section 123 performs data transfer from the physical position designated in step 2606 to the side of the host (step 2607). After the completion of data transfer as such, the physical storage device 120 forwards a completion message to the host (step 2608). This is the end of the I/O process.

In the host command process described as above, steps 2601 to 2603 may be executed by the control processor 124 of the control section 123, or by the protocol control circuit equipped in the port 122.

Figure 27:
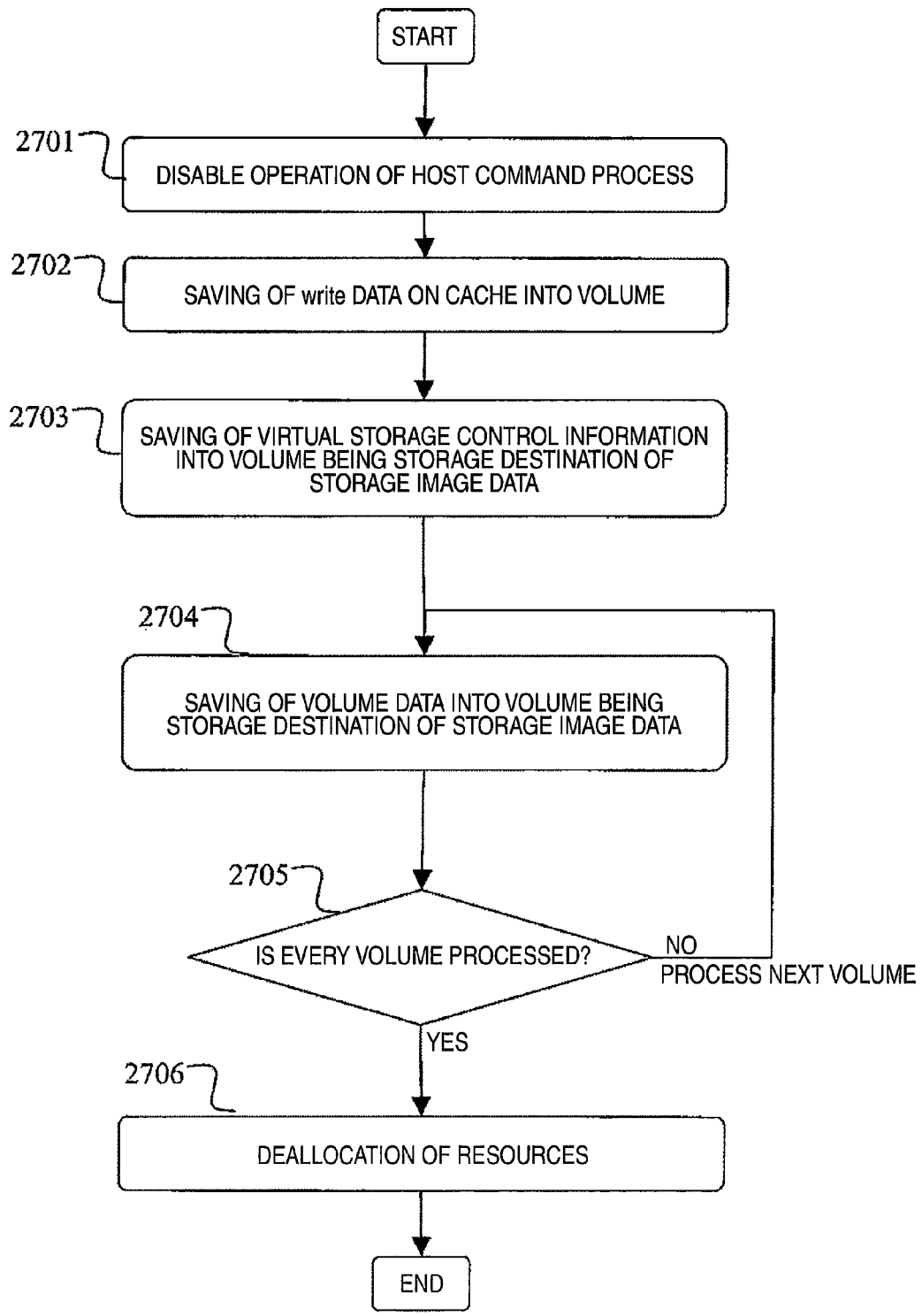
FIG. 27 is a flowchart of a process for putting a virtual storage device into a suspend mode in the first embodiment of the invention.

FIG. 27 is a flowchart of the suspension process 421, showing the operation of the virtual storage device 106.

An operator of the virtual storage device 106 issues a suspension command through the GUI of the management server 102. The management server 102 then transmits the suspension command to the virtual storage device 106 over the network 105 and via the management I/F 107. In response thereto, the suspension process 421 is started to the virtual storage device 106.

When the suspension process 421 is started, the physical storage device 120 disables the command process, i.e., neglects any command coming from the host 103 (step 2701).

The physical storage device 120 then saves write data on the cache memory to a volume (step 2702). This is because the cache memory is implemented by a nonvolatile memory such as RAM. When the write data on the cache memory is not reflected to a disk, if the cache memory is turned OFF, the write data on the cache memory is volatilized and thus cannot be restored.

The physical storage device 120 then stores the virtual storage control information 201 into the physical storage device 129 being a storage destination of the storage image data 1601 (step 2703).

The physical storage device 120 then stores the volume data into the physical storage device 129 being the storage destination of the storage image data 1601 (step 2704).

All of the virtual volumes found in the virtual storage device 106 being a suspension target are subjected to step 2704 (step 2705).

After every virtual volume found in the suspension-target virtual storage device 106 is through with execution of step 2704, a resource deallocation process is executed (step 2706).

After the virtual storage device 106 is put in the suspend mode, the physical storage device 129 may be turned OFF.

Figure 28:
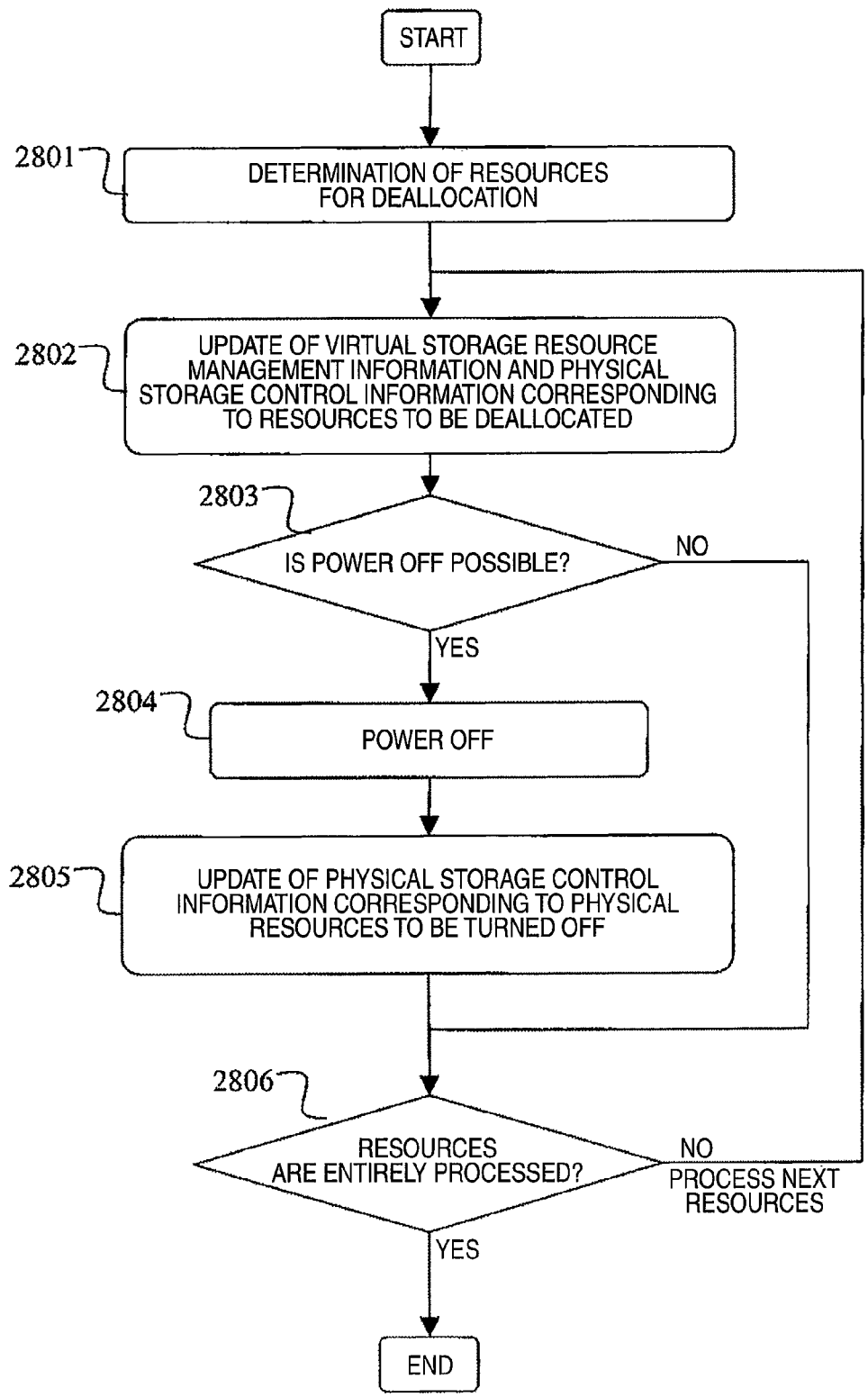
FIG. 28 is a flowchart of a resource deallocation process in the first embodiment of the invention.

FIG. 28 is a flowchart of the resource deallocation process in the suspension process, showing the operation of the virtual storage device 106.

When the resource deallocation process is started, first of all, the physical storage device 120 determines which resources are to be deallocated (step 2801). To be specific, the control processor 124 refers to the virtual storage resource management information 411. The control processor 124 then determines, for deallocation, the resources allocated to the number of the virtual storage device being the suspension target.

The control processor 124 then updates the virtual storage resource management information 411 and the physical storage control information corresponding to the resources to be deallocated (step 2802). To be specific, the following three steps are to be executed:

1. the control processor 124 makes an input of "not in use" to the element of "state of use" in the control information of the resources being a target for deallocation, i.e., the resource volume control information 3201, the resource cache memory control information 902, and the resource task control information 903, 2. in the virtual storage resource management information 411, the control processor 124 deletes any element corresponding to the resources to,be deallocated under the number of the virtual storage device being the suspension target, and 3. when the resources to be deallocated are a resource volume, first of all, the control processor 124 refers to the resource volume control information 901, and checks the element of "parity group number 1026" therein corresponding to the resources. The control processor 124 then refers to the parity group control information 904, and checks the element of "physical disk number list 1112" therein corresponding to the parity group. For the physical disk number(s) found in the element of "physical disk number list 1112", the control processor 124 then refers to the physical disk control information 905, and changes the value therein to a value derived by subtracting 1 from the value in the element of "power supply counter 1213".

The physical storage device 120 then checks whether the resources to be deallocated can be individually turned OFF or not (step 2803).

To be specific, first of all, the control processor 124 finds physical resources corresponding to the resources to be deallocated.

When the resources to be deallocated are a resource cache memory, the control processor 124 refers to the resource cache memory control information 902, and checks the element of "memory slot number 1345" for the physical resources corresponding to the resources. The control processor 124 then checks whether the element of "state of use 1344" for thus found memory slot number(s) shows entirely "not in use" or not. Only when the element of "state of use 1344" entirely shows "not in use", the physical resources can be turned OFF.

When the resources to be deallocated are a resource task, the control processor 124 refers to the resource task control information 903, and checks the element of "task number 1466" for the physical resources corresponding to the resources. The control processor 124 then refers to the element of "control processor number 1465" corresponding to the task number, and checks whether the element of "state of use 1464" entirely shows "not in use" under the control processor number(s) 1465 found as such. Only when the element of "state of use 1464" entirely shows "not in use", the physical resources can be turned OFF.

When the resources to be deallocated are a resource volume, first of all, the control processor 124 refers to the resource volume control information 901, and checks the element of "parity group number 1026" corresponding to the resources. The control processor 124 then refers to the parity group control information 904, and checks the element of "physical disk number list 1112" for the parity group. The control processor 124 then refers to the physical disk control information 905 for the physical disk number(s) found in the element of "physical disk number list 1112". The control processor 124 thus sets, as a target for power OFF, only any physical drive showing 0 in the element of "power supply counter 1213".

As an additional description, when power ON the target physical resources, the control processor 124 adds 1 to the value in the element of "power supply counter 1213". When the value in the element of "power supply counter 1213" indicates 0, it means that the physical resources are not allocated to any of the virtual storage devices 106. For more details, a description is given later by referring to the flowchart of a resource preparation process in FIG. 26. In step 2805 in the resource deallocation process and in step 3007 in the resource preparation process that will be described later, the physical storage device 120 updates the element of "power supply counter" or the element of "state of use" in such a manner as to indicate whether there is any virtual storage device 106 using the resources.

When the physical resources are a target for power OFF (Y in step 2803), the power is accordingly turned OFF (step 2804). To be specific, if with a hard disk, the process for power OFF may be implemented by a spin-down process or by complete power OFF.

When the physical resources are not a target for power OFF (N in step 2803), the procedure goes to step 2806.

The control processor 124 then updates the physical storage control information corresponding to the physical resources to be turned OFF (step 2805).

To be specific, when the physical resources to be turned OFF is a memory slot, the control processor 124 makes an input of "OFF" to the element of "state of power supply 1342" in the resource cache memory control information 902 under the target memory slot number in the element of "memory slot number 1345".

When the physical resources to be turned OFF are a physical drive, the control processor 124 makes an input of "OFF" to the element of "state of power supply 1212" in the physical disk control information 905 under the target physical disk number.

When the physical resources to be turned OFF are the control processor 124, the control processor 124 makes an input of "OFF" to the element of "state of power supply 1462" in the resource task control information 903 under the target control processor number in the element of "control processor number 1465".

When the resources are not yet entirely processed (N in step 2806), the procedure starts from step 2802 to process the next resources. After the resources are entirely processed (Y in step 2806), this is the end of the procedure.

The control section 123 is provided with a control circuit that can turn ON the control processor 124. For resuming the operation of the storage device, the management server communicates with the control circuit, and firstly turns ON the control processor 124. The control processor 124 then turns ON any related resources, e.g., physical drive. For putting the storage device into a suspend mode, the control processor 124 turns OFF any related resources, e.g., physical drive, and the control processor 124 then turns itself OFF.

Alternatively, one or more control processors may be allocated for use in advance, and such allocated control processor (s) may be excluded from the target list for power OFF, thereby allowing resumption of operation.

Figure 29:
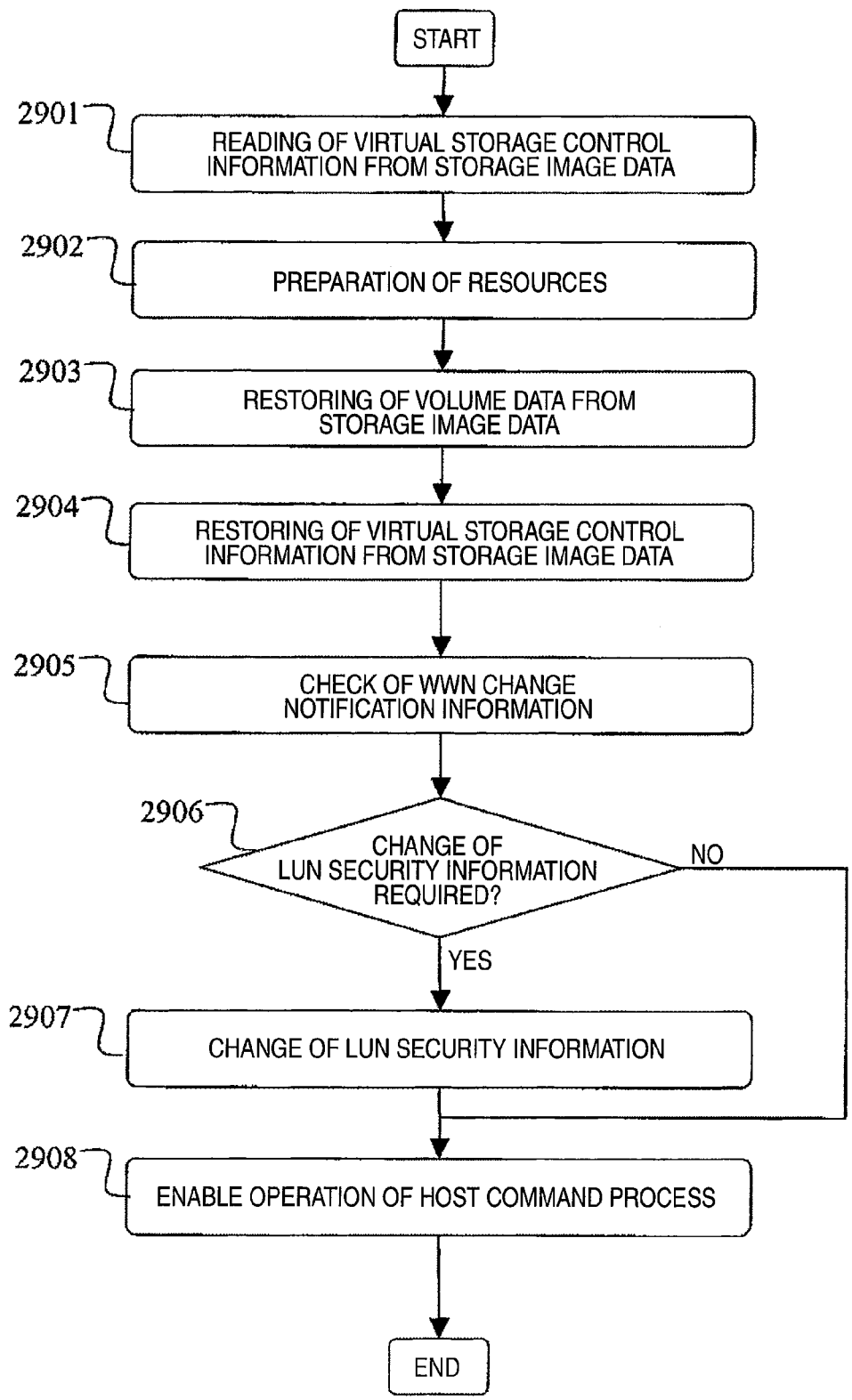
FIG. 29 is a flowchart of a process for resuming the operation of the virtual storage device in the first embodiment of the invention.

FIG. 29 is a flowchart of the resumption process 422, showing the operation of the virtual storage device 106.

An operator of the virtual storage device 106 issues a resumption command through the GUI of the management server 102. The management server 102 then transmits the resumption command to the virtual storage device 106 over the network 105 and via the management I/F 107. In response thereto, the resumption process 422 is started to the virtual storage device 106.

When the resumption process is started, first of all, the physical storage device 120 reads, onto the control memory 125, the virtual storage control information from the storage image data 1601 stored in the physical storage device 129 or others (step 2901). When the physical storage device 129 is turned OFF to be put into a suspend mode, for reading the virtual storage control information 401 onto the control memory 125, the physical storage device 120 turns ON the physical storage device 129.

The physical storage device 120 then makes resources ready (step 2902). Such a resource preparation process will be described later by referring to another flowchart. After the completion of the resource preparation process, the resources in the virtual storage device 106 are turned ON, thereby making the virtual volume or others available for use.

The physical storage device 120 then restores the volume data from the storage image data 1601 to the virtual volume (step 2903).

Next, the physical storage device 120 restores the virtual storage control information from the storage image data 1601 to the control memory 125 (step 2904).

The physical storage device 120 then checks the WWN change notification information 412 (step 2905). The WWN change notification information 412 is the one to be notified to the physical storage device 120 when any change made to the WWN of the port 104 is detected in the host 103.

When the LUN security information 403 is needed to be changed (Y in step 2906), the WWN is changed in the LUN security information 403 (step 2907). To be specific, in the WWN change notification information 412, the physical storage device 120 refers to the element of "change notification YES/NO 2514" under the number of the target virtual storage device. For any device number showing "Y" in the element of "change notification YES/NO 2514", the WWN in the element of "after-change WWN 2515" is changed to the WWN of the LUN security information 403.

The physical storage device 120 then enables the operation of the host command process (step 2908). To be specific, the physical storage device 120 becomes able to acknowledge the reception of the host command by the control processor 124, the protocol control circuit equipped in the port 122, and others starting to check the state of the port. When there is no need to make any change to the command request coming from the host or to the LUN security information 403 (N in step 2906), the procedure goes to step 2908.

As described above, in the first embodiment, using the WWN change notification program 1705, the host 1902 notifies a new WWN to the physical storage device 120. Then in step 2907, the physical storage device 120 updates the WWN of the previous port in the LUN security information 403 to the WWN of the new port. As a result, in the device list notification process (step 2610), the physical storage device 120 becomes able to forward, to the host 1902, as to the new WWN, the device list having the same contents as the device list that has been forwarded to the host 1902 before the virtual storage device 106 is put into a suspend mode. As such, even when the WWN is changed after the virtual storage device 106 is put into a suspend mode, the host 1902 can access the same volume that has been accessed before the virtual storage device 106 is put into a suspend mode.

Figure 30:
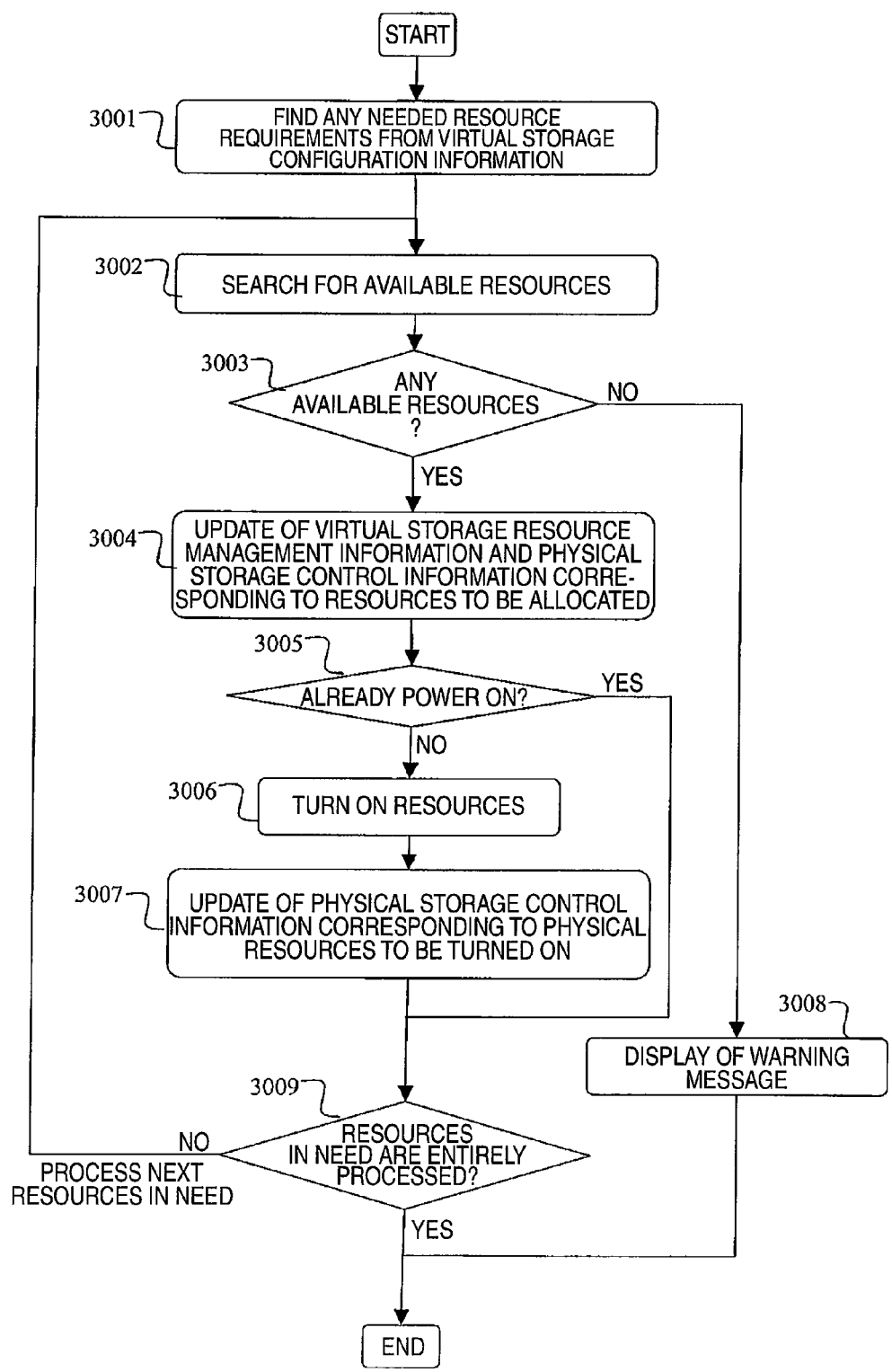
FIG. 30 is a flowchart of a resource preparation process in the first embodiment of the invention.

FIG. 30 is a flowchart of the resource preparation process in the resumption process to the virtual storage device 106.

First of all, when the resource preparation process is started, the physical storage device 120 searches the virtual storage configuration information 205 for any needed resource requirements (step 3001). The virtual storage configuration information 405 indicates the specifications of the virtual storage devices 106. When the element of "cache size" therein shows "256 MB", for resuming the operation of the virtual storage device 106, the control processor 124 is required to allocated a cache memory of 256 MB.

The physical storage device 120 then makes a search for any available resources (step 3002). To be specific, the control processor 124 refers to the elements of "state of use" 1024, 1344, and 1464 of the control information of the target resources to be allocated, i.e., the resource volume control information 901, the resource cache memory control information 902, and the resource task control information 903, and makes a search for any resources showing "not in use" in the elements.

As a result of the search in step 3002, when there is no available resources (N in step 3003), a warning message is displayed on the management screen of the management server 102, and notifies the operator of the virtual storage device 106 that resumption of operation is not possible because there is no available resources (step 3008). The management screen of the management server 102 will be described in detail later by referring to FIG. 31.

As a result of the search in step 3002, when there are any available resources (N in step 3003), an updating is made to the virtual storage resource management information 411, and the physical storage control information, which correspond to the resources to be allocated (step 3004).

To be specific, the following three steps are to be executed:
1. the control processor 124 makes an input of "in use" to the element of "state of use" in the control information of the target resources to be allocated, i.e., the resource volume control information 901, the resource cache memory control information 902, and the resource task control information 903, 2. in the virtual storage resource management information 411, the control processor 124 adds any element of "virtual storage device number" indicating the number of the virtual storage device being a target for resumption of operation, and 3. when the resources to be allocated are a resource volume, first of all, the control processor 124 refers to the resource volume control information 901, and checks the element of "parity group number 1026" for the resources. The control processor 124 then refers to the parity group control information 904, and checks the element of "physical disk number list 1112" for the parity group. For the physical disk number(s) found in the element of "physical disk number list 1112", the control processor 124 then refers to the physical disk control information 905, and changes the value therein to a value derived by adding 1 to the value in the element of "power supply counter 1213".

The physical storage device 120 then checks whether the power is already ON or not (step 3005).

To be specific, first of all, the control processor 124 makes a search for any physical resources corresponding to the resources to be allocated. When the resources to be allocated are a resource cache memory, the control processor 124 refers to the resource cache memory control information 902, and checks the element of "memory slot number 1345" for the physical resources corresponding to the resources. The control processor 124 then checks whether the element of "state of power supply" shows "ON" or not under the memory slot number. Only when the element of "state of power supply" shows "OFF", the physical resources can be turned ON.

When the resources to be allocated are a resource task, the control processor 124 refers to the resource task control information 903, and checks the element of "task number 1466" for the physical resources corresponding to the resources. The control processor 124 then refers to the element of "control processor number 1465" under the task number, and checks whether the element of "state of power supply" shows "ON" or not under the control processor number in the element of "control processor number 1465". Only when the element of "state of power supply" shows "OFF", the physical resources can be turned ON.

When the resources to be allocated are a resource volume, first of all, the control processor 124 refers to the resource volume control information 901, and checks the element of "parity group number 1026" corresponding to the resources. The control processor 124 then refers to the element of "parity group control information 904", and checks the element of "physical disk number list 1112" for the parity group. The control processor 124 then refers to the physical disk control information 905 for the physical disk number(s) found in the element of "physical disk number list 1112", and the control processor 124 then checks whether the element of "state of power supply" therein shows "ON" or not. Only when the element of "state of power supply" shows "OFF", the physical resources can be turned ON.

When the element of "state of power supply" shows "ON" for each of the physical resources (Y in step 3005), the procedure goes to step 3009, and when shows "OFF" (N in step 3005), the resources are turned ON (step 3006).

To be specific, if with a hard disk, the process for power ON may be implemented by a spin-up process or by turning power ON after complete power OFF.

The physical storage device 120 then updates the physical storage control information corresponding to the physical resources to be turned ON (step 3007).

To be specific, when the physical resources to be turned ON are a memory slot, the control processor 124 makes an input of "ON" to the element of "state of power supply 1342" in the resource cache memory control information 902 under the number of the target memory slot in the element of "memory slot number 1345".

When the physical resources to be turned ON are the control processor 124, the control processor 124 makes an input of "ON" to the element of "state of power supply 1462" in the resource task control information 903 under the number of the target control processor in the element of "control processor number 1465".

When the resources to be turned ON are a physical drive, the control processor 124 makes an input of "ON" to the element of "state of power supply 1212" in the physical control information 905 under the number of the target physical disk in the element of "physical disk number 1211".

After step 3007, when the resources found in step 3001 are not yet entirely subjected to a series of processes, i.e., from steps 3003 to 3007 (N in step 3009), a search is made to find any available resources for the next resources in need (step 3002). When the resources are already entirely subjected to the series of processes (Y in step 3009), this is the end of the procedure.

As such, the physical storage device 120 updates the virtual storage resource management information 411, and the physical storage control information 410 in steps 2802 and 3004 so that the information about the resources allocated in the physical storage device 106 at this point in time is stored in the control memory. This accordingly enables the physical storage device 120 to determine which resources are to be deallocated in step 2801 for putting each of the virtual storage devices 106 into a suspend mode, or which resources are to be allocated for resumption of operation in step 3001.

When the virtual storage device 106 is put in a suspend mode, the physical storage 120 refers to the element of "power supply counter" or "state of use" in step 2803. This favorably prevents the operator of the virtual storage device 106 from erroneously turning power OFF when the physical resources are yet in use by any of the virtual storage devices 106.

Moreover, in step 2703 in FIG. 27, the physical storage device 120 saves the storage image data 1601 to any external volume. The physical storage device then deallocates the resources including the virtual volume of the virtual storage device 106. For resuming the operation of any other virtual storage device 106, in steps 3002 to 3006 in FIG. 30, the physical storage device goes through a search process to find any available resources. The virtual storage device 106 thus can use the deallocated resources. As such, in the virtual storage system in its entirety, the resources of the physical storage device 120 can be utilized with good efficiency. Assuming here is a case where the virtual storage device 106 is a high-performance on-line storage high in bit cost, and the physical storage device 129 is a low-performance tape storage low in bit cost. In this case, the operator of the virtual storage device 106 stores, into the tape storage, the volume data and the control information of the virtual storage device 106 that will not be used for a while. As such, the operator is allowed to use any other virtual storage device 106 he or she wants to use on the high-performance physical storage device 120.

Figure 31:
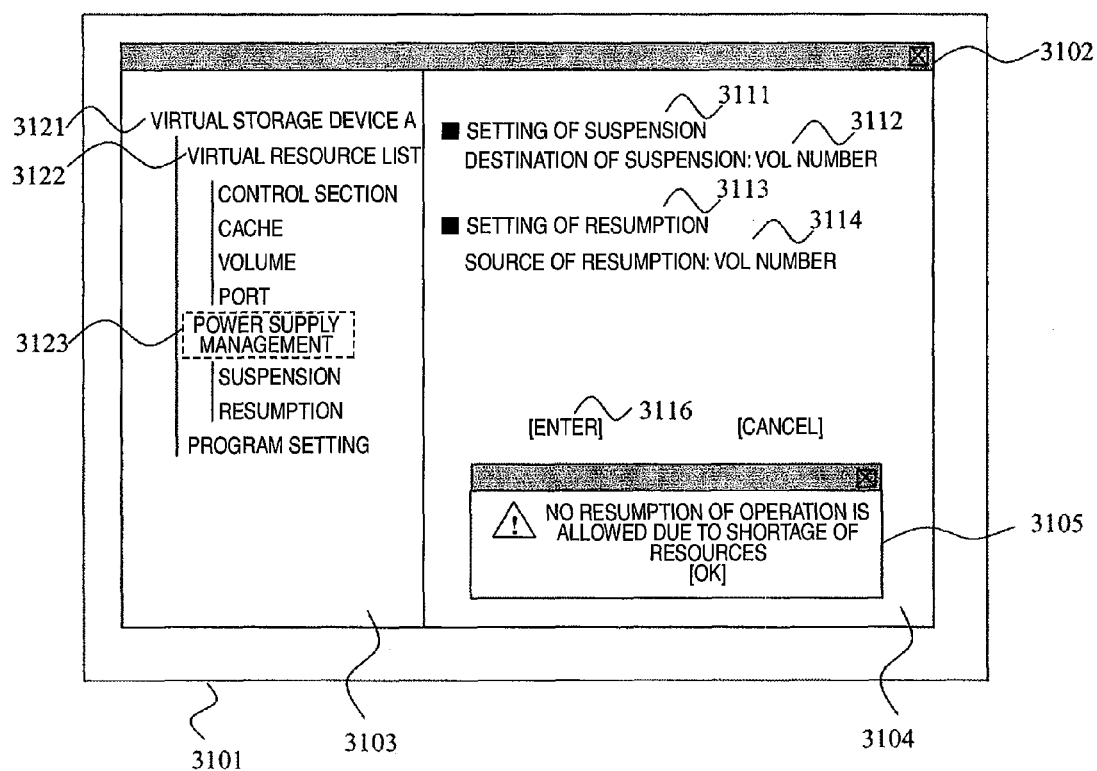
FIG. 31 is a diagram showing a GUI of a management server in the first embodiment of the invention.

FIG. 31 is a diagram showing a screen 3101 of the management server 102 of the virtual storage device 106.

The management server 102 has the screen 3101. The screen 3101 displays thereon the GUI screen 3102 of the storage management program 1102.

The GUI screen 3102 is provided with a menu section 3103 and a setting section 3104. The menu section 3103 displays various setting elements in a tree structure. The menu section displays therein information 3121 for use to identify the virtual storage device 106. In FIG. 31 example, displayed is the name of the virtual storage device 106, i.e., "virtual storage device A".

The menu section displays, below the information 3121 for use to identify the virtual storage device 106, items to be set by the element of "virtual resource list 3122" and those by the element of "power supply management 3121".

The setting element of "virtual resource list 3122" is for displaying the state of virtual resources stored in the virtual storage device 106 being a management target, and for setting the virtual resources.

The setting element of "power supply management 3123" is for displaying, in the setting section, the setting details and the state for putting the management-target virtual storage device 106 into a suspend mode or for resuming the operation thereof.

When the operator of the virtual storage device 106 selects the element of "power supply management 3121", the setting section 3104 accordingly displays the setting elements related to suspension and resumption.

A suspension setting screen 3111 displays setting details for putting the virtual storage device 106 into a suspend mode. The setting details include a destination of suspension 3112, with which the operator of the virtual storage device 106 designates the virtual volume number for transfer of volume data and control information at the time of putting the virtual storage device 106 into a suspend mode. For example, the operator of the virtual storage device 106 designates the virtual volume number of any externally-adjacent volume.

A resumption setting screen 3113 displays setting details for resuming the operation of the virtual storage device 106. The setting details include a source of resumption 3114, with which the operator of the virtual storage device 106 designates the number of the virtual volume being the source of resumption. For example, the operator of the virtual storage device 106 designates the number of the virtual volume of any externally-adjacent volume.

When an enter button 3116 is depressed, using the storage management program 1704, the management server 102 forwards a suspension or resumption command to the physical storage device 120 with the details set in the setting section 3104. At the time of resumption of operation, the management server 102 runs the WWN change notification program 1705 by the storage management program 1704.

After the management server 102 forwards a command for resuming the operation of the virtual storage device 106, when the physical storage device 120 does not have enough resources, the GUI screen 3102 displays thereon a message 3105 telling "No resumption of operation is allowed due to shortage of resources". As such, the operator of the virtual storage device 106 is notified that the resumption of operation is not possible.

Second Embodiment

In a second embodiment, described is an exemplary case where power supply management is performed over physical resources in a storage device in a unit called package (PK).

Described below is, in the second embodiment, any difference from the first embodiment.

Figures 32, 33:
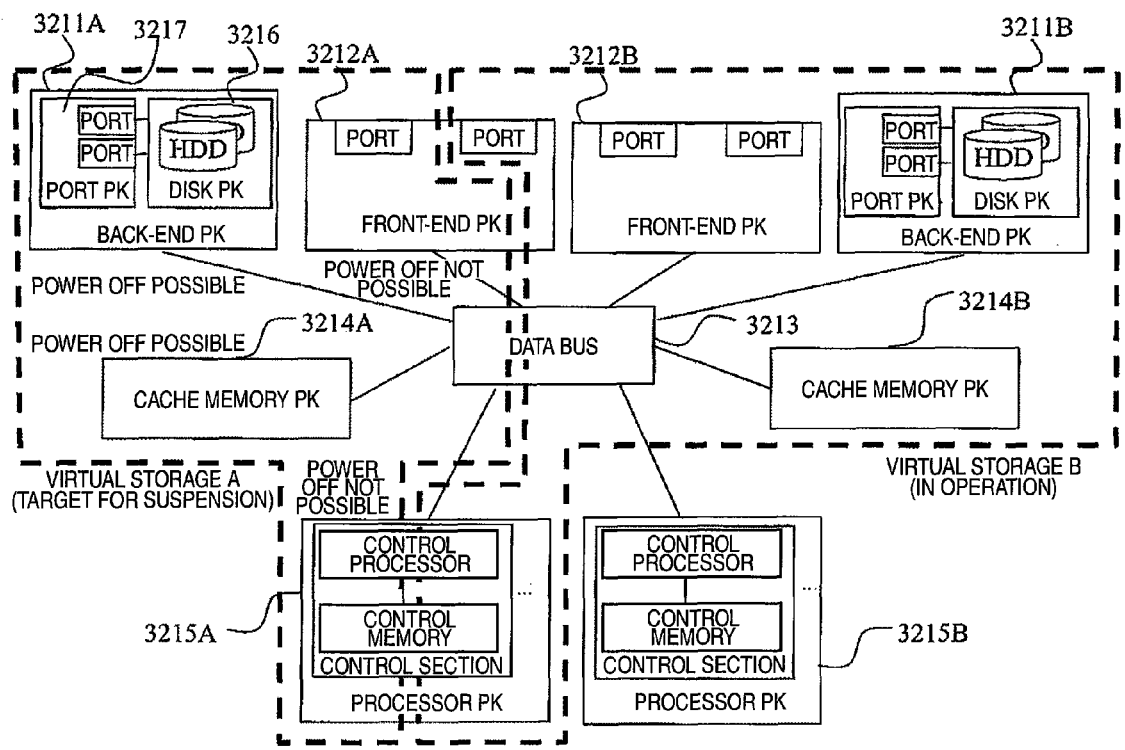
FIG. 32 is a diagram showing power-supply boundaries of a storage device in a second embodiment of the invention.
FIG. 33 is a diagram showing package resource correlated information in the second embodiment of the invention.

FIG. 32 shows the physical configuration of a storage device in a virtual storage system in the second embodiment of the invention.

A back-end package 3211 is configured to include a disk package 3216 including a physical disk, and a back-end port package 3217 including a port for communications with the physical disk and the external storage device 129.

A front-end package 3212 is a package including a port.

A data bus 3213 is a device for executing a communications process such as data transfer between the packages. A processor package 3215 is a package including a control section such as the control processor 124, and the control memory 125. The processor package 3215 may include the control section plurally, and the processor package 3215 may be provided plurally, whereby the control processor 124 may be provided physically plurally. The control processors 124 each access a cache memory in a cache memory package 3214 via the data bus 3213, and can provide various types of control information on the control memory onto the cache memory. The control processors 124 can share such control information varying in type on the cache memory with the control processor(s) 124 in any other control section. Note that, in this embodiment and thereafter, if with a description that various types of control information is provided on the control memory 125, unless otherwise additionally noted, it means that the control information is provided on the cache memory, and is shared for use in the physical storage device 120.

The cache memory package 3214 is a package including a cache memory.

Note that the cache memory package 3214 including a cache memory for use as the control memory 125 cannot be turned OFF as long as there is any control processor 124 accessing the various control information of shared use.

In consideration thereof, when the cache memory of any fixed cache memory package 3214 is to be used as an alternative to the control memory, the control processors 124 of the physical storage device 120 may each add 1 to the value in an element of "power supply counter 3314" of the cache memory package 3214, thereby controlling not to turn power OFF. The details of the element of "power supply counter 3314" will be described later.

FIG. 33 shows the data structure of package resource correlated information 3301.

The package resource correlated information 3301 includes elements of "package number 3311", "type of package 3312", "list of power supplies 3313", "power supply counter 3314", and "state of power supply 3315". The package information is stored in the control memory 125 of the physical storage device 120.

The element of "package number 3311" indicates numbers for use to identify the packages.

The element of "package type 3312" indicates the type of the packages. The type of packages varies in type, including "processor package" including one or more control sections, "cache memory package" including one or more cache memories, "disk package" including one or more physical disks, "front-end package" including one or more ports for communications with the host, and "back-end port package" including one or more ports for communications with the physical disk and the external storage device 129.

The element of "list of power supplies 3313" is a list of resources in each of the packages. The value in the element of "power supply counter 3314" indicates the number of the virtual storage devices 106 using any of the packages. The method for updating the values in the element of "power supply counter 3314" will be described later by referring to FIGS. 34 and 35. The element of "state of power supply 3315" shows whether the packages are each being turned ON or OFF.

Figure 34:
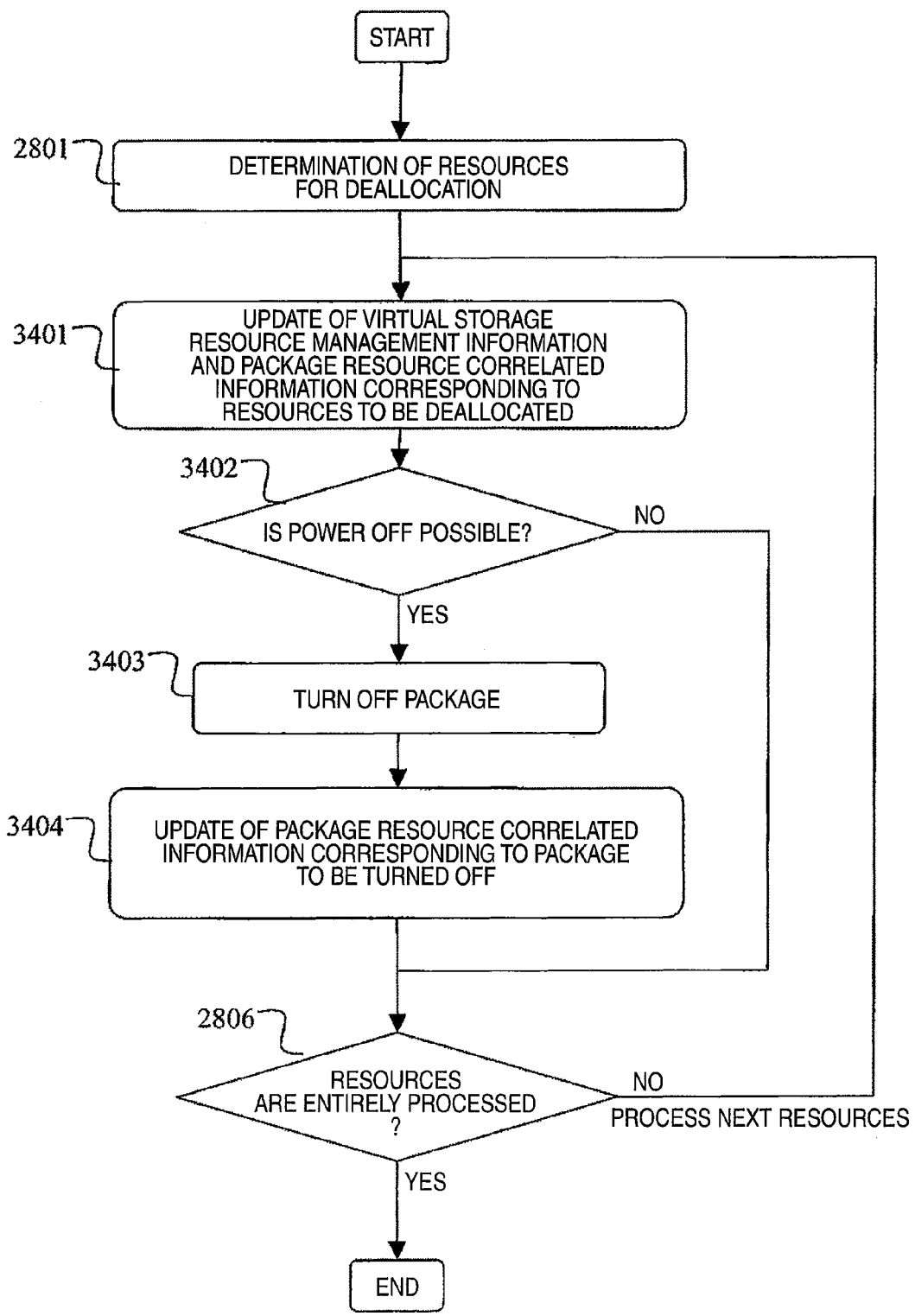
FIG. 34 is a flowchart of a resource deallocation process in the second embodiment of the invention.

FIG. 34 is a flowchart of the resource deallocation process in this embodiment.

Compared with the flowchart of FIG. 28, in the flowchart of FIG. 34, steps 3401 to 3404 are different.

In the resource deallocation process, the physical storage device 120 updates the virtual storage resource management information 411, and the package resource correlated information 3301, which correspond to the resources to be deallocated (step 3401). To be specific, the following three steps are to be executed:

1. the control processor 124 makes an input of "not in use" to the element of "state of use" in the control information of the target resources to be deallocated, i.e., the resource volume control information 901, the resource cache memory control information 902, and the resource task control information 903, 2. in the virtual storage resource management information 411, the control processor 124 deletes any element of "virtual storage device number" indicating the number of the virtual storage device being a target to be put into a suspend mode, which corresponds to the resources to be deallocated, and 3. the control processor 124 subtracts 1 from the value in the element of "power supply counter 3314" in the package resource correlated information 3301 corresponding to the target resources to be deallocated. Herein, after this process is started and before it is ended, at the time of processing any other resources, if the value in the element of "power supply counter 3314" under any same package number in the element of "package number 3311" is already subtracted by 1, no value subtraction is performed.

The physical storage device 120 then checks whether the resources to be deallocated can be individually turned OFF or not (step 3402).

To be specific, only any package showing 0 in the element of "power supply counter 3314" in the package resource correlated information 3301 can be turned OFF.

When the physical resources are a target for power OFF (Y in step 3402), the physical storage device 120 accordingly turns OFF the package (step 3403). When the physical resources are not a target for power OFF (N in step 3402), the procedure goes to step 2806.

Next, the package resource correlated information 3301 corresponding to the package to be turned OFF is updated (step 3403).

To be specific, the control processor 124 makes an input of "OFF" to the element of "state of power supply 3315" in the package resource correlated information 3301.

The remaining operation in the resource deallocation process is the same as that described by referring to FIG. 28, and thus is not described again.

Figure 35:
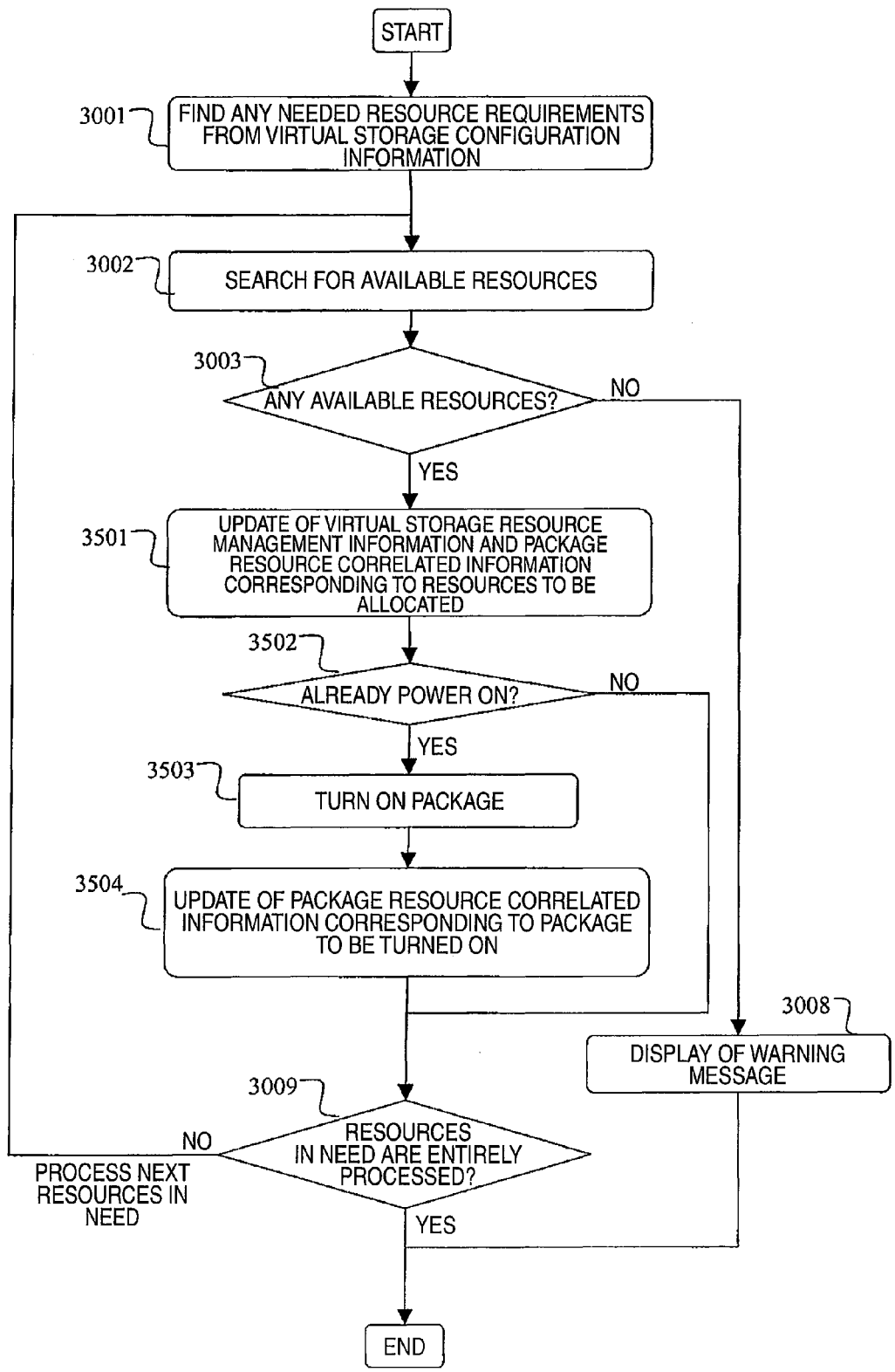
FIG. 35 is a flowchart of a resource preparation process in the second embodiment of the invention.

FIG. 35 is a flowchart of the resource preparation process in this embodiment.

Compared with the flowchart of FIG. 30, in the flowchart of FIG. 35, steps 3501 to 3504 are different.

The physical storage device 120 updates the virtual storage resource management information 411, and the package resource correlated information, which are corresponding to the available resources found in step 3002 (step 3501). To be specific, the following three steps are to be executed:

1. the control processor 124 makes an input of "in use" to the element of "state of use" in the control information of the target resources to be allocated, i.e., the resource volume control information 901, the resource cache memory control information 902, and the resource task control information 903, 2. in the virtual storage resource management information 411, the control processor 124 adds any element of "virtual storage device number" indicating the number of the virtual storage device being a target of resumption of operation, and 3. the control processor 124 adds 1 to the value in the element of "power supply counter 3314" in the package resource correlated information 3301 corresponding to the target resources to be allocated. Herein, after this process is started and before it is ended, at the time of processing any other resources, if the value in the element of "power supply counter 3314" under any same package number in the element of "package number 3311" is already added by 1, no value addition is performed.

The control processor 124 then checks whether the resources are already turned ON or not (step 3502).

To be specific, only any package showing "OFF" in the element of "state of power supply 3315" in the package resource correlated information 3301 can be turned ON.

When the physical resources are already being turned ON (Y in step 3502), the procedure goes to step 3009, and when the physical resources are a target for power ON (N in step 3502), the physical storage device 120 turns ON the package (step 3503).

The physical storage device 120 then updates the package resource correlated information 3301 corresponding to the package to be turned ON (step 3504).

To be specific, the control processor 124 makes an input of "ON" to change the element of "state of power supply 3315" in the package resource correlated information 3301.

The remaining operation in the resource preparation process is the same as that described by referring to FIG. 30, and thus is not described again.

As such, at the time of putting the virtual storage device 106 into a suspend mode, and resuming the operation thereof, the values in the element of "power supply counter 3314" are updated in the package resource correlated information 3301. In steps 3401 and 3501, the values in the element of "power supply counter 3314" are so updated as to indicate the number of the virtual storage devices 106 in use.

Also at the time of putting the virtual storage device 106 into a suspend mode, in step 3402, the element of "power supply counter 3314" is referred to in the package resource correlated information 3301, and a determination is made whether there is any virtual storage device 106 currently in use. As such, even when the resources in the same package are shared for use between the virtual storage devices, the operator of the virtual storage device 106 can turn power OFF without affecting any other virtual storage devices 106.

Third Embodiment

In a third embodiment, described are a suspension method and a resumption method in a virtual storage device in a module-type storage being a storage device configured by a plurality of modules being coupled together.

In the below, in the third embodiment, any difference from the first and second embodiments is described.

Figures 36, 37:
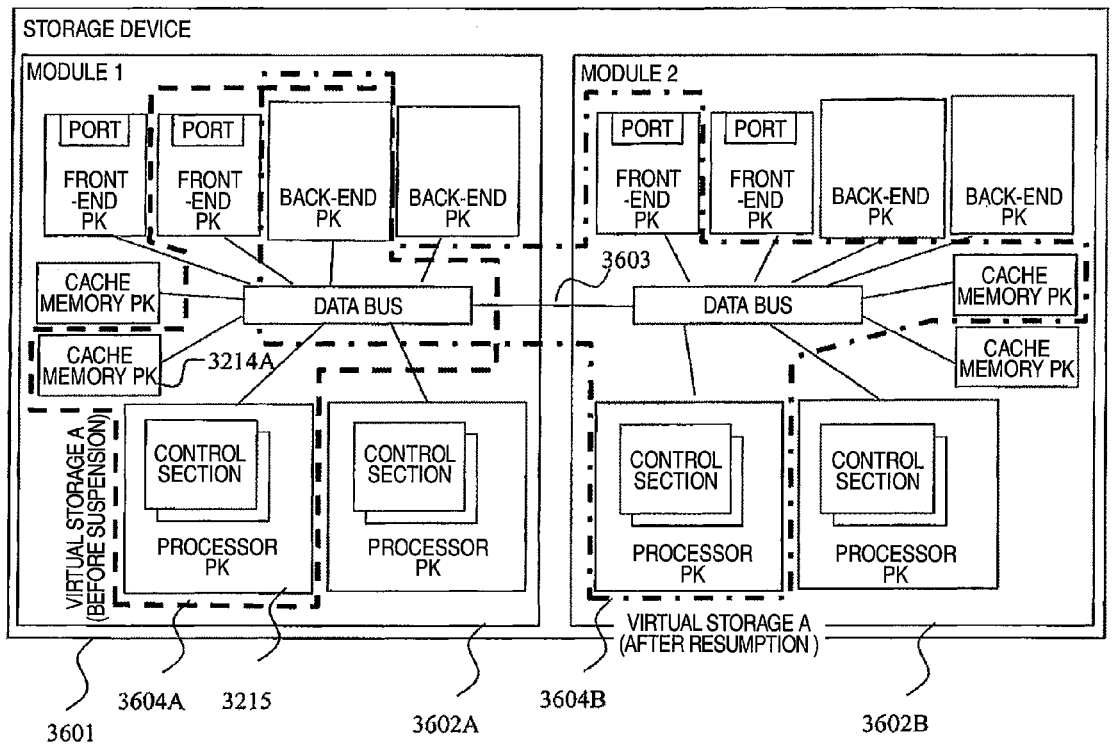
FIG. 36 is a diagram showing a module-type storage device in a third embodiment of the invention.
FIG. 37 is a diagram showing module information in the third embodiment of the invention.

FIG. 36 shows the physical configuration of a virtual storage system in the third embodiment of the invention.

A module 3602 is configured to include a processor package 3215, a cache memory package 3214, a front-end package, a back-end package, and a data bus.

The processor package includes a control section, the cache memory package includes a plurality of cache memories, the front-end package includes a plurality of ports, the back-end package includes a port package including a disk package and a plurality of ports. The disk package is the one including a plurality of disks.

The module-type storage 3601 offers a storage device being a plurality of modules 3602 coupled together. The internal configuration of the module 3602 is the same as the hardware described in the second embodiment, and thus is not described twice.

For a process of resuming the operation of the virtual storage device 106 in the module-type storage 3601, there may be a case where resources are to be allocated from a plurality of different modules 3602. In this case, the performance capabilities are affected.

Assuming here is a case where a virtual storage device 3604A is put into a suspend mode and then the operation thereof is resumed, and a virtual storage device 3604B is the result thereof. In the virtual storage device 3604B after the resumption of operation, the module including the physical disk is different from the module including the port. This thus causes a need for data communications on a path 3603 between the modules when the data read by the control section from the physical disk is transferred to the port. The concern here is that, in the module-type storage, the data communications over the data bus in the module can be completed at high speed, but the data communications between the modules is low in speed compared with the data communications over the data bus in the module. Accordingly, when the operation of the virtual storage device 106 is resumed using the resources of various different modules, the performance capabilities are affected.

In consideration thereof, for not to affect the performance capabilities of the virtual storage device 106 at the time of resumption of operation, the physical storage device 120 is so configured as to select resources in the same module as much as possible. Such a method is specifically described below.

FIG. 37 is a diagram showing the data structure of module information 3701.

The module information 3701 is in the form of a table, showing the correlation between elements of "module number 3711" and "list of resources 3712". The element of "list of resources 3712" indicates the resources belonging to each of the modules.

The element of "module number 3711" indicates numbers each representing a module in the storage device.

The element of "list of resource 3712" indicates the resources found in each of the modules. The control processor 124 makes inputs of, to the element of "list of resources 3712", resource task numbers, resource cache memory numbers, and resource volume numbers, for example.

Figure 38:
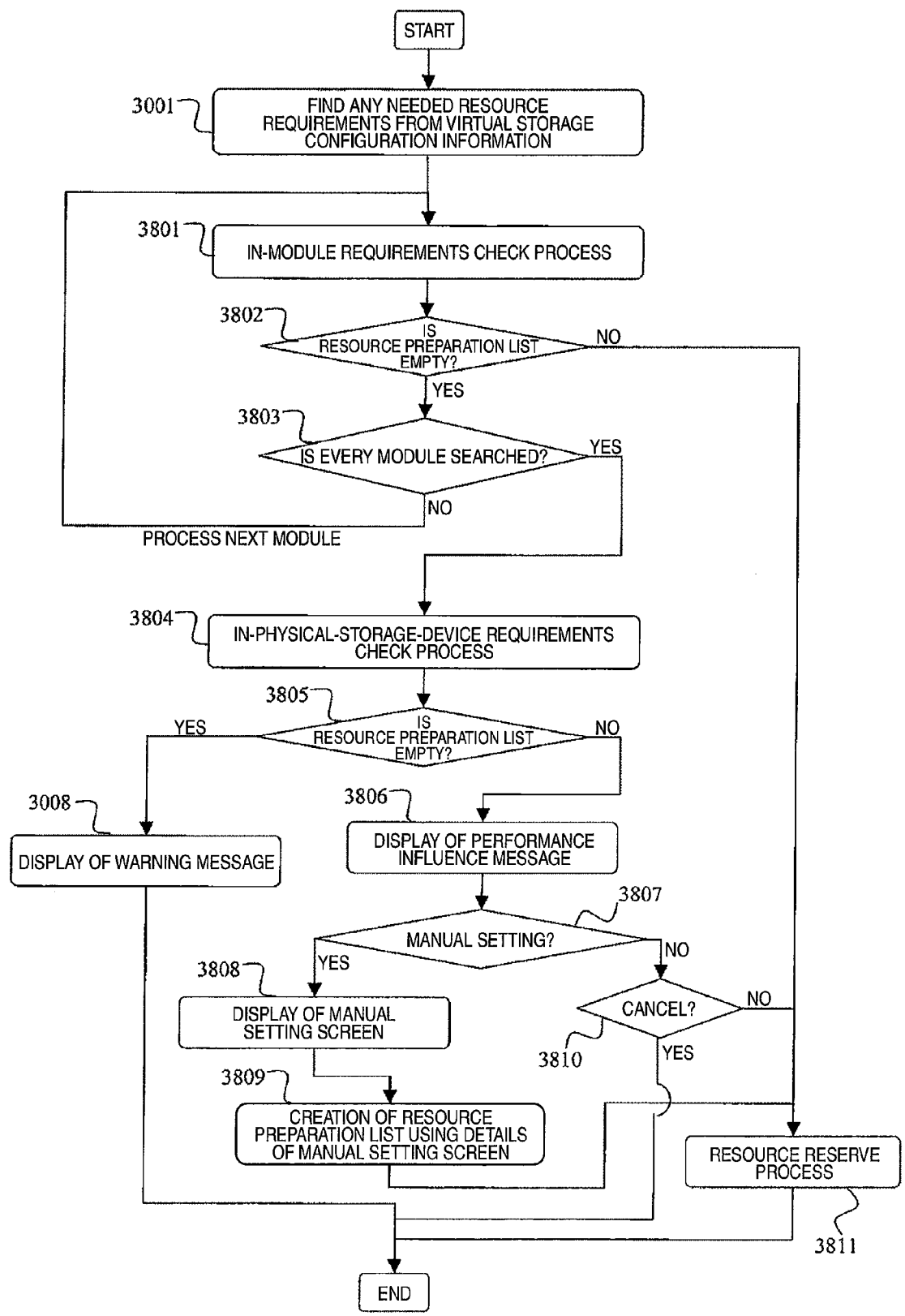
FIG. 38 is a flowchart of a resource preparation process in the third embodiment of the invention.

FIG. 38 is a flowchart of the resource preparation process in the resumption process.

Compared with the flowchart of FIG. 30, in the flowchart of FIG. 38, steps 3801 to 3811 are different.

For the needed resource requirements found in step 3001, the control processor 124 executes an in-module requirements check process (step 3801). When the in-module requirements check process is started, the control processor 124 checks whether only the resources in the designated module can satisfy the resource requirements or not. When the check result is YES, i.e., the resource requirements are satisfied, the control processer 124 makes an input of such requirements-satisfying resources into a resource preparation list. When the check result is NO, i.e., the resource requirements are not satisfied, the control processor 124 makes empty the resource preparation list. For more details, the in-module requirements check process will be described later by referring to FIG. 39.

When the resource preparation list is empty (Y in step 3802), the control processor 124 executes the process to any other modules found in the physical storage device 120 (N in step 3803). When a search is made to every module in the physical storage device 120 (Y in step 3803), the control processor 124 executes an in-physical-storage-device requirements check process (step 3804). When the in-physical-storage-device requirements check process is started, the control processor 124 checks whether the resources in the physical storage device 120 satisfy the resource requirements or not. When the check result is YES, i.e., the resource requirements are satisfied, the control processer 124 makes an input of such requirements-satisfying resources into the resource preparation list. When the check result is NO, i.e., the resource requirements are not satisfied, the control processor 124 makes empty the resource preparation list. For more details, the in-physical-storage-device requirements check process will be described later by referring to FIG. 38.

As a result of the in-physical-storage-device requirements check process, when the resource preparation list is empty (Y in step 3805), it means that the physical storage device 120 has no available resources so that the management server 102 displays a warning message (step 3008).

When the resource preparation list is not empty (N in step 3805), the management server 102 displays a performance influence message (step 3806). With the performance influence message, the operator of the virtual storage device 106 is informed that if he or she resumes the operation of the virtual storage device 106 using the resources scattered across a plurality of different modules, the performance capabilities will be affected.

The method for displaying the performance influence message is described specifically. The control processor 124 of the physical storage device 120 forwards a command for the management server 102 to display the performance influence message. The management server 102 receives the command, and the performance influence message is accordingly displayed. In the below, for display of the message on the management server 102, unless otherwise specified, the message is displayed similarly to the above.

Together with the performance influence message, displayed are "automatic setting", "manual setting", and "cancel". The operator of the virtual storage device 106 can select any of these.

When the operator of the virtual storage device 106 selects "automatic setting" (N in step 3807, and N in step 3810) the control processor 124 executes the resource allocate process (step 3811). The resource allocate process is executed to the resources found in the resource preparation list, which is the result of the in-physical-storage-device requirements check process executed in step 3804. After the resource allocate process is executed as such, the resource preparation process is completed. For more details, the resource allocate process will be described later by referring to FIG. 41.

When the operator of the virtual storage device 106 selects "manual setting" (Y in step 3807), the management server 102 displays a manual setting screen (step 3808).

After the physical storage device 120 receives the details input by the operator of the virtual storage device 106 through the manual setting screen, the resource preparation list is created from the details of the manual setting screen (step 3809). Thereafter, the control processor 124 executes the resource allocation process to the resources input into the resource preparation list (step 3811), and this is the end of the resource preparation process.

When the operator of the virtual storage device 106 selects "cancel" (N in step 3807, and Y in step 3810), the resource preparation process is ended, and the resumption process is interrupted.

When the resource preparation list is not empty (N in step 3802), the operation of the virtual storage device 106 can be resumed using the resources in any same module. If this is the case, the resource allocate process 3810 is executed to the resources input into the resource preparation list as a result of the in-module requirements check process in step 3801, and this is the end of the resource preparation process.

Figure 39:
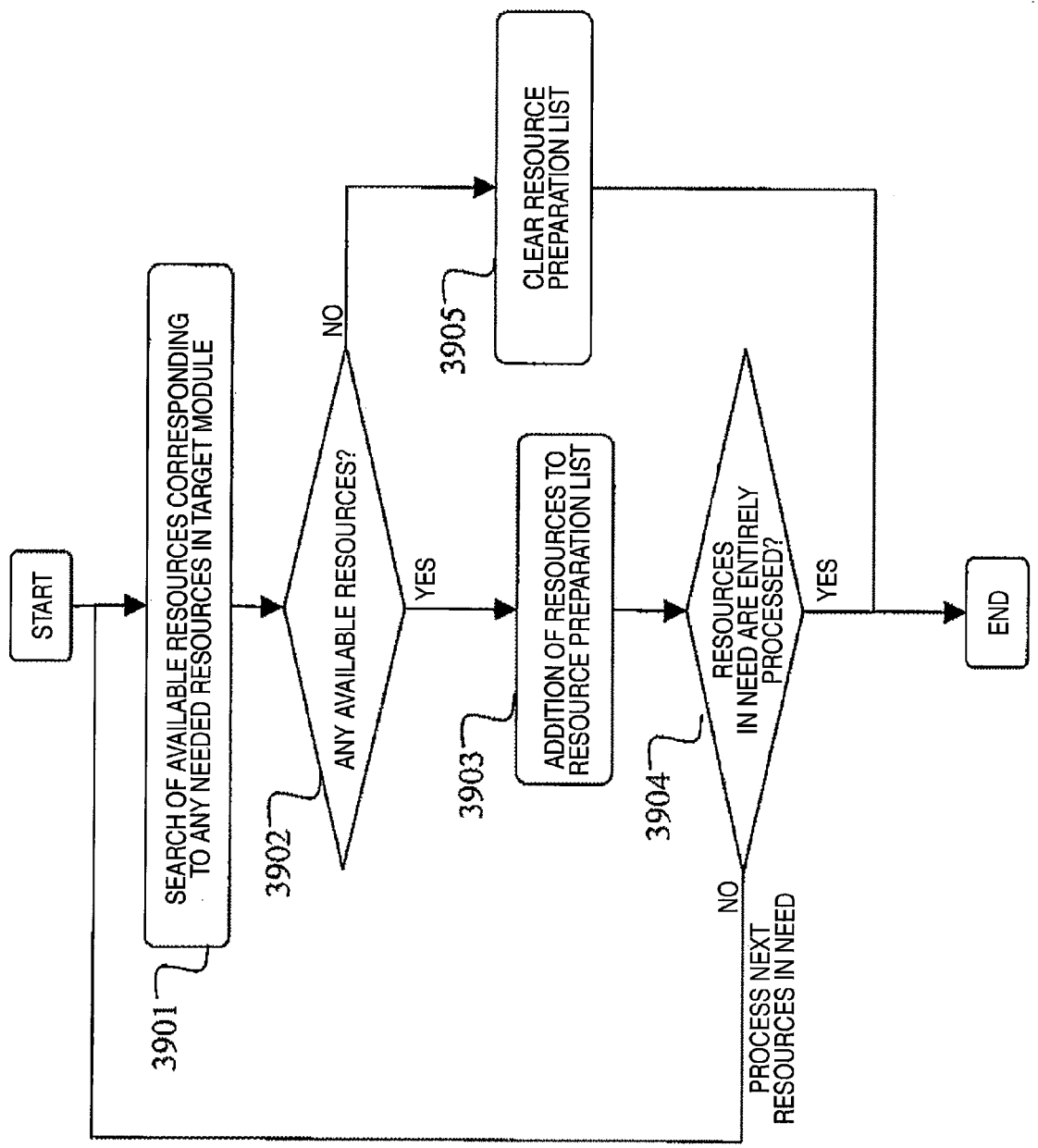
FIG. 39 is a flowchart of an in-module requirements check process in the third embodiment of the invention.

FIG. 39 is a flowchart of the in-module requirements check process.

In the in-module requirements check process, the control processor 124 checks whether the resource requirements are satisfied only by the resources in any designated module. When the check result is YES, i.e., the resource requirements are satisfied, the control processor 124 makes an input of such resources into the resource preparation list, and when the check result is NO, i.e., the resource requirements are not satisfied, the control processor 124 makes empty the resource preparation list. In the below, the in-module requirements check process is described on a step basis.

When the in-module requirements check process is started, the control processor 124 makes a search for any available resources corresponding to the resources needed in a target module (step 3901). The control processor 124 can know which module has which resources available for use by referring to the module information 3901.

As a result of the search in step 3901, when there is no available resources (N in step 3902), the control processor 124 clears the resource preparation list (step 3905), and this is the end of the in-module requirements check process.

As a result of the search in step 3901, when there are any available resources (Y in step 3902), the control processor 124 adds thus found available resources to the resource preparation list (step 3903). When the search is not made to all of the resources (N in step 3904), the procedure returns to step 3901, and the control processor 124 repeatedly makes a search for any resources needed for next use. When the search is made to all of the resources in need (Y in step 3904), this is the end of the in-module requirements check process.

Figure 40:
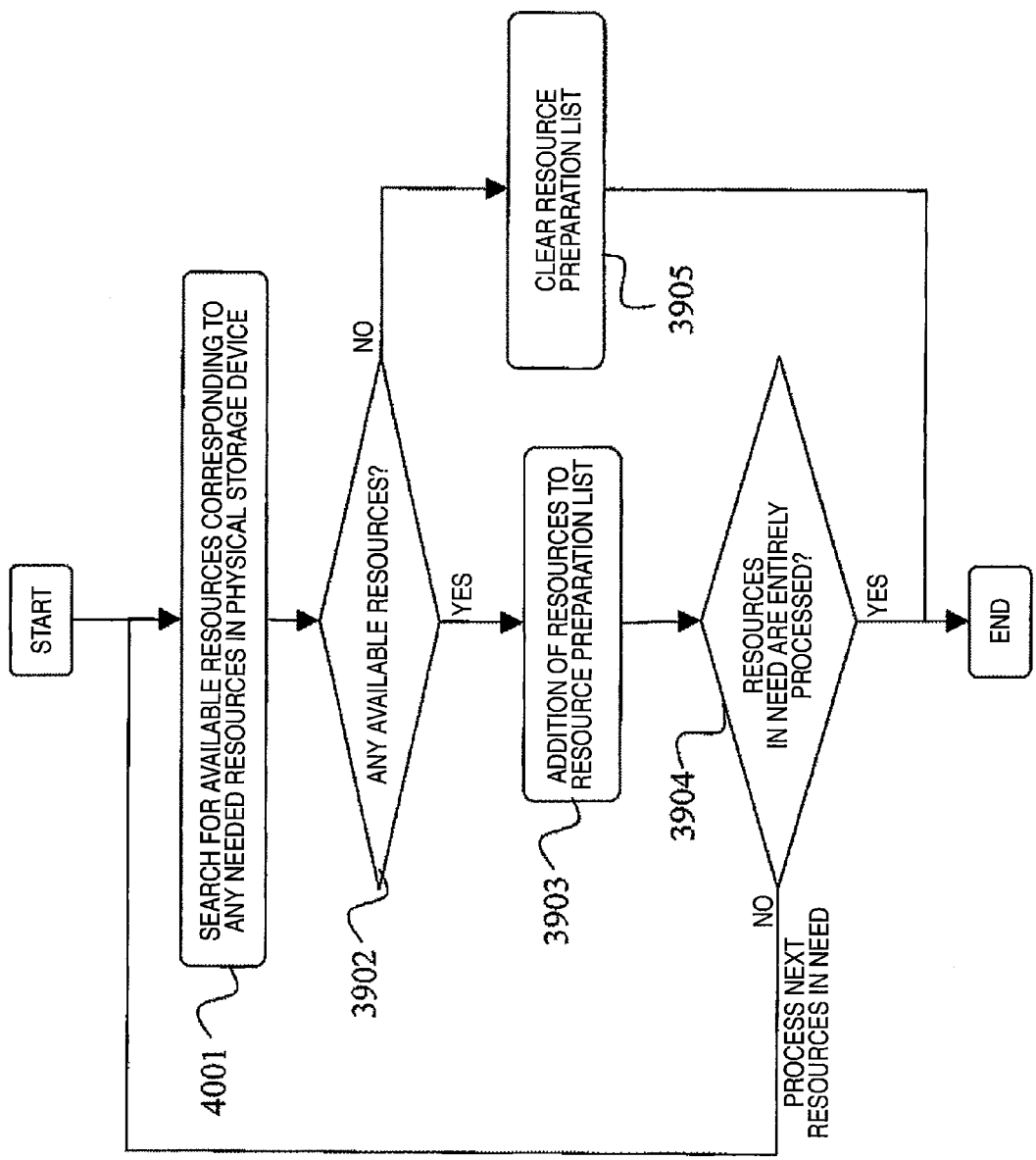
FIG. 40 is a flowchart of an in-physical-storage-device requirements check process in the third embodiment of the invention.

FIG. 40 is a flowchart of the in-physical-storage-device requirements check process.

By the in-physical-storage-device requirements check process, the physical storage device 120 checks whether the resources in the physical storage device 120 each satisfy the resource requirements or not. When the check result is YES, i.e., the resource requirements are satisfied, the control processor 124 makes an input of such requirements-satisfying resources into the resource preparation list, and when the check result is NO, i.e., the resource requirements are not satisfied, the control processor 124 makes empty the resource preparation list.

When the in-physical-storage-device requirements check process is started, the control processor 124 makes a search for any available resources corresponding to the resources needed in the physical storage device 120. Thereafter, the procedure is similar to the in-module requirements check process described by referring to FIG. 39.

Figure 41:
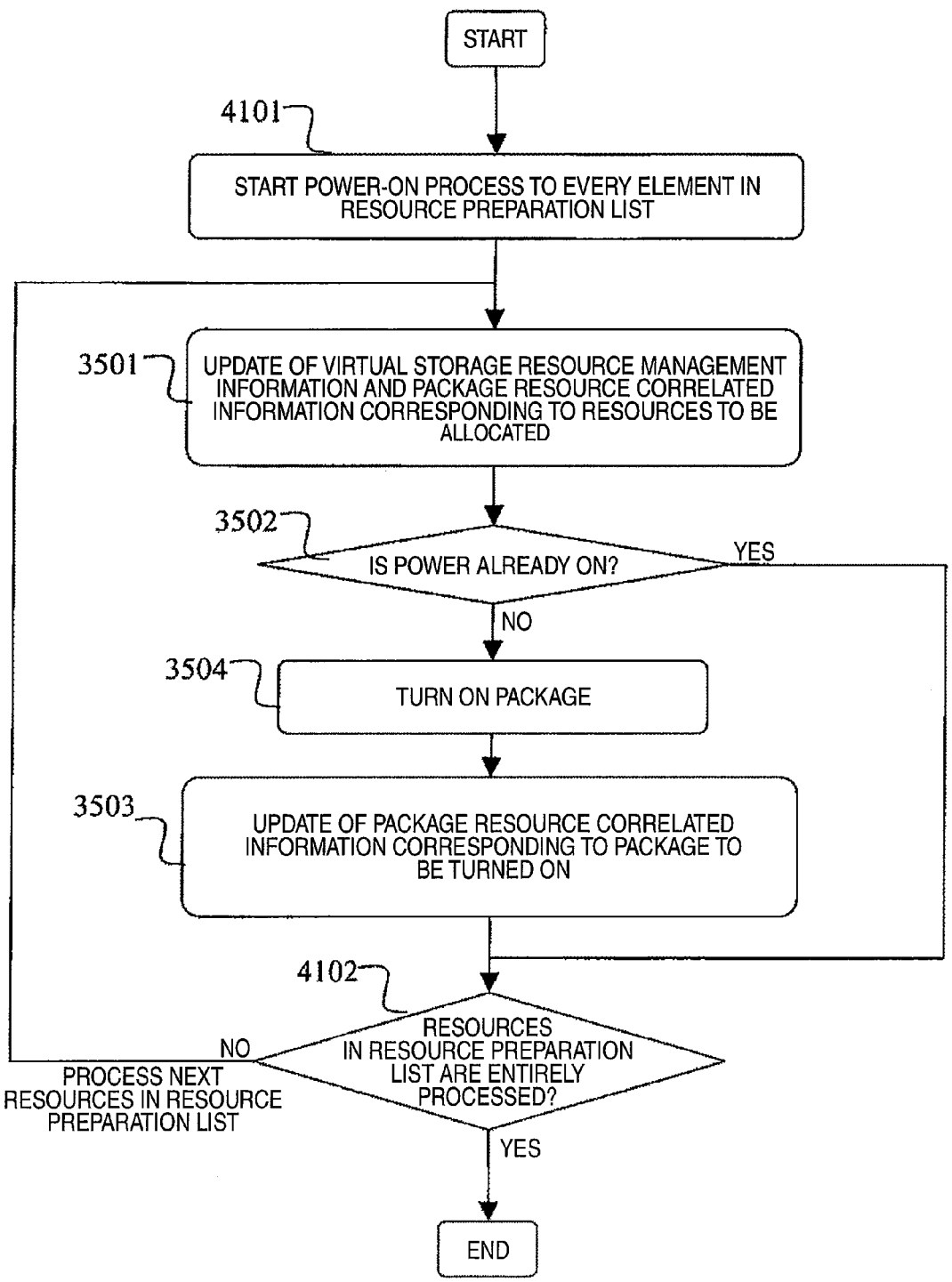
FIG. 41 is a flowchart of a resource allocated process in the third embodiment of the invention.

FIG. 41 is a flowchart of the resource allocate process in the resource preparation process.

Compared with the flowchart of FIG. 35, in the flowchart of FIG. 41, steps 4101 and 4102 are different.

The control processor 124 turns ON each component in a resource preparation list 4401, and updates the virtual storage resource management information 411 and the package resource correlated information related thereto. The resource allocate process is described below on a step basis.

The control processor 124 starts a power-ON process to each of the components in the resource preparation list 4401 (step 4101). Thereafter, the procedure is similar to the resource deallocation process of FIG. 35 in the third embodiment, i.e., steps 3501 to 3503. When the process is not yet executed to all of the resources in the resource preparation list 4401 (N in step 4102), the control processor 124 processes the next resources in the resource preparation list 4401. After the completion of the process to all of the resources in the resource preparation list 4401 (Y in step 4102), this is the end of the process.

Figure 42:
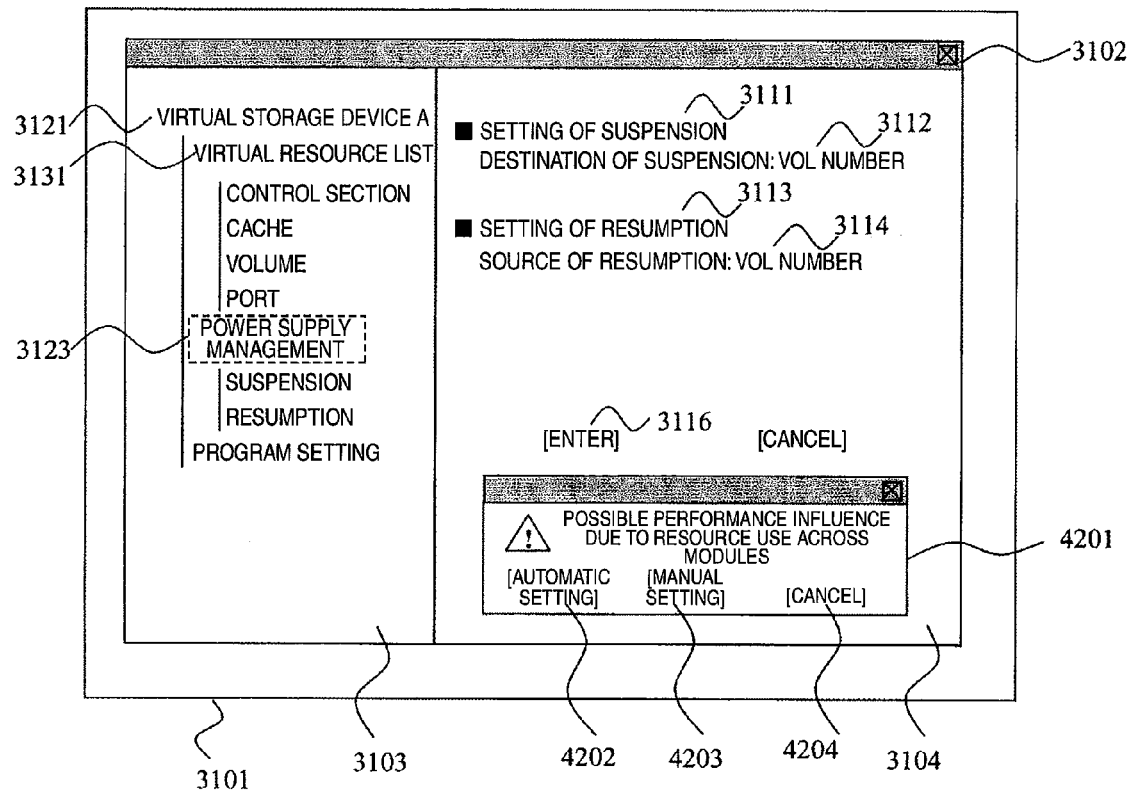
FIG. 42 is a diagram showing a GUI of a management server in the third embodiment of the invention.

FIG. 42 is a diagram showing the GUI screen 3101 of the management server 102.

Compared with the screen of FIG. 31, in the screen of FIG. 42, elements of 4201 to 4204 are different.

The management server 102 receives a command from the physical storage device 120 for displaying the performance influence message in step 3806. The management server 120 then displays the performance influence message 4201 on the GUI screen 3102 of the storage management program 1704 running on the management server 102.

The performance influence message 4201 includes such a message as "Possible performance influence due to resource use across modules", the automatic setting button 4202, the manual setting button 4203, and the cancel button 4204.

When the operator of the virtual storage device 106 depresses the automatic setting button 4202, the physical storage device 120 is notified that the operator of the virtual storage device 106 has selected automatic setting. After the physical storage device 120 receives such a notification, the procedure goes to step 3811.

When the operator of the virtual storage device 106 depresses the manual setting button 4203, the physical storage device 120 is notified that the operator of the virtual storage device 106 has selected manual setting. After the physical storage device 120 receives such a notification, the procedure goes to step 3809.

When the operator of the virtual storage device 106 depresses the cancel button 4204, the physical storage device 120 is notified that the operator of the virtual storage device 106 has selected cancellation. After the physical storage device 120 receives such a notification, this is the end of the resource preparation process, and the resumption process is interrupted.

Figure 43:
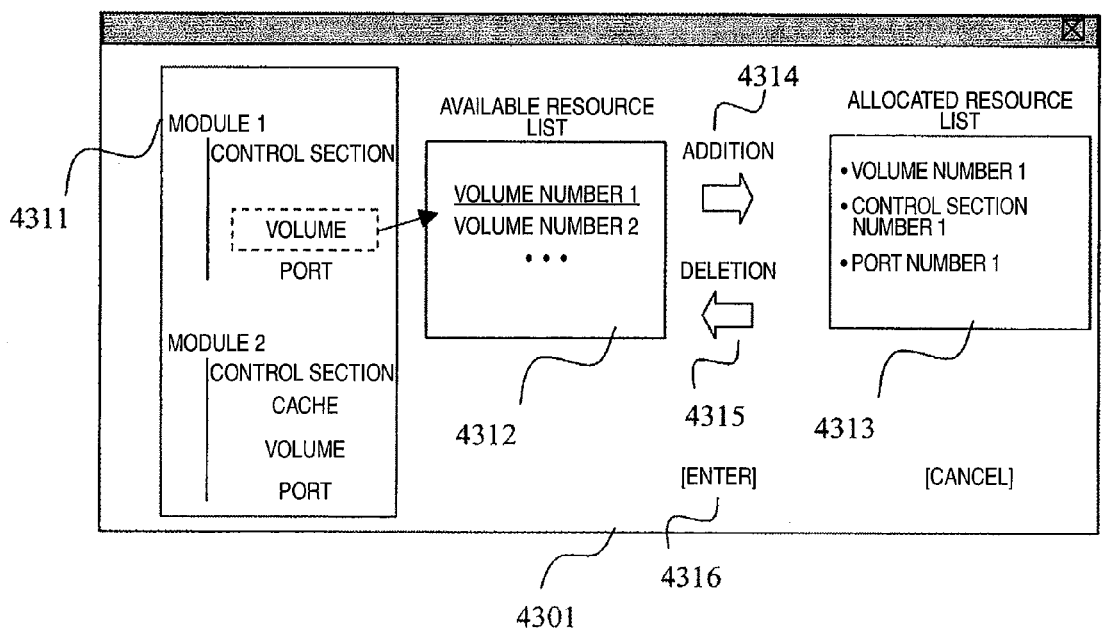
FIG. 43 is a diagram showing a manual setting screen in the third embodiment of the invention.

FIG. 43 is a diagram showing the manual setting screen of a GUI screen 3102 of the management server 102.

The manual setting screen 4301 includes a menu 4311, an available resource list 4312, an allocated resource list 4313, an addition button 4314, and a deletion button 4315.

In the menu 4311, when the operator of the virtual storage device 106 selects an element of resource classification such as "control section" and "cache" for each of the modules, the management server 102 displays a list of available resources found in the modules into the available resource list 4312. When the operator of the virtual storage device 106 selects any specific resources from the available resource list 4312, and depresses the addition button 4314, the management server 102 accordingly adds thus selected resources into the allocated resource list 4313 for display. When the operator of the virtual storage device 106 selects any specific resources from the allocated resource list 4313, and depresses the deletion button 4315, the management server 102 accordingly deletes thus selected resources from the allocated resource list for display. When the operator of the virtual storage device 106 depresses an enter button 4316, the management server 102 forwards the details of the reserved resource list to the physical storage device 120.

FIG. 44 is a diagram showing the data structure of the resource preparation list.

The resource preparation list 4401 includes elements of "type of resources 4411" and "resource number 4412" in pair. The resource preparation list 4401 may include resources of one or more modules, i.e., resources 4402A of a module 1 and resources 4402B of a module 2.

As such, at the time of resuming the operation of the virtual storage device 106, the physical storage device 120 firstly refers to the module information 3701 in step 3801. For each of the modules, the physical storage device 120 checks whether resumption of operation is possible using the resources of any same module, and with a higher priority, allocates the resources in the same module to the virtual storage device 106. This accordingly prevents allocation of resources across a plurality of modules that is the cause of overhead, thereby favorably reducing any possible influence over the performance capabilities.

Moreover, even when resource allocation is not possible to the virtual storage device using only one module, the operator may issue any appropriate allocation command with the performance influence message 4201 and through the manual setting screen 4301, thereby being able to reduce the possibility of resource allocation across a plurality of modules.

Fourth Embodiment

In a fourth embodiment, described is a method for putting, into a suspend mode, a virtual storage device operating in a physical storage device, and for resuming the operation of the virtual storage device in any other physical storage device.

In the below, in the fourth embodiment, any difference from the first embodiment is described.

Figure 45:
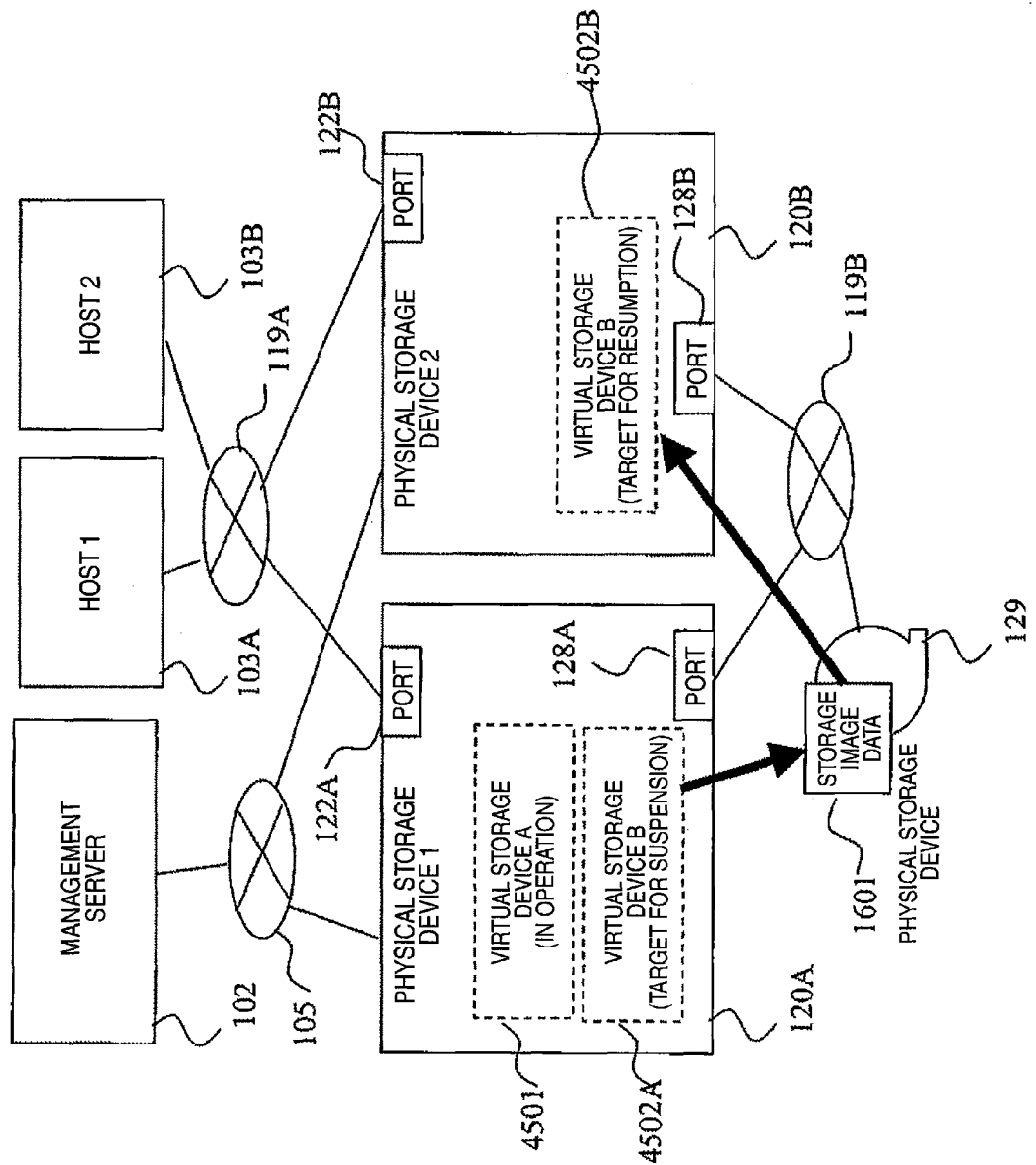
FIG. 45 is a diagram how the resumption of operation is performed in storage devices in a fourth embodiment of the invention.

FIG. 45 is a diagram showing the physical configuration of a virtual storage system in the fourth embodiment of the invention.

The external storage device 129 is shared for use over a network 119B such as SAN. When a virtual storage device 4502A is put into a suspend mode, a physical storage device 120A writes the storage image data 1601 to the external storage device 129. At the time of resuming the operation of a virtual storage device 4502B, a physical storage device 120B reads the storage image data 1601 written to the external storage device 129.

Figure 46:
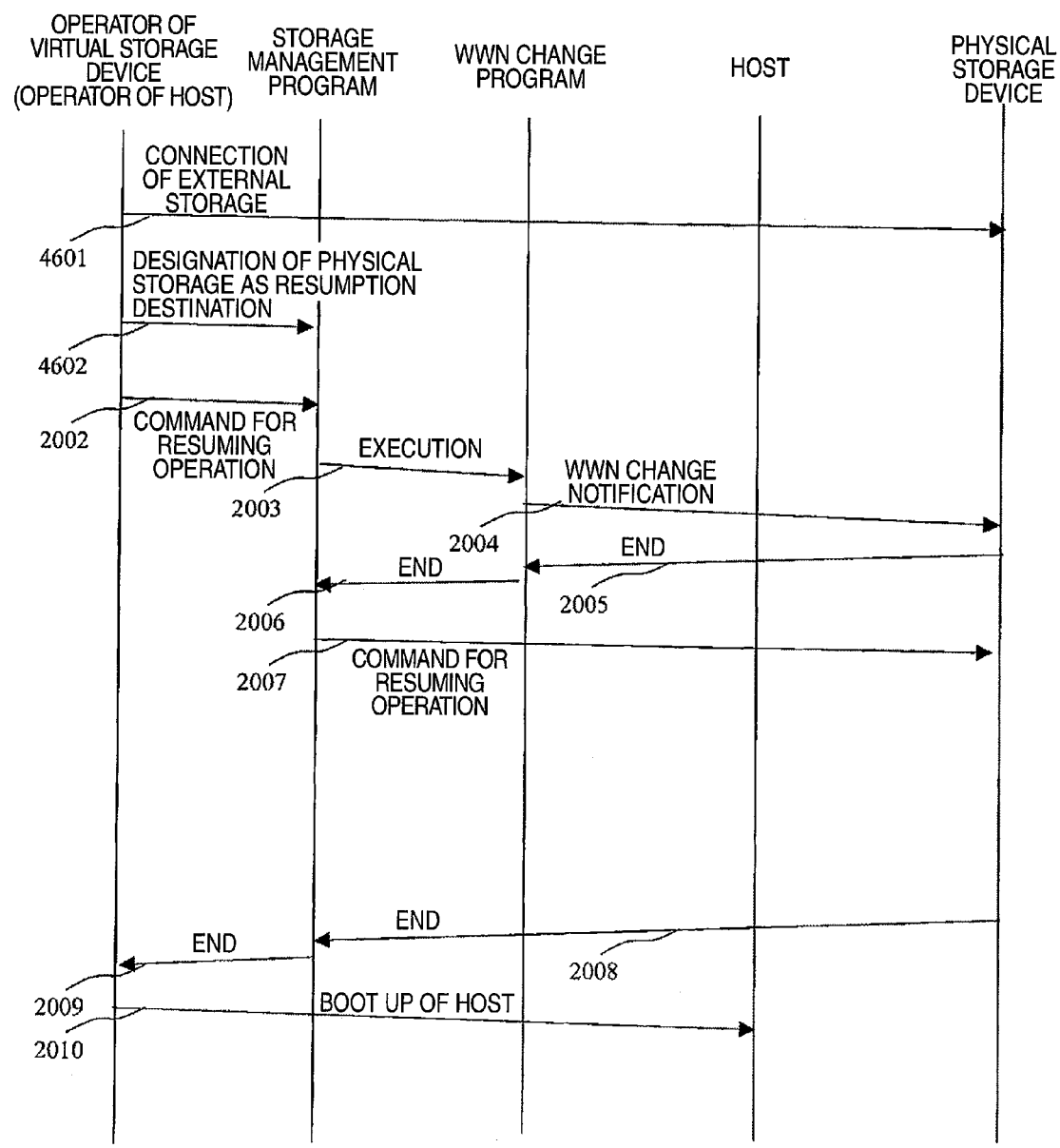
FIG. 46 is a diagram showing the entire procedure of resuming operations in the fourth embodiment of the invention.

FIG. 46 is a ladder chart at the time of resumption of operation in the fourth embodiment.

Compared with the ladder chart of FIG. 20, in the ladder chart of FIG. 46, 4601 and 4602 are different.

For resuming operations, an operator of the virtual storage device 106 or an operator of the host 103 connects the external storage device 129 to a port 128B of the physical storage device 120B being a target for resumption of operation (4601). Such a connection may be established over the network 119B, or directly to the port 128B as an alternative to the port 128A. When the physical storage device 129 is already connected to the physical storage device 120B over the network 119B, 4601 may be skipped.

The operator of the virtual storage device 106 then designates any of the physical storage devices 120 as a target for resumption of operation through the GUI screen 3102 of the management server 102 (4602). To be specific, the operator of the virtual storage device 106 designates the number and ID allocated to each of the physical storage devices 120.

The procedure thereafter is the same as that in the first embodiment, and thus is not described again.

Figures 47, 48:
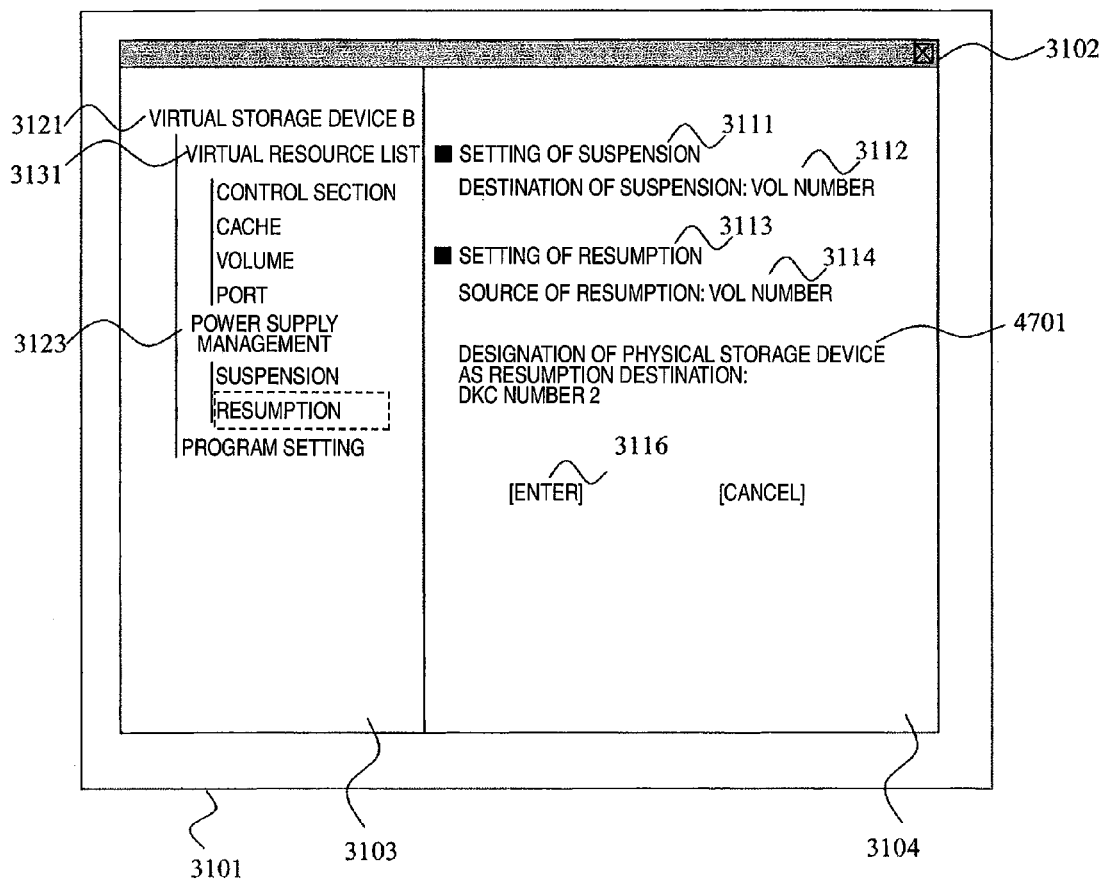
FIG. 47 is a diagram showing a GUI of a management server in the fourth embodiment of the invention.
FIG. 48 is a diagram showing virtual storage configuration information in a fifth embodiment of the invention.

FIG. 47 is a diagram showing the GUI screen 3102 of the management server 102.

Compared with the screen of FIG. 31, in the screen of FIG. 46, an element 4701 is different.

The resumption setting screen 3113 includes the element of "resumption-destination physical storage device 4701" for use to designate the physical storage device as a target for resumption of operation. With such an element of "resumption-destination physical storage device 4701", the operator of the virtual storage device 106 designates the number and ID allocated to each of the physical storage devices 120.

When the operator of the virtual storage device 106 depresses the enter button 3116, by the storage management program and the WWN change program, the management server 102 communicates with the physical storage device designated by the element of "resumption-destination physical storage device 4701", and executes the various types of processes described in the first embodiment.

The remaining setting elements on the GUI screen 3102 of the management server 102 are the same as those in the first embodiment, and thus are not described again.

As such, the external storage device 129 carrying therein the storage image data 1601 is shared for use among a plurality of storage devices (120A, 120B) over the network 119B. Any other physical storage device being a target for resumption of operation then refers to the storage image data 1601, and executes the resumption process. This accordingly enables to resume the operation of the virtual storage device 106 using the physical storage device 120B, which is different from the physical storage device 120A that has put the virtual storage device 106 into a suspend mode.

Fifth Embodiment

In a fifth embodiment, described is a method for restructuring a parity group in accordance with the performance requirements designated by an operator of the virtual storage device 106.

In the below, in the fifth embodiment, any difference from the first to third embodiments is described.

FIG. 48 is a diagram showing the data structure of a part of the virtual storage configuration information 205.

Compared with the virtual storage configuration information 801 of FIG. 8, in the virtual storage configuration information of FIG. 48, elements 4813 and 4814 are different.

That is, the virtual storage configuration information 701 described in the first embodiment is additionally provided with the elements of "physical disk performance requirements 4813" and "RAID level performance requirements 4814".

The operator of the virtual storage device 106 makes an input of performance requirements through the GUI screen 3102 of the management server 102. The management server 102 forwards the performance requirements to the physical storage device 120. The control processor 124 in the physical storage device 120 then makes inputs to the virtual storage configuration information 701, i.e., to the element of "physical disk performance requirements 4813" and the element of "RAID level performance requirements 4814".

The control processor 124 makes an input of rotation frequency of a hard disk into the element of "physical disk performance requirements 4813", e.g., "1.5 krpm". Alternatively, the control processor 124 may make an input of access speed of a hard disk into the element of "physical disk performance requirements 4813", e.g., "60 MB/s" and "30 IOPS".

The control processor 124 then makes an input of RAID level into the element of "RAID level performance requirements 4814", e.g., "RAID1", "RAID5", and "RAID6".

FIG. 49 is a diagram showing the data structure of the physical disk control information 905.

Compared with the physical disk control information of FIG. 12, in the physical disk control information of FIG. 49, an element 4913 is different.

The control processor 124 makes an input of rotation frequency of a hard disk into the element of "physical disk performance 4913", e.g., "1 krpm". Alternatively, the control processor 124 may make an input of access speed of a hard disk into the element of "physical disk performance 4913", e.g., "60 MB/s" and "30 IOPS".

Still alternatively, the control processor 124 may make an input into the element of "physical disk performance 4913" based on the type of a physical disk, or the operator may make an input into the element of "physical disk performance 4913" for each physical disk from the management server 102.

Figure 50B:
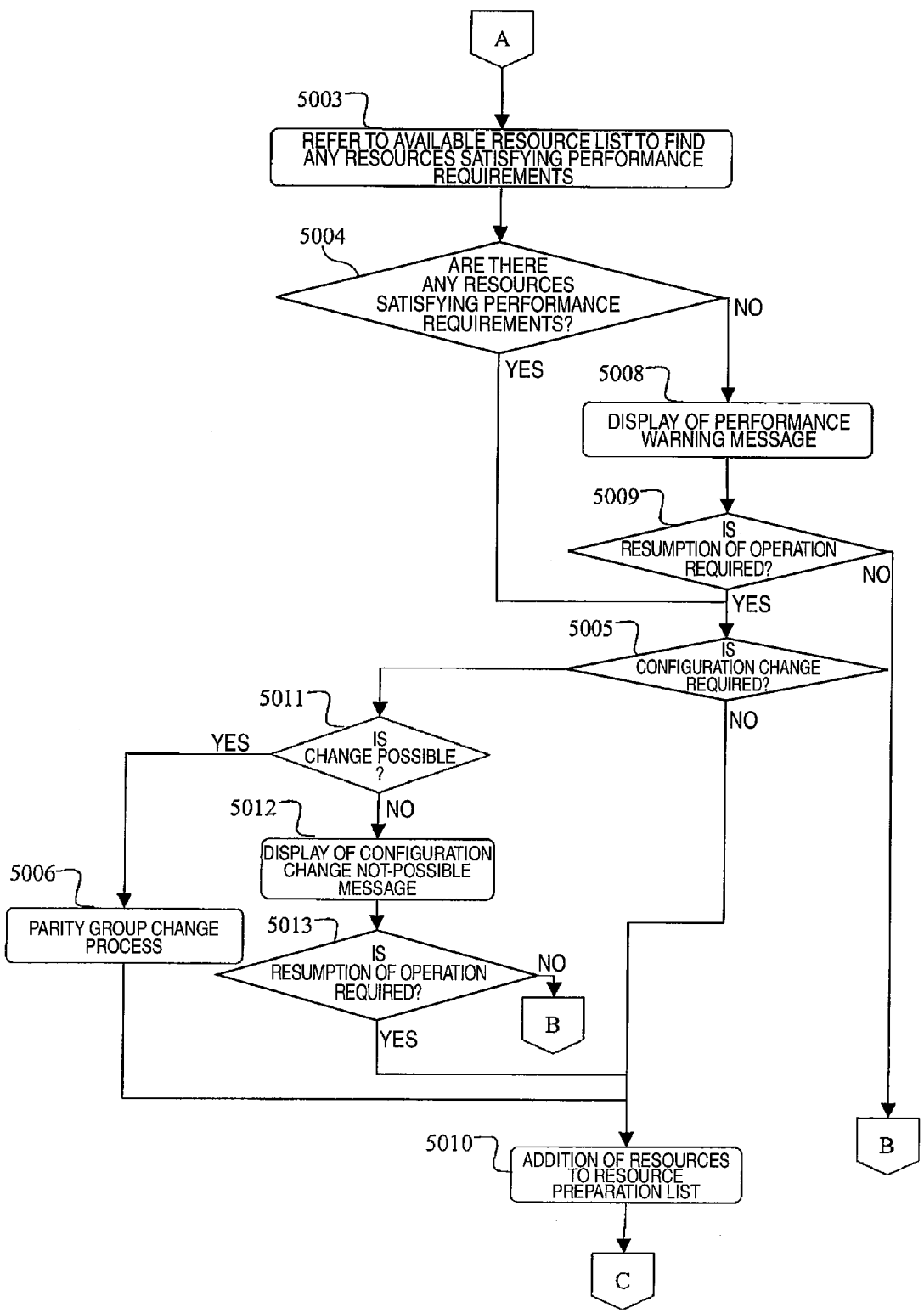
FIG. 50B is another flowchart of the resource preparation process in the fifth embodiment of the invention.

FIGS. 50A and 50B are each a flowchart of the resource preparation process.

Compared with the flowchart of FIG. 38, in the flowcharts of FIGS. 50A and 50B, steps 5001 to 5006, and steps 5008 to 5013 are different.

Any other processes in the resource preparation process being the same as those in the resource preparation process in the first to third embodiments are not described twice.

For any one specific needed resources found in step 1101, a search is made for any available resources, and an available resource list is created (step 5001). To be specific, the control processor 124 refers to the element of "state of use" in the information corresponding to any needed resources, i.e., the resource volume control information 901, the resource cache memory control information 902, and the resource task control information 903. The control processor 124 then creates an available resource list with the resources showing "not in use" in the element of "state of use". When the needed resources are a volume, for example, the control processor 124 refers to the element of "state of use 1024" in the resource volume control information 901, and creates a list of the resources showing "not in use".

The control processor 124 then refers to the available resource list created in step 5001 to see whether there is any available resources or not. When there is no available resources (N in step 5002), a warning message is displayed (step 1108). When there are any available resources (Y in step 5002), the control processor 124 searches the available resource list to find any resources satisfying the performance requirements (step 5003).

In the below, the process in step 5003 is described more specifically. First of all, a value comparison is made between the element of "physical disk performance requirements 4813" in the virtual storage configuration information 4801 and the element of "physical disk performance requirements 4913" in the physical disk control information 4901 for physical disks corresponding to each of the resource elements in the available resource list. As a result of such a value comparison, when the value in the element of "physical disk performance requirements 4813" in the virtual storage configuration information 4801 is the same as or larger than the value in the element of "physical disk performance requirements 4913", it means that the physical disk performance requirements in the element of "physical disk performance requirements 4813" of the resources are satisfied.

Thereafter, a detail comparison is made between the element of "RAID level performance requirements 4814" in the virtual storage configuration information 4801 and the element of "RAID level 1113" in the parity group control information 904 for parity groups corresponding to each of the resource elements in the available resource list. As a result of such a detail comparison, when the details in the element of "RAID level performance requirements 4814" are the same as the details in the element of "RAID level 1113" corresponding to the available resource list, it means that the RAID level performance requirements in the element of "RAID level performance requirements 4814" of the resources are satisfied. When the available resource list carries no such resources having the same details, the element of "RAID level performance requirements 4814" are satisfied as below. That is, only when the available resource list carries any resources belonging to a parity group not in use by any of the virtual storage devices 106, the RAID level of the parity group including such resources is changed. As such, in step 5003, the control processor 124 refers to the available resource list created in step 5001 to see whether there are any resources satisfying two requirements, i.e., the physical disk performance requirements 4813 and the RAID level performance requirements 4814.

This is the end of the description of step 5003.

The control processor 124 then checks whether there are any resources satisfying the requirements (step 5004). When the control processor 124 determines that the physical disk performance requirements 4813 and the RAID level performance requirements 4814 are not satisfied in step 5003 (N in step 5004), a performance warning message is displayed on the GUI screen 3102 of the management server 102 (step 5008). The performance warning message will be described in detail later by referring to FIG. 51.

When the control processor 124 determines that there are any resources satisfying the physical disk performance requirements 4813 in step 5003 (Y in step 5004), the control processor 124 checks whether any configuration change is required or not (step 5005). In step 5003, the control processor 124 makes a comparison with the details in the element of "RAID level 1113" in the parity group control information 904. When there are no such resources having the same details, the control processor 124 determines in step 5005 that the configuration change is required (Y in step 5005), and then checks whether the parity group can be changed or not (step 5011).

When the available resource list carries no such resources as belonging to the parity group not in use by any of the virtual storage devices 106 in step 5003, the control processor 124 determines that the parity group cannot be changed (N in step 5011). If this is the case, the GUI screen 3102 of the management server 102 displays thereon a message telling that the configuration change is not possible, i.e., configuration change not-possible message (step 5012).

After the configuration change not-possible message is displayed in step 5012, the operator of the virtual storage device 106 designates "resumption required" or "cancel" through the GUI screen 3102 of the management server 102 (step 5013). When the operator of the virtual storage device 106 designates "resumption required" (Y in step 5013),the resource preparation list is added with the resources when the control processor 124 determines that there are such resources as satisfying the performance requirements in step 5004, or with any arbitrary resources in the available resource list when the control processor 124 determines that there are no such resources as satisfying the performance requirements (step 5010). When the operator of the virtual storage device 106 designates "cancel" (N in step 5013), this is the end of the resource preparation process, and the resumption process is thus interrupted.

In step 5003, when the available resource list carries the resources belonging to the parity group not in use by any of the virtual storage devices 106, a determination is made that the parity group can be changed (N in step 5011), and the resources are subjected to a parity group change process 5006.

The parity group change process 5006 is executed for a configuration change of the parity group including any resources into the RAID level in the element of "RAID level performance requirements 4814". Because it is confirmed in step 5003 that there is no virtual storage device 106 using the parity group, such a configuration change does not affect other virtual storage devices 106. In the parity group change process 5006, after the RAID level of the parity group is changed, the control processor 124 generates a new resource volume using the parity group. At this time, the control processor 124 updates the element of "RAID level 1113" in the parity group control information 904. After the RAID level is changed as such, when the parity group is changed in size, the control processor 124 changes the resource volume control information 901.

After the completion of the parity group change process 5006, the resource volume is added to the resource preparation list (step 5010).

When the control processor 124 determines in step 5003 that there are any available resources satisfying the physical disk performance requirements, the process is started from step 5005.

After the performance warning message is displayed in step 5008, when the operator of the virtual storage device 106 designates "resumption required" through the GUI screen 3102 of the management server 102 (Y in step 5009), the process is started from step 5005. When the operator of the virtual storage device designates "cancel" through the GUI screen 3102 of the management server 102 (N in step 5009), this is the end of the resource preparation process, and the resumption process is interrupted.

After the resource preparation list is added with the resources in step 5010, when the resources found as needed in step 1101 are not yet entirely through with a series of processes, i.e., from step 5001 to step 5010 (N in step 1109), a search is made for any available resources for the next resources in need (step 5001). On the other hand, when the resources found as needed are already entirely through with the series of processes (Y in step 1109), the control processor executes the resource allocate process (step 3811), and this is the end of the process.

Figure 51:
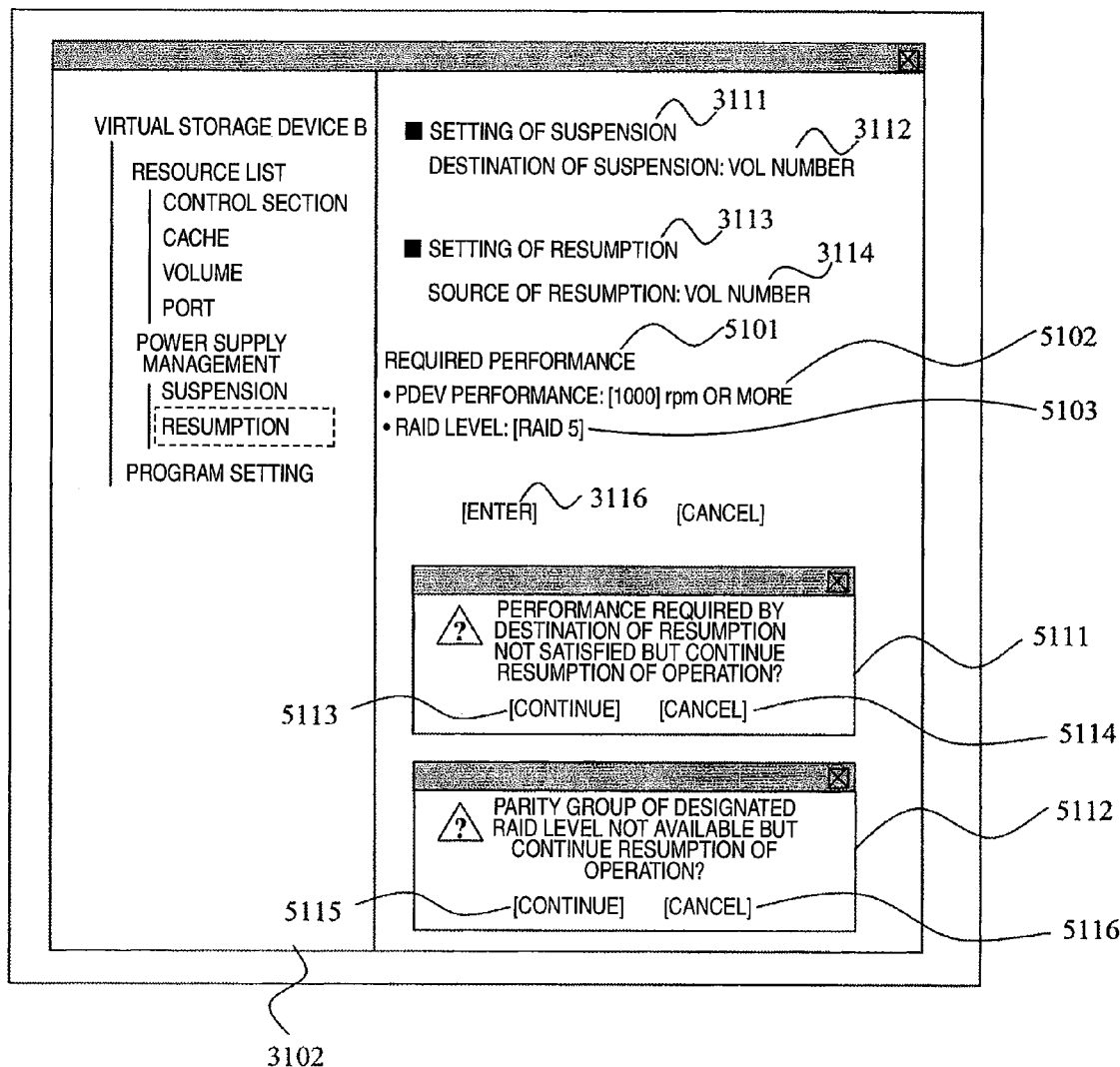
FIG. 51 is a diagram showing a requirements input screen (GUI) in the fifth embodiment of the invention.

FIG. 51 is a diagram showing the GUI screen 3102 of the management server 102.

Compared with the screen of FIG. 31, in the screen of FIG. 51, elements 5101 to 5103, and elements 5111 to 5116 are different.

The GUI screen 3102 of the management server 102 includes the required performance designation screen 5101. The operator of the virtual storage device 106 designates the elements of "physical disk performance 5102" and "RAID level 5103" through the required performance designation screen 5101.

The operator of the virtual storage device 106 makes an input of rotation frequency of a hard disk into the element of "physical disk performance 5102", e.g., "1.5 krpm". Alternatively, an input of access speed of a hard disk may be made into the element of "physical disk performance 5102", e.g., "60 MB/s" and "30 IOPS".

The operator of the virtual storage device 106 makes an input of RAID level into the element of "RAID level 5103", e.g., "RAID1", "RAID5", and "RAID6".

When the operator of the virtual storage device 106 makes an input through the required performance designation screen 5101, and depresses the enter button 3116, the management server 102 responsively forwards, to the physical storage device 120, the setting details set through the required performance designation screen 5101, i.e., in the elements of "physical disk performance 5102" and "RAID level 5103".

When the setting details designated for the element of "physical disk performance 5102" by the operator of the virtual storage device 106 in step 5008 cannot be satisfied, the physical storage device 120 forwards a command to the management server 102 for displaying the performance warning message 5111.

When the continue button 5113 is depressed, the management server 102 responsively forwards, to the physical storage device 120, a message to continue the resumption of operation. The physical storage device 120 then determines that the resumption of operation is required in step 5009 (Y in step 5009). When the cancel button 5114 is depressed, the management server 102 responsively forwards, to the physical storage device 120, a message to cancel the resumption of operation. The physical storage device 120 then determines that the resumption of operation is not required in step 5009 (N in step 5009).

When the setting details designated for the element of "RAID level 5103" by the operator of the virtual storage device 106 in step 5012 cannot be satisfied, the physical storage device 120 forwards a command to the management server 102 for displaying the configuration change not-possible message 5112.

When the continue button 5115 is depressed, the management server 102 responsively forwards, to the physical storage device 120, a message to continue the resumption of operation. The physical storage device 120 then determines that the resumption of operation is required in step 5013 (Y in step 5013). When the cancel button 5116 is depressed, the management server 102 responsively forwards, to the physical storage device 120, a message to cancel the resumption of operation. The physical storage device 120 then determines that the resumption of operation is not required in step 5013 (N in step 5013).

As such, even when the physical resources that have been allocated by the physical storage device 120 to a virtual storage device 106A before suspension cannot be allocated thereto again during resumption of operation due to the reason that the physical resources are being used in another virtual storage device 106B, any new resources satisfying the required performance are generated by steps 5003 and 5006 at the time of resumption of operation, i.e., in step 5003, a search is made for any available resources satisfying the performance requirements, and in step 5006, the parity group change process is performed. As such, thus generated new resources are used for resumption of operation, thereby favorably preventing any possible performance decrease. Moreover, even when no such resources satisfying the performance requirements cannot be generated in step 5006, the operator of the virtual storage device 106 can be notified by the performance warning message 5111 or the configuration change not-possible message 5112 displayed by the management server. As such, the operator is encouraged to take measures thereagainst, e.g., additional provision of a high-performance physical disk.

Sixth Embodiment

In a sixth embodiment, described is a method for preventing a case where resumption of operation is not allowed due to shortage of resources by reserving any resources for use when the virtual storage device 106 is put into a suspend mode. This embodiment can be applied to the first to fourth embodiments.

In the below, in the sixth embodiment, any difference from the first embodiment is described.

Figures 52, 53:
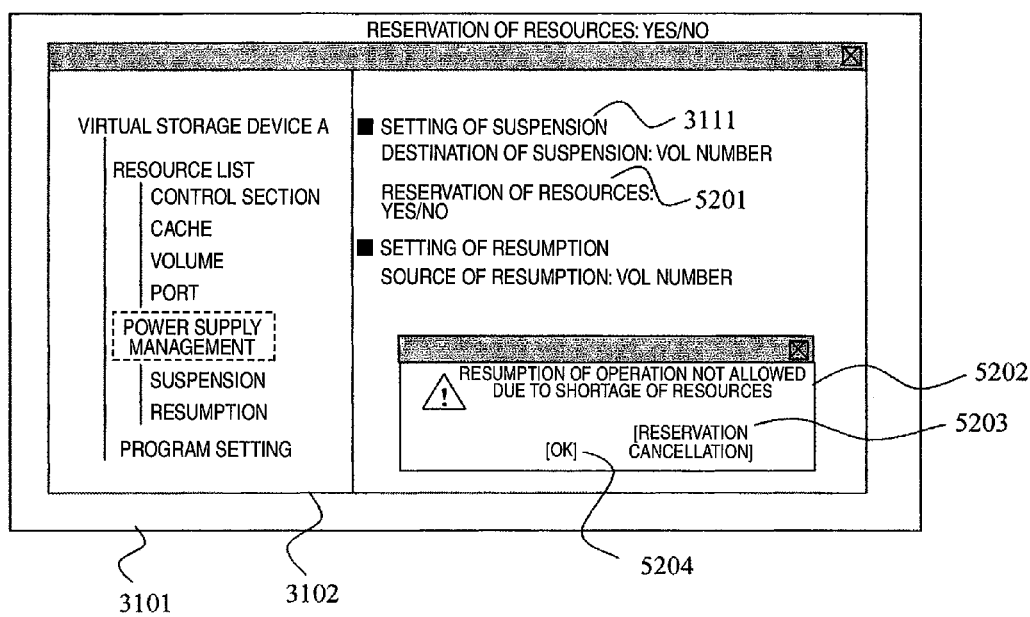
FIG. 52 is a diagram showing a GUI of a management server in a sixth embodiment of the invention.
FIG. 53 is a diagram showing resource reservation information in the sixth embodiment of the invention.

FIG. 52 is a diagram showing the GUI screen 3102 of the management server 102.

Compared with the screen of FIG. 31, in the screen of FIG. 52, elements 5201 to 5204 are different.

For reserving any resources for use, an operator of the virtual storage device 106 makes a setting of "YES" to the element of "resource reservation 5201" in the suspension setting screen 3111. When such resource reservation is not required, the operator of the virtual storage device 106 makes a setting of "NO" to the element of "resource reservation 5201".

When the operation of the virtual storage device 106 cannot be resumed due to shortage of resources, the warning message 5202 is displayed on the GUI screen 3102 of the management server 102. When the reservation cancellation button 5203 in the warning message 5202 is depressed, any reserved resources are unreserved. The purpose of unreserving the reserved resources as such is to enable resumption of operation of the virtual storage device 106 at the time of emergency when the operation of the virtual storage device 106 cannot be resumed due to the shortage of resources. The detailed operation on the side of the physical storage device will be described later by referring to FIG. 55.

FIG. 53 is a diagram showing the data structure of resource reservation information.

Resource reservation information 5301 includes elements of "resource type 5311", "resource number 5312", "reservation YES/NO 5513", "virtual storage device number 5314", and "virtual resource number 5315". The resource reservation information 5301 is stored in the control memory 125.

The control processor 124 makes an input of resource type into the element of "resource type 5311", e.g., "resource task", and "resource volume".

The control processor 124 makes an input of resource number into the element of "resource number 5312". When the element of "reservation YES/NO" shows that the resources under the resource number in the element of "resource number 5312" are reserved, the control processor 124 makes an input of "YES" to the element of "reservation YES/NO 5313", and makes an input of "NO" thereto when such resources are not yet reserved.

When the element of "reservation YES/NO 5313" shows "YES", to the element of "virtual storage device number 5314", the control processor 124 makes an input of number of the virtual storage device 106 that made the resource reservation.

When the element of "reservation YES/NO 5313" shows "YES", to the element of "virtual resource number 5315", the control processor 124 makes an input of virtual resource number corresponding to the resources under the resource number in the element of "resource number 5312" of the reservation-made virtual storage device 106 before it is put into the suspend mode.

Figure 54:
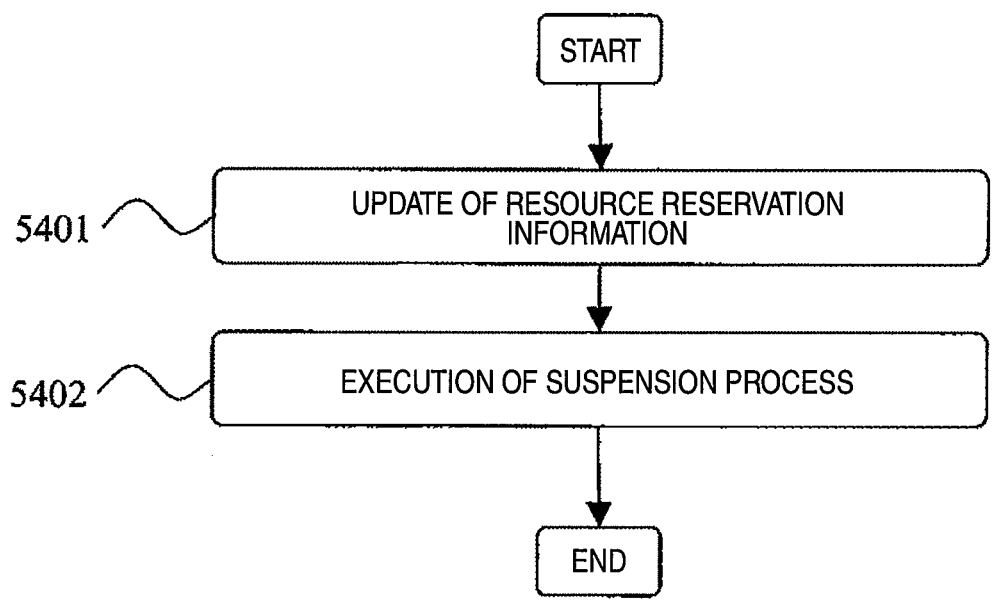
FIG. 54 is a flowchart of a suspension process at the time of making a resource reservation in the sixth embodiment of the invention.

FIG. 54 is a flowchart of the suspension process at the time of resource reservation.

When the operator of the virtual storage device 106 issues a suspension command by making a setting of "YES" to the element of "resource reservation 5201" through the GUI screen 3102 of the management server 102, first of all, the physical storage device 120 updates the resource reservation information (step 5401). To be specific, for each of the resources being used by the virtual storage device 106 being the suspension target, the control processor 124 refers to the virtual storage resource management information 211, and makes inputs to the resource reservation information 5301, i.e., make inputs of numbers each corresponding to the elements of "resource type 5311", "resource number 5312", "virtual storage device number 5314", and "virtual resource number 5315". The control processor 124 also makes an input of "YES" to the element of "reservation YES/NO 5313".

Thereafter, the suspension process 311 is executed (step 5402).

Figure 55:
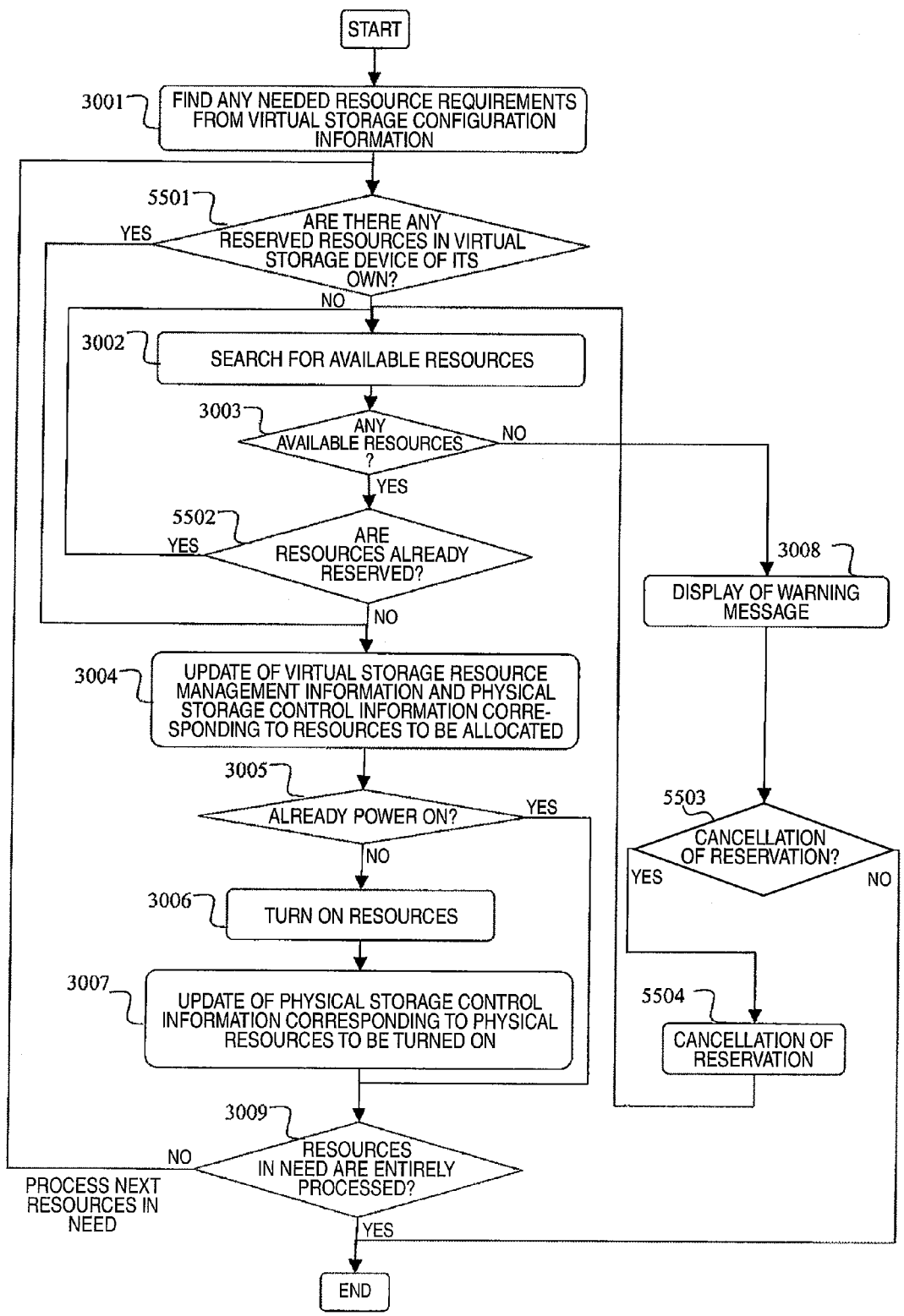
FIG. 55 is a flowchart of a resource preparation process in the sixth embodiment of the invention.

FIG. 55 is a flowchart of the resource preparation process at the time of resumption of operation.

Compared with the flowchart of FIG. 30, in the flowchart of FIG. 55, steps 5501 to 5504 are different. The control processor 124 checks the needed resources found in step 3001 to see whether there are any reserved resources in the virtual storage device being a target for resumption of operation (step 5501). To be specific, the control processor 124 refers to the resource reservation information 5301, and checks whether there are any resources under the number of the virtual storage device 106 being a target for resumption of operation, and showing "YES" in the element of "reservation YES/NO 5313".

When there are such reserved resources (Y in step 5501) the control processor 124 makes an input of "NO" for the resources in the element of "reservation YES/NO 5313" in the resource reservation information 5301. The control processor 124 then updates the information corresponding to the above resources to be allocated, i.e., updates the element of "virtual storage resource management information 211" and "physical storage control information 210" (step 3004). In the processes thereafter, any processes similar to those in the first embodiment are not described twice.

When there are no such reserved resources in step 5501 (N in step 5501), a search is made for any available resources (step 3002), and the procedure goes to step 3003.

When a determination is made that there is no available resources in step 3003 (N in step 3003), a warning message is displayed (step 3008). To be specific, in step 3008, the physical storage device 120 forwards a command to the management server 102 for displaying a warning message. The management server 102 receives this command by the storage management program, thereby displaying the warning message 5202.

When the operator of the virtual storage device 106 depresses the reservation cancellation button 5203 in the warning message 5202, a command for reservation cancellation is forwarded from the management server 102 to the physical storage device 120. The physical storage device 120 then determines to perform reservation cancellation (Y in step 5503) and the reservation cancellation is accordingly performed (step 5504). To be specific, in step 5504, the control processor 124 makes an input of "NO" to the element of "reservation YES/NO 5313" in the resource reservation information 5301. Thereafter, the procedure returns to step 3002, and a search is made for any available resources from the start.

When the operator of the virtual storage device 106 depresses the OK button 5204 in the warning message 5202, the management server 102 forwards, to the physical storage device 120, a command for not performing reservation cancellation. The physical storage device 120 thus determines not to perform reservation cancellation (N in step 5505), and thus the resource preparation process is ended, and the resumption operation is interrupted.

When the determination in step 3003 is so made that there are available resources (N in step 3003), the physical storage device 120 checks the available resources to see whether those are already reserved or not (step 5502). To be specific, the control processor 124 refers to the resource reservation information 5301 corresponding to the number of the available resources, and when the element of "reservation YES/NO 5313" shows "YES", determines that the resources have been already reserved (Y in step 5502). The procedure then goes to step 3002 for the control processor 124 to find any other available resources. On the other hand, when the element of "reservation YES/NO 5313" shows "NO", the control processor 124 determines that the resources have not been reserved (N in step 5502), and the procedure goes to step 3004. Any processes thereafter same as those in the first embodiment are not described again.

The above description is summarized as below. That is, an operator of the virtual storage device 1201A designates to make a resource reservation through the GUI screen 3102 of the management server 102. When the virtual storage device 1201A is being put in a suspended mode, the physical storage device 120 updates the resource reservation information 5301 in step 5401. At the time of resuming the operation of another virtual storage device 1201C (not described), the physical storage device 120 checks whether the resources are reserved or not in step 5502 in the resource preparation process. The physical storage device 120 then allocates only the resources not yet reserved. In this manner, the virtual storage device 1201A can be always ready for resumption of operation with no shortage of resources.

Seventh Embodiment

In a seventh embodiment, described is a method for reducing the execution time of suspension and resumption processes by allowing an operator of the virtual storage device 106 to select whether or not to save volume data when the virtual storage device 106 is being put in a suspend mode.

This embodiment can be applied to the first to fourth embodiments.

In the below, in the seventh embodiment, any difference from the first and sixth embodiments is described.

Figure 56:
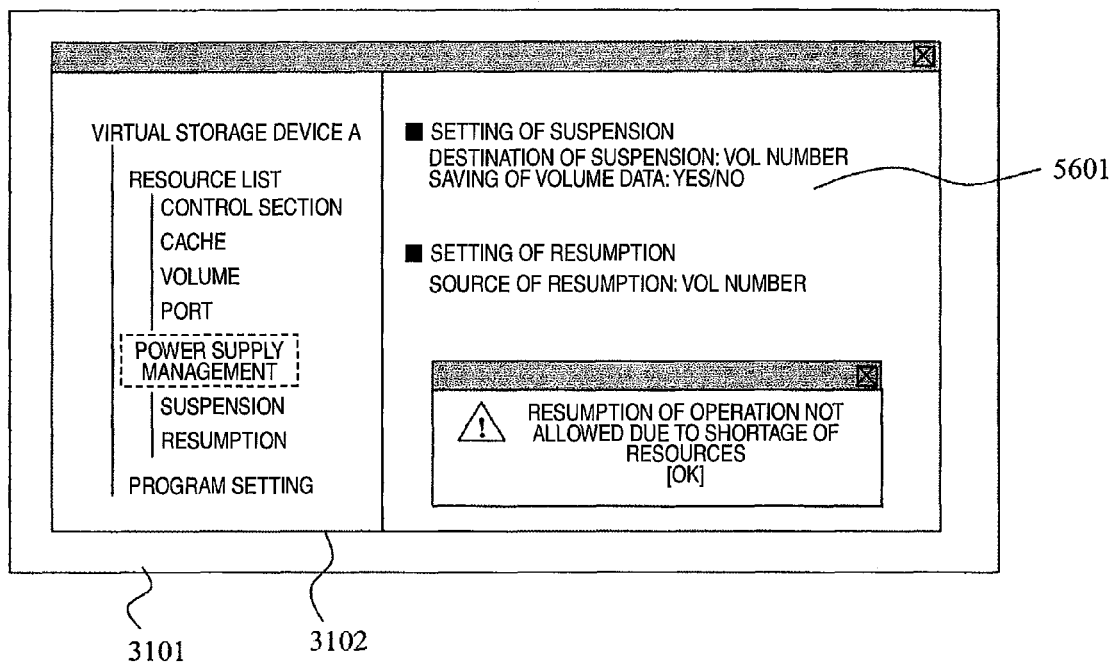
FIG. 56 is a diagram showing a GUI of a management server in a seventh embodiment of the invention.

FIG. 56 is a diagram showing the screen 3101 of the management server 102.

Compared with the screen of FIG. 31, in the screen of FIG. 56, an element 5601 is different.

For saving volume data, the operator of the virtual storage device 106 makes an input of "YES" to the element of "volume data saving 5601", and makes an input of "NO" thereto when the volume data is not to be saved.

For saving the volume data, the physical storage device 120 copies the volume data into any other volume, e.g., external storage device 129. This takes a long time to complete such a process of saving the volume data. When the volume data is not to be saved, the time for such a process can be shortened. Note here that, if the volume data is not to be saved, the data remains in the resource volume, and the resource volume cannot be deallocated. As such, the resource volume cannot be available for use by any other virtual storage devices. The operator is thus offered a choice between saving of volume data and not saving of volume data considering constraints of resumption time of the system, for example.

Figure 57:
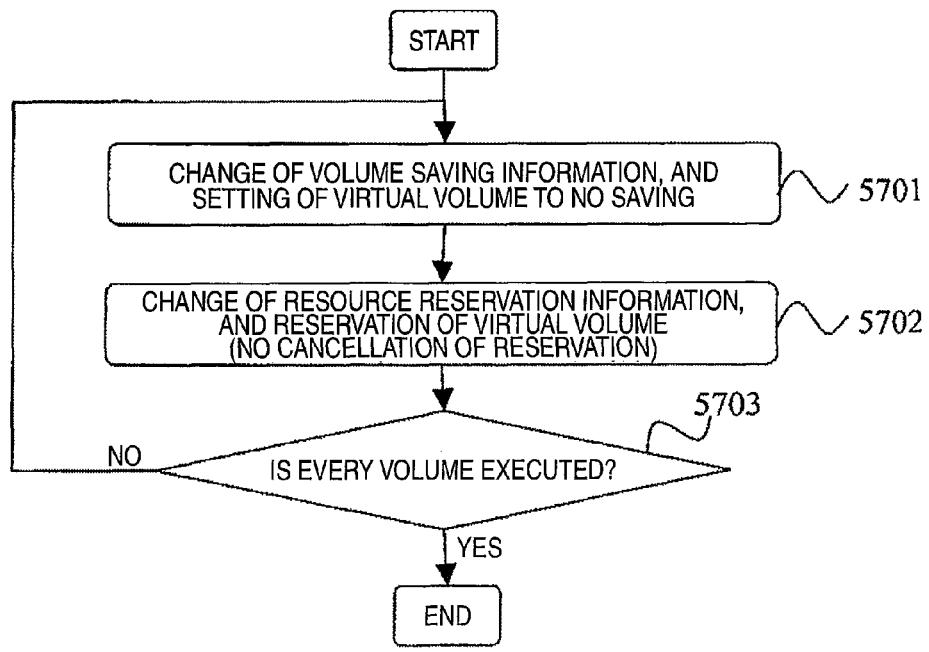
FIG. 57 is a flowchart of a volume saving designation process in the seventh embodiment of the invention.

FIG. 57 is a flowchart of a volume saving designation process.

The control processor 124 of the physical storage device 120 executes the volume saving designation process.

The volume saving designation process is executed only when the operator of the virtual storage device 106 makes a setting of "YES" to the element of "volume data saving 5601" through the GUI screen 3102 of the management server 102. At this time, the management server 102 communicates with the physical storage device 120 by the storage management program 1704, and issues a command to the physical storage device 120 for executing the volume saving designation process.

When the volume saving designation process is started, the control processor 124 changes volume saving information 5802, and designates that the virtual volume is not to be saved (step 5701). To be specific, the control processor 124 makes an input of "NO" to an element of "saving YES/NO 6212" in the volume saving information 5802 under the virtual volume number in use by the virtual storage device 106 being a target for suspension.

Next, the control processor 124 changes the resource reservation information 5301 (related to the sixth embodiment), and makes a reservation of virtual volume (step 5702). To be specific, the control processor 124 refers to the virtual storage resource management information 1521, and makes inputs to the resource reservation information 5301, i.e., make inputs of numbers each corresponding to the elements of "resource type 5311", "resource number 5312", "virtual storage device number 5314", and "virtual resource number 5315". The control processor 124 also makes an input of "YES" to the element of "reservation YES/NO 5313".

In the description in the sixth embodiment, as for such reservation making, the reservation can be cancelled in step 5505. However, in this embodiment, the volume data is not saved to any other volume. Therefore, there may be a possibility of data corruption if the reservation cancellation is performed during resumption of operation of any other virtual storage device 106, and if the resource volume is used. If the data corruption occurs as such, the data cannot be restored. In consideration thereof, during the process of step 5702, the control processor 124 makes a setting of "NO" to the element of "reservation cancellation YES/NO information 6001" for the virtual volume of the virtual storage device 106 being a target for suspension. With such a setting, the control processor 124 can protect the virtual volume from reservation cancellation by checking the element of "reservation cancellation YES/NO information 6001" in step 6301 of the resource preparation process, which will be described later.

Next, as to every virtual volume currently in use by the virtual storage device 106 being a target for suspension, a determination is made whether the process has been executed thereto or not (step 5703). When the process is not yet executed thereto (N in step 5703), the procedure is started from step 5701 for the next virtual volume, and when the process has been executed thereto (Y in step 5703), this is the end of the procedure.

Figures 58, 59:
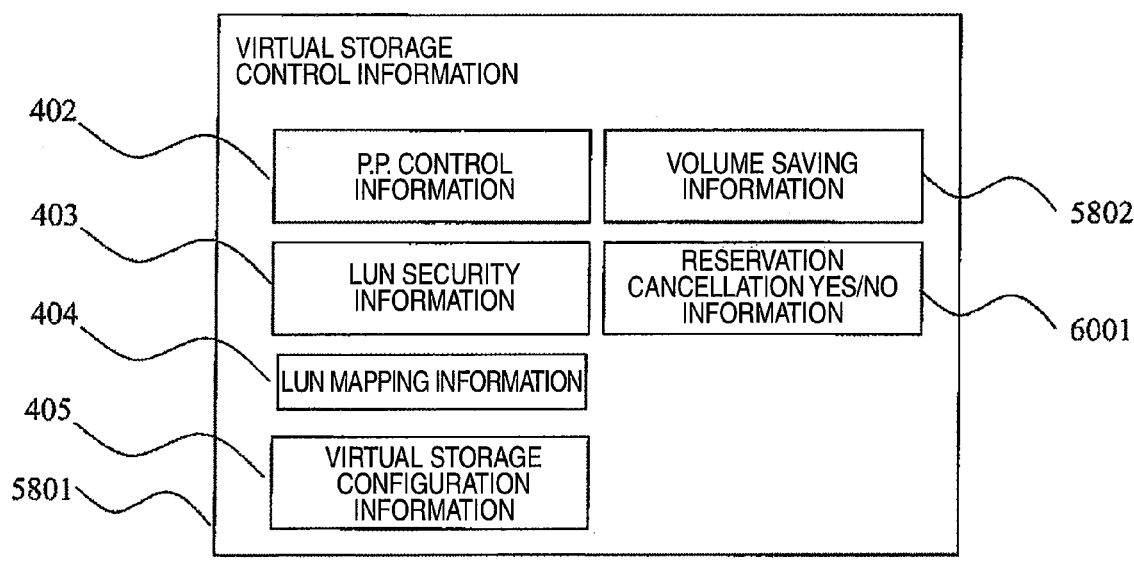
FIG. 58 is a diagram showing virtual storage control information in the seventh embodiment of the invention.
FIG. 59 is a diagram showing volume saving information in the seventh embodiment of the invention.

FIG. 58 is a diagram showing information in the virtual storage control information.

Compared with the virtual storage control information 201 of FIG. 4, in the virtual storage control information of FIG. 58, the elements 5802 and 6001 are different.

The virtual storage control information 401 described in the first embodiment is additionally provided with virtual storage configuration information 5801, the volume saving information 5802, and the reservation cancellation YES/NO information 6001. The volume saving information 5802 and the reservation cancellation YES/NO information 6001 will be described later.

FIG. 59 is a diagram showing the data structure of the volume saving information.

The volume saving information 5802 includes elements of "virtual volume number 5911" and "saving YES/NO 5912".

The element of "saving YES/NO 5912" indicates whether the virtual volume corresponding to the element of "virtual volume number 5911" is to be saved or not when the virtual storage device 106 including the virtual volume is put into a suspend mode. When the virtual volume is to be saved, the control processor 124 makes an input of "YES" to the element of "saving YES/NO 5912" in the volume saving information 5802, and makes an input of "NO" thereto when the virtual volume is not to be saved.

FIG. 60 is a diagram showing the data structure of the reservation cancellation YES/NO information.

Volume saving information 6001 includes elements of virtual volume number 6011" and "reservation cancellation YES/NO 6012".

The element of "reservation cancellation YES/NO 6012" indicates whether the virtual volume corresponding to the element of "virtual volume number 6011" is to be reservation-cancelled or not at the time of resuming the operation of the virtual storage device 106. When the virtual volume is to be reservation-cancelled, the control processor 124 makes an input of "YES" to the element of "reservation cancellation YES/NO 6012" in the volume saving information 6001, and makes an input of "NO" thereto when the virtual volume is not to be reservation-cancelled.

Figure 61:
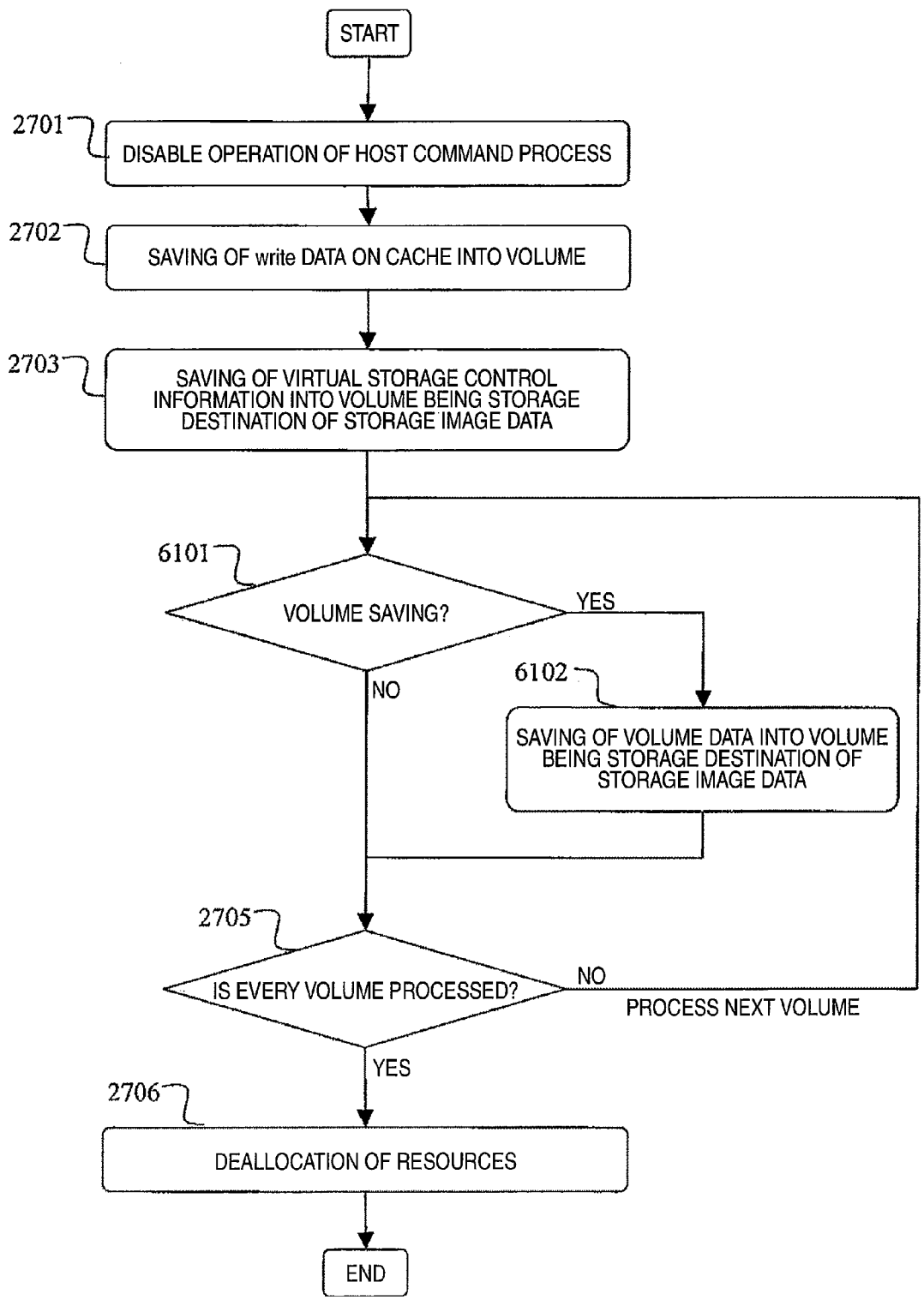
FIG. 61 is a flowchart of a suspension process for a virtual storage in the seventh embodiment of the invention.

FIG. 61 is a flowchart of the suspension process.

Compared with the flowchart of FIG. 27, in the flowchart of FIG. 61, steps 6101 and 6102 are different.

After step 2703, a determination is made whether volume saving is to be performed or not (step 6101). To be specific, when the target resources are a resource volume, the control processor 124 refers to the virtual storage resource management information 1521 and the volume saving information 5802. The control processor 124 then checks the virtual volume number corresponding to the target resource volume, and determines whether the element of "saving YES/NO 5912" under the virtual volume number in the volume saving information 5802 shows "YES" or not. If the element of "saving YES/NO 5912" is showing "YES" (Y in step 6101), the physical storage device 120 saves the volume data into a volume being a storage destination of the storage image data (step 6102). After the completion of step 6102, the procedure goes to step 2705.

When the element of "saving YES/NO 6212" shows "NO" (N in step 6101), the procedure goes to step 2705.

Figure 62:
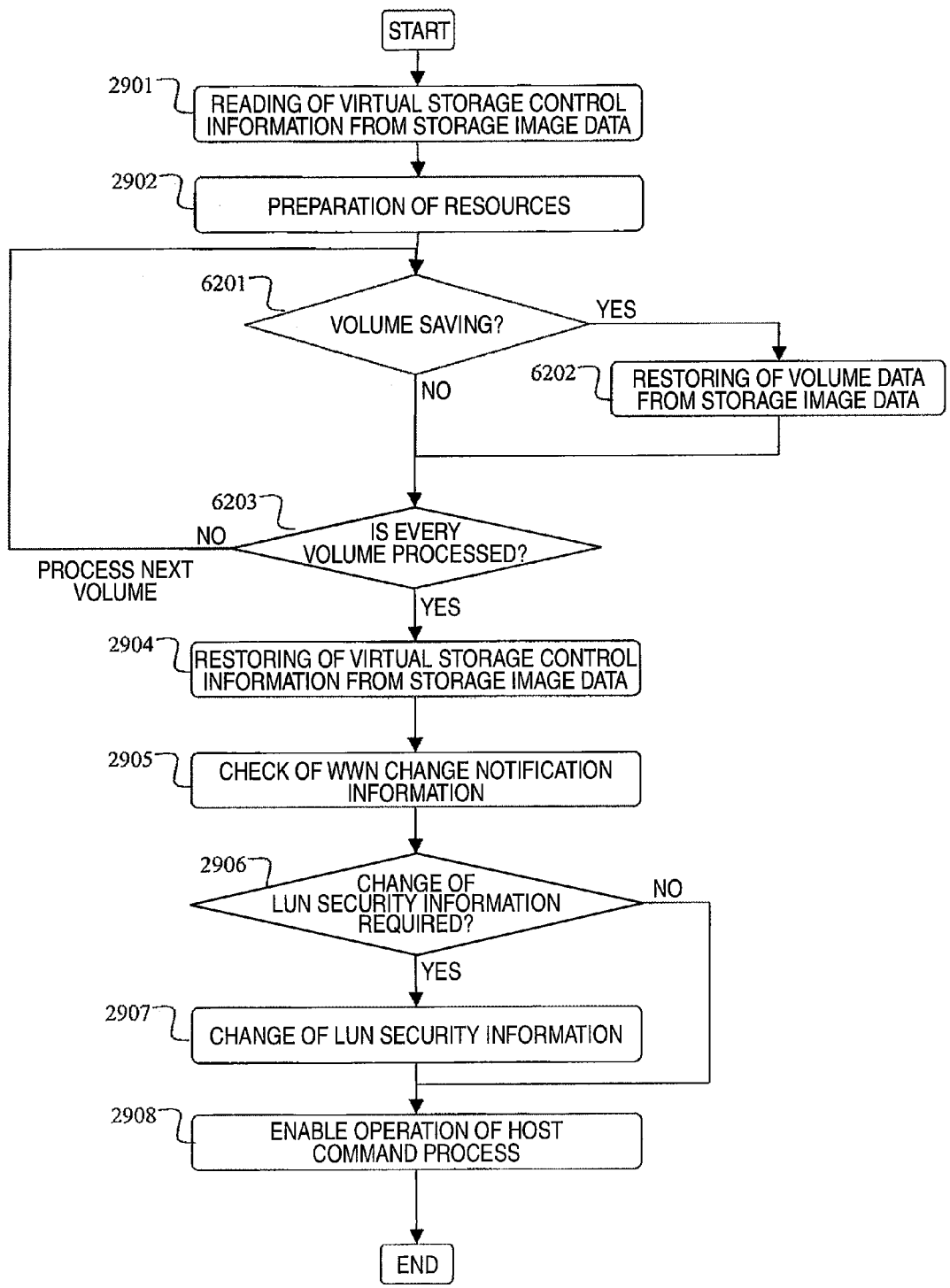
FIG. 62 is a flowchart of a resumption process for the virtual storage in the seventh embodiment of the invention.

FIG. 62 is a flowchart of the resumption process, showing the operation of the virtual storage device 106.

Compared with the flowchart of FIG. 29, in the flowchart of FIG. 62, steps 6201 to 6203 are different.

After step 2902, the control processor 124 determines whether volume saving is to be performed or not (step 6201). To be specific, when the target resources are a resource volume, the control processor 124 refers to the virtual storage resource management information 1521, and the volume saving information 5802. The control processor 124 then checks the virtual volume number corresponding to the target resource volume, and determines whether the element of "saving YES/NO 5912" under the virtual volume number in the volume saving information 5802 shows "YES" or not. If the element of "saving YES/NO 5912" is showing "YES" (Y in step 6201), the volume data is restored from the storage image data 1601 (step 6202). After step 6202, the procedure goes to step 6203.

When the element of "saving YES/NO 5912" is showing "NO" (N in step 6201), the procedure goes to step 6203.

The control processor 124 determines whether every resource volume has been processed or not (step 6203). When the resource volumes have been entirely processed (Y in step 6203), the procedure goes to step 2904. When the resource volumes have not been yet entirely processed (N in step 6203), the procedure is started from step 6201 for the next resource volume.

Figure 63:
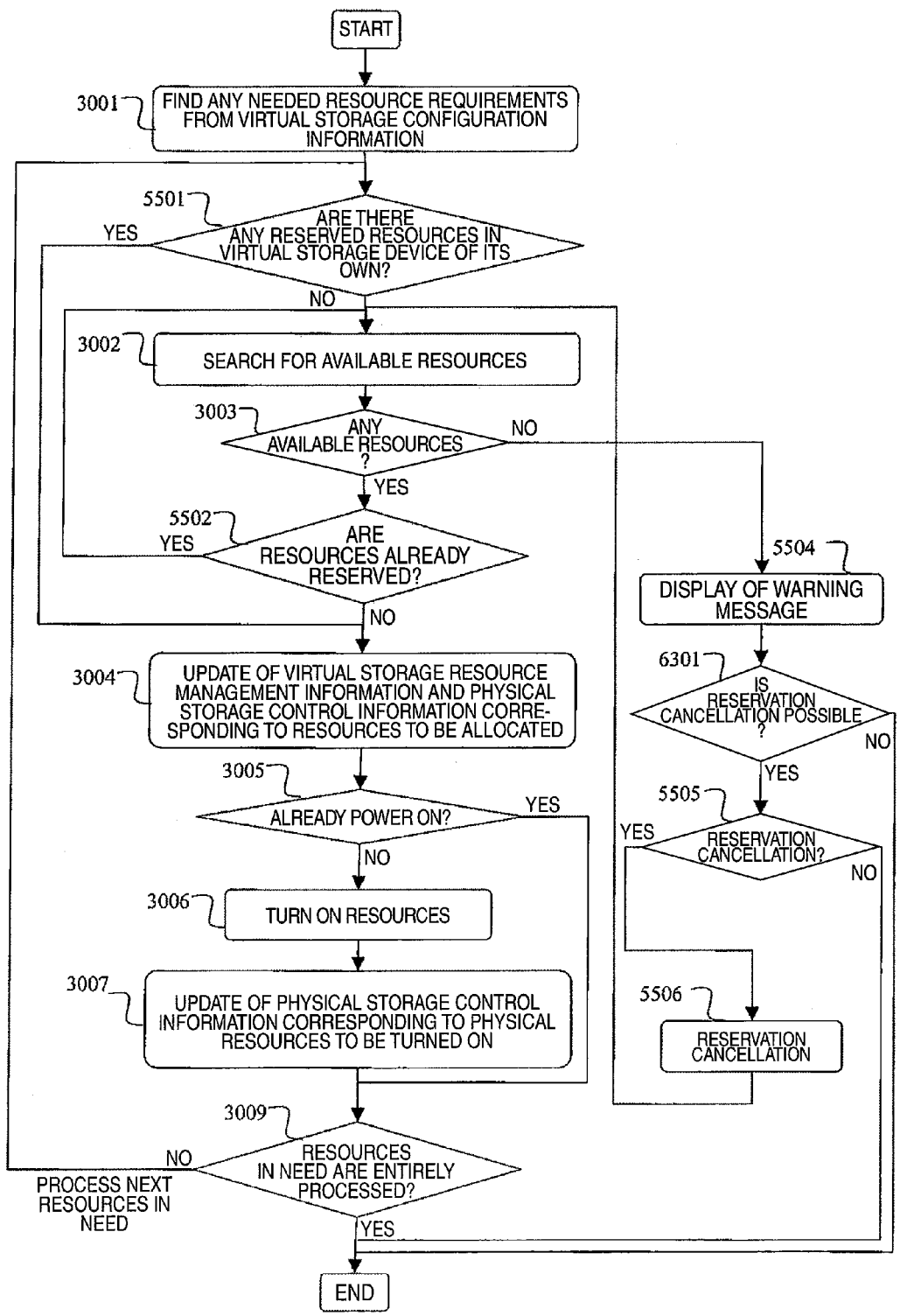
FIG. 63 is a flowchart of a resource preparation process in the seventh embodiment of the invention.

FIG. 63 is a flowchart of the resource preparation process.

Compared with the flowchart of FIG. 55, in the flowchart of FIG. 63, step 6301 is additionally provided.

In step 5504, after displaying the warning message, the control processor 124 of the physical storage device 120 determines whether the target virtual volume can be reservation-cancelled or not (step 6301). To be specific, the control processor 124 checks whether the reservation cancellation YES/NO information 6001 corresponding to the target virtual volume is showing "NO", and if the information 6001 is showing "NO", the procedure is ended with no reservation cancellation (N in step 6301). When the reservation cancellation YES/NO information 6001 is showing "YES" (Y in step 6301), the procedure goes to step 5505.

The above description is summarized as below. That is, at the time of putting the virtual storage device 106 into a suspend mode, the volume saving information 5802 is changed in step 5701. The resource volume currently in use by the virtual storage device 106 is designated as being not a target for data saving. In steps 6101 and 6201, a determination is then made whether the process is to be executed for saving the volume data into any other volume as the storage image data 1601 or not. In this manner, when the volume is not a target for data saving, no data saving is executed thereto, thereby enabling the suspension and resumption processes at high speed.

Alternatively, the reservation cancellation YES/NO information 6001 may be changed, and any reservation cancellation of the virtual volume may be made not valid in step 5702. If this is the case, at the time of resuming the operation of any other virtual storage device 106, instep 6301, the resource volume may be overwritten, thereby protecting corruption of data.

Eighth Embodiment

In an eighth embodiment, described is a process for checking a program license when a physical storage device put into a suspend mode by the virtual storage device 106 is not the same as the physical storage device 120 being a target for resumption of operation.

This embodiment can be applied to the fourth embodiment.

In the below, in the eighth embodiment, only any difference from the first and fourth embodiment is described.

Figure 64:
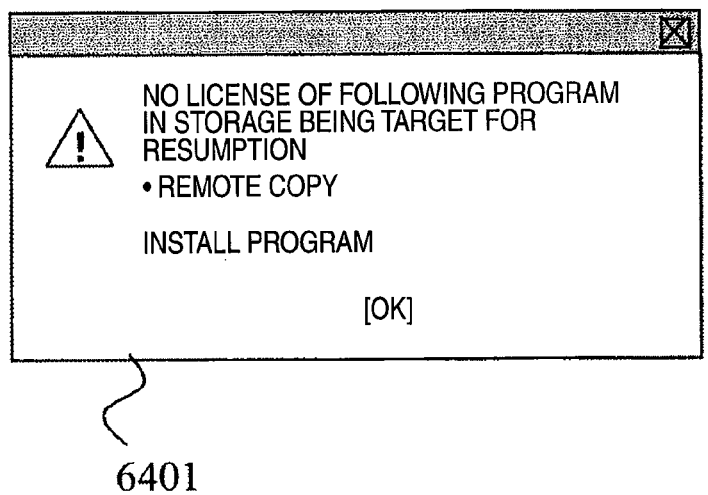
FIG. 64 is a diagram showing a license warning screen (GUI) in an eighth embodiment of the invention.

FIG. 64 shows a warning message indicating no installation of a program license at the time of resumption of operation. This warning message is displayed to an operator of the virtual storage device 106 when the license of the program having been installed in the physical storage device 120 having put the virtual storage device 106 into a suspend mode is not installed in another physical storage device 120 being a destination of resumption.

The message includes a text of "No license of following program in storage being target for resumption. Install program", and the type(s) of the program(s) not installed are displayed, e.g., remote copy.

Figure 65:
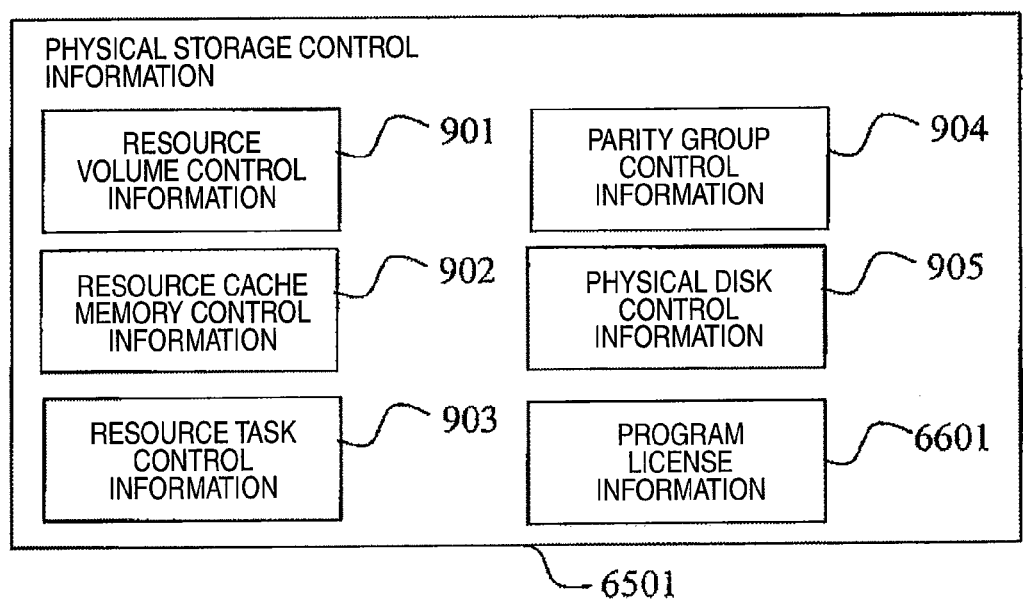
FIG. 65 is a diagram showing physical storage control information in the eighth embodiment of the invention.

FIG. 65 is a diagram showing the information in the physical storage control information.

Compared with the physical storage control information of FIG. 9, in the physical storage control information of FIG. 65, an element 6601 is additionally provided.

In this embodiment, the physical storage control information described in the first embodiment is additionally provided with the program license information 6601.

FIG. 66 is a diagram showing the data structure of the program license information 6601.

The control processor 124 makes an input of program type into the element of "program type 6611" in the program license information 6601, e.g., "local copy" or "remote copy". The control processor 124 also makes an input into an element of "license information 6612" whether the license corresponding to the program type is valid or not.

When license installation is performed through the GUI screen 3102 of the management server 102, the management server 102 communicates with the physical storage device. The control processor 124 then makes an input of "valid" to the element of "license information 6612" under the element of "program type 6611" corresponding to the program license information. Also when license uninstallation is performed through the GUI screen 3102 of the management server 102, the management server 102 communicates with the physical storage device. The control processor 124 then makes an input of "not valid" to the element of "license information 6612" under the element of "program type 6611" corresponding to the program license information.

Figure 67:
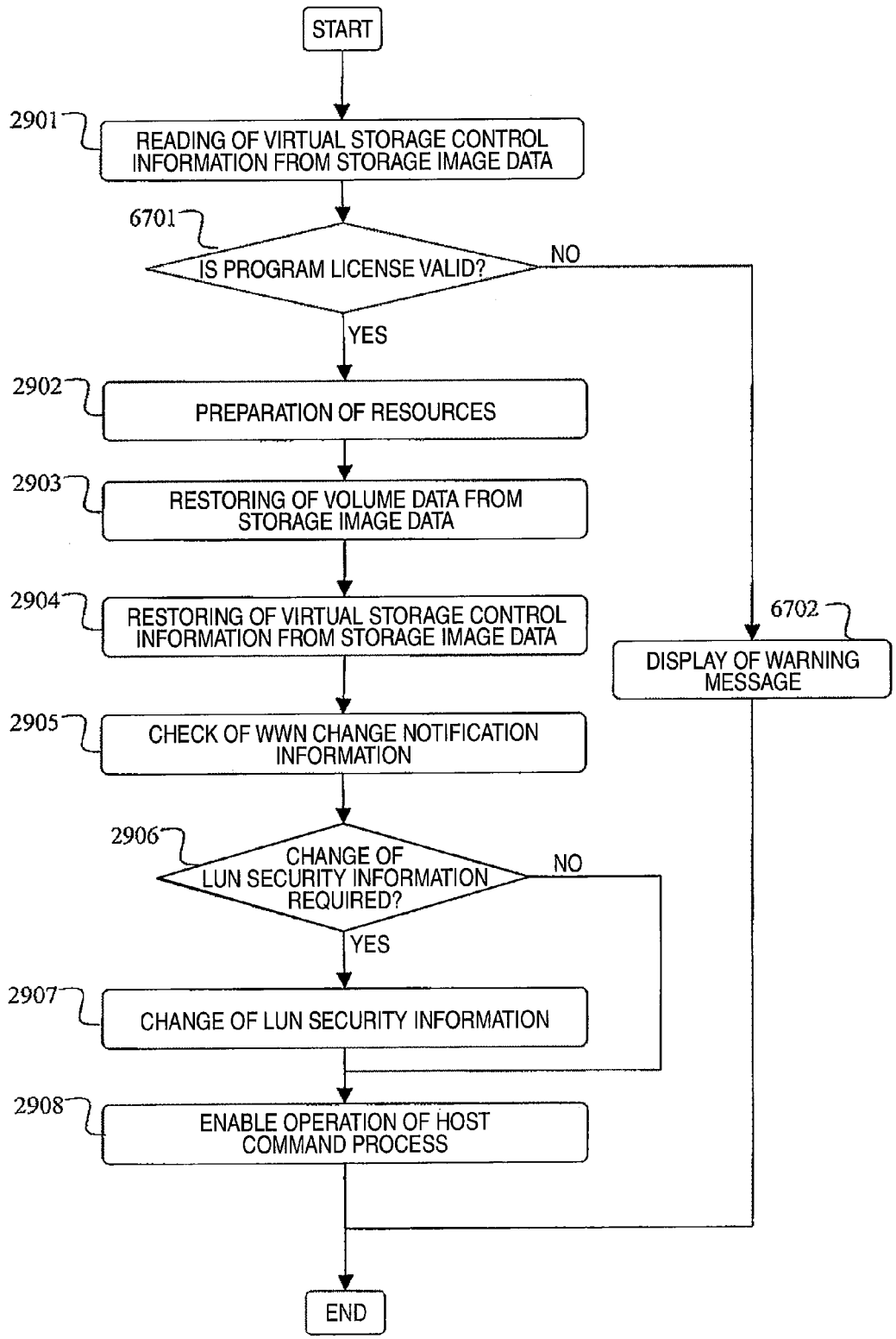
FIG. 67 is a flowchart of a process for checking a program license at the time of resumption of operation in the eighth embodiment of the invention.

FIG. 67 is a flowchart of the resumption process.

Compared with the flowchart of FIG. 29, in the flowchart of FIG. 67, steps 6701 and 6702 are additionally provided.

After step 2901, the control processor 124 checks whether the program license is valid or not (step 6701). To be specific, after step 2901, the control processor 124 checks the element of "program type 714" in the program control information 402 that has been read into the control memory from the volume being the storage destination of the storage image data 1601. For each of the program types found in the element of "program type 714", the control processor 124 then checks whether the element of "license information 6612" under the element of "program type 6611" shows "valid" or not in the program license information 6601. When there is at least one not-valid program type (N in step 6701), the physical storage device 120 forwards the not-valid program type to the management server 102. Thereafter, a warning message is displayed on the GUI screen 3102 of the management server 102 together with the not-valid program type (step 6702), and this is the end of the process. When there is no not-valid program type in step 6701 (Y in step 6701), the procedure goes to step 2902.

The above description is summarized as below. That is, the control processor 124 checks in step 6701 whether a program license is valid or not, thereby determining whether any program has been installed or not. When no program is installed, through the GUI screen 3102 of the management server 102, an operator of the virtual storage device 106 is notified which program(s) are not installed. As such, the operator can know swiftly the reason why the resumption of operation is not possible.

Ninth Embodiment

In a ninth embodiment, described is a method for automatically putting the virtual storage device 106 into a suspend mode when a host command does not come from the host for a predetermined length of time.

This embodiment can be applied to the first to fourth embodiments.

In the below, in the ninth embodiment, a difference from the first embodiment is described.

FIG. 68 is a diagram showing the data structure of automatic suspension information 6801.

The automatic suspension information 6801 includes elements of "virtual volume number 6811", "last command reception time 6812", and "threshold value 6813".

The element of "virtual volume number 6811" indicates numbers uniquely assigned to the virtual storage devices 106, respectively.

The element of "last command reception time 6812" indicates the time when the virtual volume receives a host command for the last time. This time is input by the control processor 124.

The element of "threshold value 6813" indicates the length of time until the virtual storage device 106 is automatically put in a suspend mode after receiving the last host command. The operator of the virtual storage device 106 makes an input thereof through the GUI screen 3101 of the management server 102.

Figure 69:
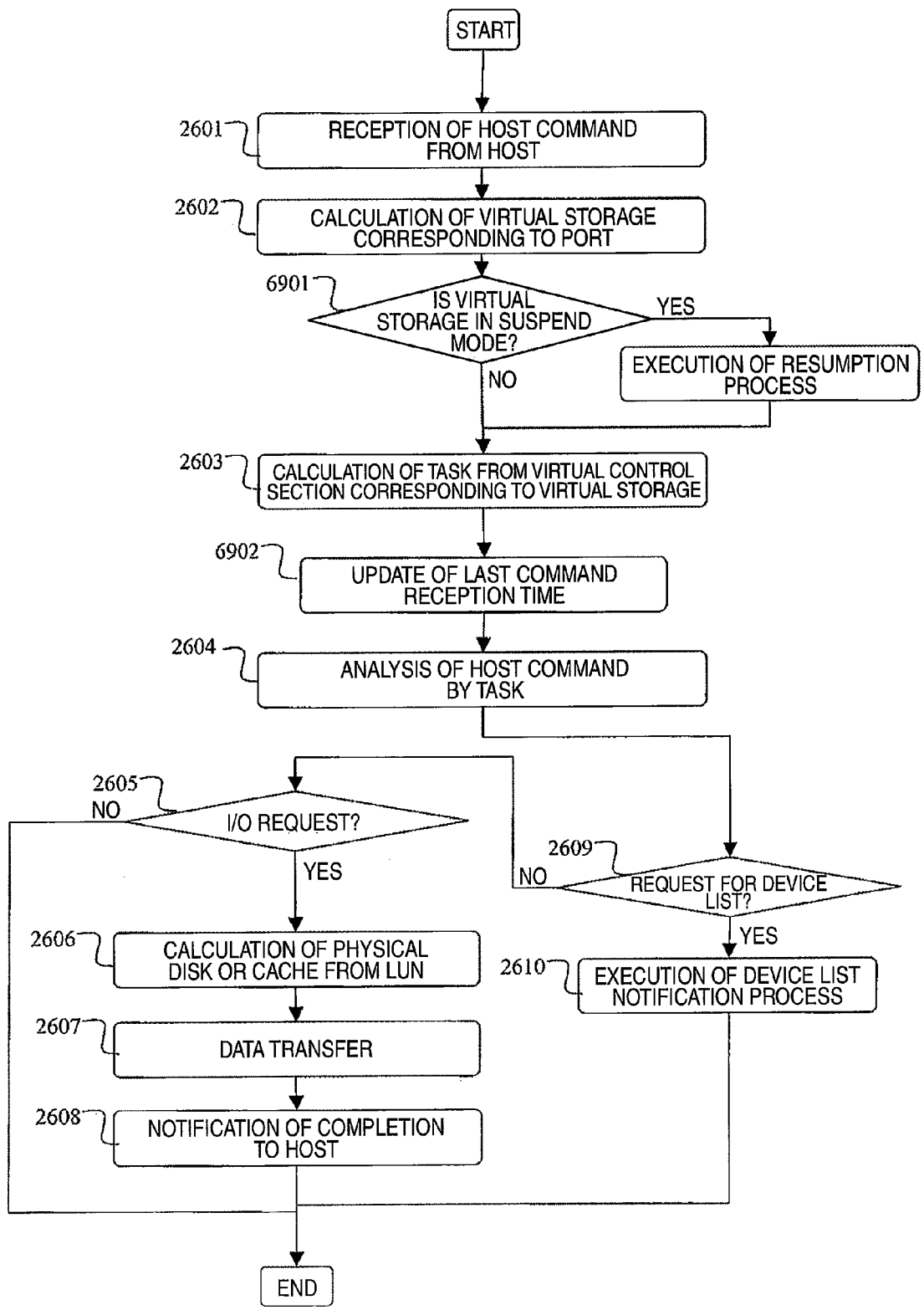
FIG. 69 is a flowchart of a cyclic suspension check process in the ninth embodiment of the invention.

FIG. 69 is a flowchart of the host command process 423.

Compared with the flowchart of FIG. 26, in the flowchart of FIG. 69, steps 6901 to 6903 are different.

In step 2602, the physical storage device 120 calculates a virtual storage device number corresponding to the port.

The physical storage device then determines whether the virtual storage device 106 is being in a suspend mode or not (step 6901). When the virtual storage device 106 is being in a suspend mode (Y in step 6901), the physical storage device 120 goes through the resumption process to the virtual storage device 106 (step 6902). The procedure then goes to step 2603. When the virtual storage device 106 is not in a suspend mode (N in step 6901), the procedure goes to step 2603.

Next, the physical storage device 120 calculates a task from the virtual control section corresponding to the virtual storage device 106 (step 2603).

The physical storage device 120 then updates the element of "last command reception time". To be specific, the control processor 124 refers to the automatic suspension information 6801. The control processor 124 then makes an input of time of receiving the host command into the element of "last command reception time 6812" corresponding to the element of "virtual volume number 6811" of the virtual volume having received the host command.

The processes thereafter are the same as those in the flowchart of FIG. 26, and thus are not described again.

Figure 70:
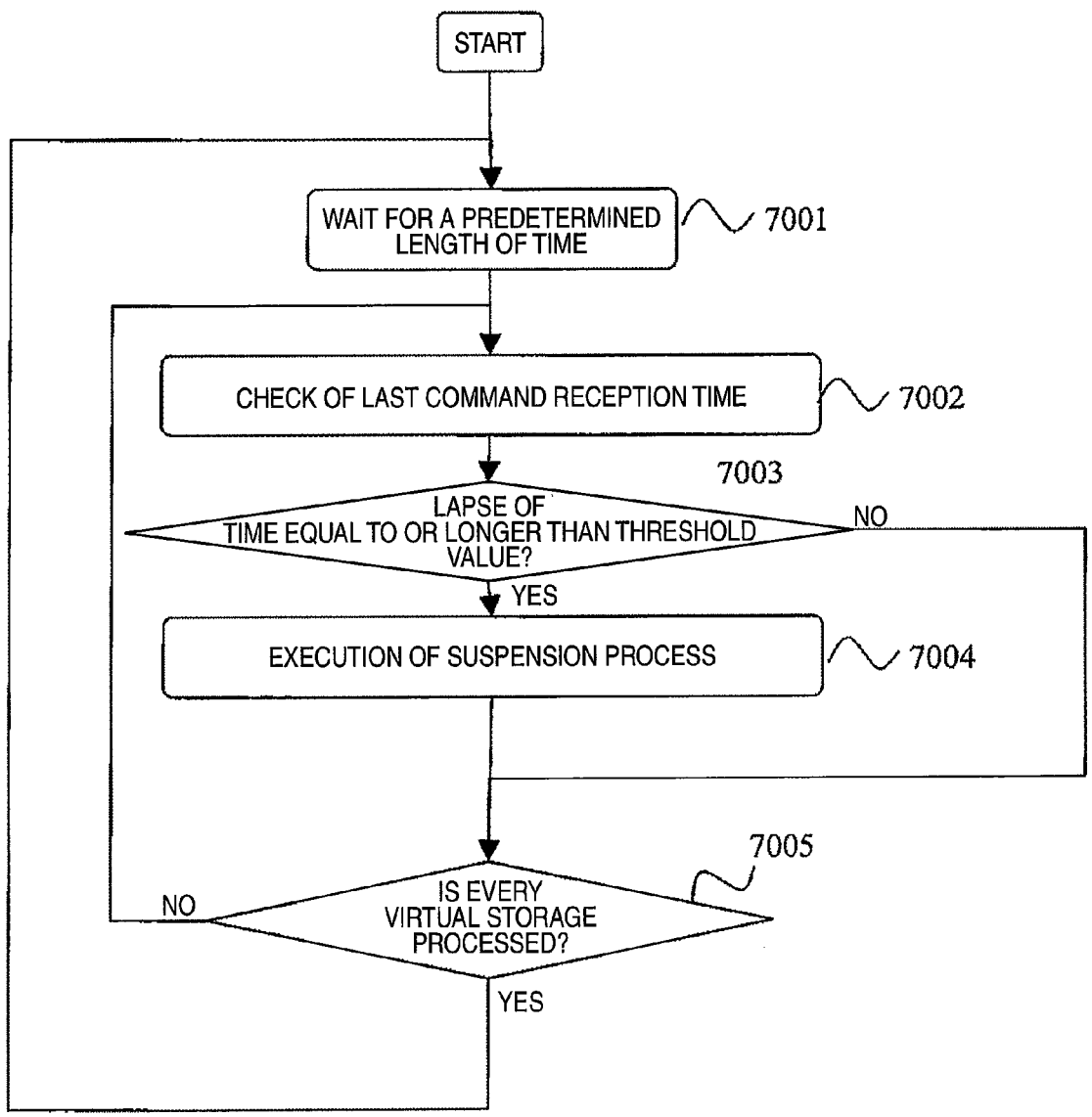
FIG. 70 is a flowchart of an automatic suspension process in the ninth embodiment of the invention.

FIG. 70 is a flowchart of a process for automatically putting the virtual storage device 106 into a suspend mode when the host command does not come from the host for a predetermined length of time.

The procedure from step 7002 to 7005 is cyclically executed (step 7001). With the lapse of a predetermined length of time, the process of step 7002 is started.

The physical storage device 120 then checks the element of "last command reception time 6812" (step 7002). To be specific, the control processor 124 refers to the automatic suspension information 6801, and checks the element of "last command reception time 6812".

The control processor 124 then refers to the automatic suspension information 6801, and determines whether the lapse of time is equal to or longer than the value in the element of "threshold value 6813" (step 7003).

When the lapse of time is equal to or longer than the value in the element of "threshold value 6813" (Y in step 7003), the suspension process is executed to the virtual storage device 106. When the lapse of time is not equal to or longer than the value in the element of "threshold value 6813" (N in step 7003), the procedure goes to step 7005.

When every virtual storage device 106 is processed as such (Y in step 7005), the process in step 7001 is executed again. When all of the virtual storage devices 106 are not yet processed (N in step 7005), the process in step 7002 is executed to any other virtual storage devices 106.

Figure 71:
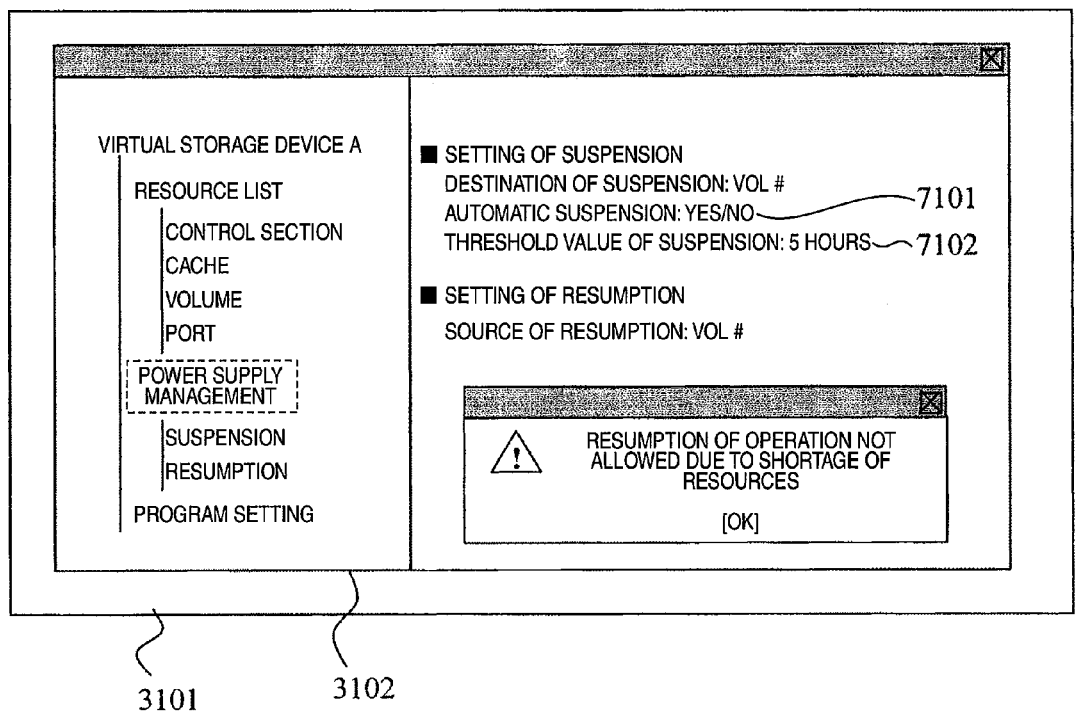
FIG. 71 is a diagram showing a GUI of a management server in the ninth embodiment of the invention.

FIG. 71 shows the GUI screen 3101 of the management server 102.

Compared with the screen of FIG. 31, in the screen of FIG. 71, an automatic suspension YES or NO input screen 7101 and a suspension threshold value input screen 7102 are different.

When the suspension process is to be executed automatically, the operator of the virtual storage device 106 makes an input of "YES", and makes an input of "NO" when the suspension process is not to be executed automatically.

The operator of the virtual storage device 106 also makes an input of suspension threshold value.

What is claimed is:

1. A storage system, comprising:
 a first storage device; and
 a second storage device connected to at least one computer and an external storage device,
 wherein the first storage device includes: a plurality of first memory devices for storage of data; a plurality of first cache memories; a plurality of first processors that each process an input/output request coming from the at least one computer by at least one of a plurality of first tasks; and at least one first control memory, wherein the second storage device includes: a plurality of second memory devices for storage of data; a plurality of second cache memories; a plurality of second processors that each process an input/output request coming from the at least one computer by at least one of a plurality of second tasks; and at least one second control memory, wherein a first processor of the plurality of first processors of the first storage device allocates, to a virtual storage device, at least one first memory device of the plurality of first memory devices, at least one first cache memory of the plurality of first cache memories, and at least one first task of the plurality of first tasks; and stores, in the at least one first control memory, first allocation information indicating whether each of the plurality of first memory devices, the plurality of first cache memories and the plurality of first tasks is allocated to any of a plurality of virtual storage devices, wherein the virtual storage device processes the input/output request provided by the at least one computer; and stores requested data in the at least one first memory device or the at least one first cache memory, wherein the first processor: receives a command from the at least one computer for putting the virtual storage device into a suspend mode; stores, into the external storage device, together with the data stored in the at least one first memory device, control information including correlations between identification information of one or more ports of the at least one computer and the virtual storage devices and configuration information concerning the virtual storage device; updates the first allocation information in such a manner as to indicate that the at least one first memory device, the at least one first cache memory, and the at least one first task are not allocated to the virtual storage device; and deallocates the at least one first memory device, the at least one first cache memory, and the at least one first task, wherein the first processor allocates any one or all of the deallocated at least one first memory device, the deallocated at least one first cache memory; and the deallocated at least one first task to another virtual storage device, and updates the first allocation information, or, if the first allocation information indicates that the at least one first memory device, the at least one first cache memory, or the at least one first task is not allocated to any of other virtual storage devices, the first processor turns off another first processor of the plurality of first processors, the another first processor using the at least one first memory device, the at least one first cache memory, or the at least one first task, wherein a second processor of the plurality of second processors of the second storage device receives a command from the at least one computer for the virtual storage device to resume operation, reads the control information from the external storage device, and recognizes, from the control information, the configuration information concerning the virtual storage device, wherein the second processor refers to second allocation information stored in the at least one second control memory, making a search for a second memory device not in use, a second cache memory not in use, and a second task not in use, allocates the second memory device not in use, the second cache memory not in use, and the second task not in use to the virtual storage device on the basis of the configuration information and moves the data from the external storage device to the second memory device not in use, and wherein the virtual storage device that resumes operation processes the input/output request from the at least one computer according to the correlations, included in the control information, between the identification information of the one or more ports of the at least one computer and the virtual storage devices.

2. The storage system according to claim 1, wherein the first allocation information includes power supply information indicating a state of power supply of each of the plurality of first memory devices, the plurality of first cache memories, and the plurality of first processors, wherein the first processor turns off the external storage device after storing the data and the control information thereinto, and wherein after the at least one first memory device, the at least one first cache memory, and the at least one first task are deallocated, if the first allocation information indicates that the at least one first memory device, the at least one first cache memory, or the at least one first task is not allocated to any of the other virtual storage devices, the first processor turns off the another first processor using the at least one first memory device, the at least one first cache memory, or the at least one first task; and updates the power supply information.

3. The storage system according to claim 2, wherein the second processor receives a command from the at least one computer for the virtual storage device to resume operation, and turns on the external storage device after being turned off, wherein the second processor is turned on after being turned off, and reads the data and the control information stored in the external storage device, and wherein any of the plurality of second memory devices not in use or any of the plurality of second cache memories not in use is turned on after being turned off.

4. The storage system according to claim 1, wherein the at least one second control memory stores: information about correlations between the plurality of virtual storage devices and identification information of the one or more ports of the at least one computer; and key information, and wherein the second processor receives, from the at least one computer, a change notification for changing identification information of any of the ports that corresponds to any of the virtual storage devices and, when matching is observed with key information included in the received change notification and the key information stored in the at least one second control memory, updates information about the correlation according to the change notification.

5. The storage system according to claim 4, wherein when allocating the second memory device not in use, the second cache memory not in use, and the second task not in use to the virtual storage device, the second processor determines whether the information about the correlations is changed by the change notification, and when a determination result is yes, updates the control information read from the external storage device.

6. The storage system according to claim 1, wherein in response to a request coming from the at least one computer about performance capabilities of the virtual storage device, the second processor makes a search for a request-satisfying component from any of the second memory devices not in use, any of the second cache memories not in use, and any of the second tasks not in use, and changes a parity group in accordance with the request.

7. The storage system according to claim 1,
wherein the first storage device further includes a package,
wherein the package includes at least one of the plurality of first memory devices, at least one of the plurality of first cache memories, or at least one of the plurality of first processors, and
wherein when the at least one of the first memory devices, the at least one of the first cache memories, or the at least one of the first tasks in the package allocated to the virtual storage device to be turned off is not allocated to any other virtual storage device, the package is turned off after being deallocated.

8. The storage system according to claim 1,
wherein the second storage device includes a plurality of modules,
wherein the modules are each provided with a package including at least one of the plurality of second memory devices, at least one of the plurality of second cache memories, and at least one of the plurality of second processors,
wherein the external storage device is turned on after being turned off, and
wherein the second processor is turned on after being turned off, and
wherein the second processor reads the data and the control information stored in the external storage device, and allocates, to the virtual storage device, with a higher priority, any of the plurality of second memory devices not in use, any of the plurality of second cache memories not in use, or any of the plurality of second tasks performed by the second processor not in use found in any of the same modules.

9. The storage system according to claim 1, wherein for allocation of, to the virtual storage device, any of the plurality of second memory devices not in use, any of the plurality of second cache memories not in use, and any of the plurality of second tasks not in use, in response to the command from the at least one computer, the second processor allocates any of the plurality of second memory devices not under reservation, any of the plurality of second cache memories not under reservation, or any of the plurality of second tasks not under reservation.

10. The storage system according to claim 1, wherein the command from the at least one computer is used as a basis to store the data into the external storage device or not.

11. The storage system according to claim 1, wherein the second processor reads the data and the control information stored in the external storage device, determines whether a storage function license in use is valid or not using the control information, and when a determination result is no, issues a command to the at least one computer for displaying a warning message.

12. A method for controlling a storage system, the storage system including a first storage device, and a second storage device connected to at least one computer and an external storage device, wherein the first storage device includes a plurality of first memory devices for storage of data, a plurality of first cache memories, a plurality of first processors that each process an input/output request coming from the at least one computer by at least one of a plurality of first tasks, and at least one first control memory, and wherein the second storage device includes a plurality of second memory devices for storage of data, a plurality of second cache memories, a plurality of second processors that each process an input/output request coming from the at least one computer by at least one of a plurality of second tasks, and at least one second control memory, the method comprising the steps of:

Allocating, by a first processor of the plurality of first processors of the first storage device, to a virtual storage device, at least one first memory device of the plurality of first memory devices, at least one first cache memory of the plurality of first cache memories, and at least one first task of the plurality of first tasks, and storing, in the at least one first control memory, first allocation information indicating whether each of the plurality of first memory devices, the plurality of first cache memories and the plurality of first tasks is allocated to any of a plurality of virtual storage devices;

processing, by the virtual storage device, the input/output request provided by the at least one computer and storing requested data in the at least one first memory device or the at least one first cache memory;

receiving, by the first processor, a command from the at least one computer for putting the virtual storage device into a suspend mode, storing, into the external storage device, control information including: correlations between identification information of one or more ports of the at least one computer and the virtual storage devices, and configuration information concerning the virtual storage device; and the data stored in the at least on first memory device; updating the first allocation information in such a manner as to indicate that the at least one first memory device, the at least one first cache memory, and the at least one first task are not allocated to the virtual storage device, and deallocating the at least one first memory device, the at least one first cache memory, and the at least one first task;

allocating, by the first processor, any one or all of the deallocated at least one first memory device, the deallocated at least one first cache memory and the deallocated at least one first task to another virtual storage device and updating the first allocation information, or, if the first allocation information indicates that the at least one first memory device, the at least one first cache memory or the at least one first task is not allocated to any of other virtual storage devices, turning off another first processor of the plurality of first processors, the another first processor using the at least one first memory device, the at least one first cache memory, or the at least one first task;

receiving, by a second processor of the plurality of second processors of the second storage device, a command from the at least one computer for the virtual storage device to resume operation, reading the control information from the external storage device, and recognizing, from the control information, the configuration information concerning the virtual storage device;

referring, by the second processor, to second allocation information stored in the at least one second control memory, making a search for a second memory device not in use, a second cache memory not in use, and a second task not in use, allocating the second memory device not in use, the second cache memory not in use, and the second task not in use to the virtual storage device on the basis of the configuration information, and moving the data from the external storage device to the second memory device not in use; and processing, by the virtual storage device that resumes operation, the input/output request from the at least one computer according to the correlations, included in the control information, between the identification information of the one or more ports of the at least one computer and the virtual storage devices.

13. The storage control method according to claim 12,
wherein the first allocation information includes power supply information indicating a state of power supply of each of the plurality of first memory devices, the plurality of first cache memories, and the plurality of first processors,
wherein the external storage device is turned, by the first processor, after the data and the control information are stored thereinto, and
wherein after the at least one first memory device, the at least one first cache memory, and the at least one first task are deallocated, if the first allocation information indicates that the at least one first memory device, the at least one first cache memory, or the at least one first task is not allocated to any of the other virtual storage devices, the first processor turns off the another first processor using the at least one first memory device, the at least one first cache memory, or the at least one first task and updates the power supply information.

14. The storage control method according to claim 13, wherein the second processor receives a command from the at least one computer for the virtual storage device to resume operation, and turns on the external storage device after being turned off,
wherein the second processor is turned on after being turned off, and the data and the control information stored in the external storage device are read by the second processor, and
wherein any of the plurality of second memory devices not in use or any of the plurality of second cache memories not in use is turned on after being turned off.

15. The storage control method according to claim 13,
wherein the second storage device includes a plurality of modules,
wherein the modules are each provided with a package including at least one of the plurality of second memory devices, at least one of the plurality of second cache memories, or at least one of the plurality of second processors,
wherein the external storage device is turned on after being turned off,
wherein the second processor is turned on after being turned off, and
wherein the second processor reads the data and the control information stored in the external storage device, and allocates, to the virtual storage device, with a higher priority, any of the second memory devices not in use, any of the second cache memories not in use, or any of the second tasks performed by the second processor not in use found in any of the same modules.

16. The storage control method according to claim 12,
wherein the at least one second control memory stores:
information about correlations between the plurality of virtual storage devices and identification information of the one or more ports of the at least one computer; and key information, and
wherein the second processor receives, from the at least one computer, a change notification for changing identification information of any of the ports that corresponds to any of the virtual storage devices, and when matching is observed with key information included in the received change notification and the key information stored in the at least one second control memory, updates information about the correlations according to the change notification.

17. The storage control method according to claim 16, wherein when allocating the second memory device not in use, the second cache memory not in use, and the second task not in use to the virtual storage device, the second processor determines whether the information about the correlations is changed by the change notification, and when a determination result is yes, updates the control information read from the external storage device.

18. The storage control method according to claim 12,
wherein in response to a request coming from the at least one computer about performance capabilities of the virtual storage device, the second processor makes a search for a request-satisfying component from any of the second memory devices not in use, any of the second cache memories not in use, and any of the second tasks not in use, and changes a parity group in accordance with the request.

19. The storage control method according to claim 12,
wherein the first storage device further includes a package,
wherein the package includes at least one of the plurality of first memory devices, at least one of the plurality of first cache memories, or at least one of the plurality of first processors, and
wherein when the at least one of the first memory devices, the at least one of the first cache memories, or the at least one of the first tasks in the package allocated to the virtual storage device to be turned off is not allocated to any other virtual storage device, the package is turned off after being deallocated.

20. The storage control method according to claim 12,
wherein for allocation of, to the virtual storage device, any of the second memory devices not in use, any of the second cache memories not in use, and any of the second tasks not in use, in response to the command from the at least one computer, any of the plurality of second memory devices not under reservation, any of the plurality of second cache memories not under reservation, or any of the plurality of second tasks not under reservation is allocated.

21. The storage control method according to claim 12,
wherein the command from the at least one computer is used as a basis to store the data into the external storage device or not.

22. The storage control method according to claim 12,
wherein the second processor reads the data and the control information stored in the external storage device, determines whether a storage function license in use is valid or not using the control information, and when a determination result is no, issues a command to the at least one computer for displaying a warning message.

* * * * *